United States Patent
Youn et al.

(10) Patent No.: US 12,069,758 B2
(45) Date of Patent: Aug. 20, 2024

(54) METHOD AND TERMINAL FOR DISPLAYING INFORMATION FOR USING MA PDU SESSION

(71) Applicant: LG ELECTRONICS INC., Seoul (KR)

(72) Inventors: Myungjune Youn, Seoul (KR); Laeyoung Kim, Seoul (KR); Hyunsook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 427 days.

(21) Appl. No.: 17/310,618

(22) PCT Filed: Jun. 27, 2019

(86) PCT No.: PCT/KR2019/007774
§ 371 (c)(1),
(2) Date: Aug. 13, 2021

(87) PCT Pub. No.: WO2020/166767
PCT Pub. Date: Aug. 20, 2020

(65) Prior Publication Data
US 2022/0167446 A1    May 26, 2022

(30) Foreign Application Priority Data
Feb. 14, 2019  (KR) .................. 10-2019-0017102

(51) Int. Cl.
*H04W 76/16*    (2018.01)
*H04W 48/16*    (2009.01)
(Continued)

(52) U.S. Cl.
CPC .......... *H04W 76/16* (2018.02); *H04W 48/16* (2013.01); *H04W 48/18* (2013.01); *H04W 84/12* (2013.01); *H04L 65/1069* (2013.01)

(58) Field of Classification Search
CPC ..... H04W 76/00; H04W 76/10; H04W 76/15; H04W 48/00; H04W 48/16; H04W 84/00;
(Continued)

(56) References Cited

U.S. PATENT DOCUMENTS 11,792,871 B2 * 10/2023 Ianev ............... H04W 8/18
370/329
2004/0204133 A1  10/2004 Andrew et al.
(Continued)

FOREIGN PATENT DOCUMENTS

CA      3030741      10/2018
CN    107592328      1/2018
(Continued)

OTHER PUBLICATIONS

PCT International Application No. PCT/KR2019/007774, International Search Report dated Nov. 14, 2019, 4 pages.
(Continued)

*Primary Examiner* — Warner Wong
(74) *Attorney, Agent, or Firm* — LEE, HONG, DEGERMAN, KANG & WAIMEY

(57) ABSTRACT

One disclosure of the present specification provides a method for using a multi-access (MA) protocol data unit (PDU) session of a terminal. The method may comprise the steps of: displaying a configuration screen on whether to use a MA PDU session; displaying information representing the establishment or use of the MA PDU session if the MA PDU session is configured to be usable and if two access networks are both in a usable state; and displaying detailed information on the MA PDU session.

12 Claims, 42 Drawing Sheets

(51) Int. Cl.
H04W 48/18 (2009.01)
H04W 84/12 (2009.01)
H04L 65/1069 (2022.01)

(58) Field of Classification Search
CPC ..... H04W 84/02; H04W 84/10; H04W 84/12; H04W 48/18; H04W 28/084; H04W 88/06; H04W 88/10; H04W 36/0066; H04W 36/0069; H04L 65/1069; H04L 67/141; H04B 17/252; H04B 7/18539
See application file for complete search history.

(56) References Cited

U.S. PATENT DOCUMENTS

| | | | |
|---|---|---|---|
| 2005/0010693 A1 | 1/2005 | Sinclair et al. | |
| 2019/0069194 A1* | 2/2019 | Jun | H04W 28/10 |
| 2019/0200266 A1* | 6/2019 | Jun | H04W 36/0022 |
| 2019/0260811 A1* | 8/2019 | Kim | H04W 76/12 |
| 2019/0274178 A1* | 9/2019 | Salkintzis | H04W 76/15 |
| 2019/0394745 A1* | 12/2019 | Yu | H04W 60/00 |
| 2019/0394833 A1* | 12/2019 | Talebi Fard | H04W 68/005 |
| 2020/0128432 A1* | 4/2020 | Youn | H04W 28/10 |
| 2020/0221527 A1* | 7/2020 | Bharatia | H04W 76/16 |
| 2020/0280562 A1* | 9/2020 | Salkintzis | H04L 65/612 |
| 2021/0219364 A1* | 7/2021 | Tang | H04W 28/10 |
| 2021/0227597 A1* | 7/2021 | Kawasaki | H04W 76/12 |

FOREIGN PATENT DOCUMENTS

| | | | | |
|---|---|---|---|---|
| CN | 108574960 | * | 9/2018 | ............ H04W 24/06 |
| CN | 109104773 | | 12/2018 | |
| EP | 3755116 | | 12/2020 | |
| WO | 2018006017 | | 1/2018 | |
| WO | 2019011398 | | 1/2019 | |

OTHER PUBLICATIONS

ZTE, "Evaluation on Combined establishment procedure and Separated establishment procedure," S2-1810652, SA WG2 Meeting #129, Oct. 2018, 11 pages.

3rd Generation Partnership Project, "Technical Specification Group Services and System Aspects; Architecture enhancements for non-3GPP accesses (Release 16)," 3GPP TS 23.402 V16.0.0, Jun. 2019, 314 pages.

3rd Generation Partnership Project, "Technical Specification Group Services and System Aspects; General Packet Radio Service (GPRS) enhancements for Evolved Universal Terrestrial Radio Access Network (E-UTRAN) access (Release 16)," 3GPP TS 23.401 V16.0.0, Sep. 2018, 410 pages.

European Patent Office Application Serial No. 19915178.8, Search Report dated Mar. 3, 2022, 11 pages.

3rd Generation Partnership Project, "Technical Specification Group Services and System Aspects; Study on access traffic steering, switch and splitting support in the 5G system architecture (Release 16)," 3GPP TR 23.793 V16.0.0, Dec. 2018, 114 pages.

Interdigital Inc., "UE Requested Multi-access PDU Session Establishment," S2-180449, SA WG2 Meeting #125, Jan. 2018, 4 pages.

ZTE, "Evaluation on Combined establishment procedure and Separated establishment procedure," S2-1810979, SA WG2 Meeting #129, Oct. 2018, 5 pages.

Motorola Mobility et al., "Procedure for MA-PDU Session Establishment," S2-1812510, SA WG2 Meeting #129bis, Nov. 2018, 7 pages.

State Intellectual Property Office of the People's Republic of China Application Serial No. 201980092240.X, Office Action dated Apr. 14, 2023, 9 pages.

Huawei et al., "TS 23.502: Update to PDU session establishment procedure and PDU session establishment authentication & authorization via the NEF," SA WG2 Meeting #122, S2-174436, Jun. 2017, 11 pages.

Huawei et al., "Support of MA-PDU session," 3GPP TSG-SA WG2 Meeting #130, S2-1900463, Jan. 2019, 14 pages.

* cited by examiner

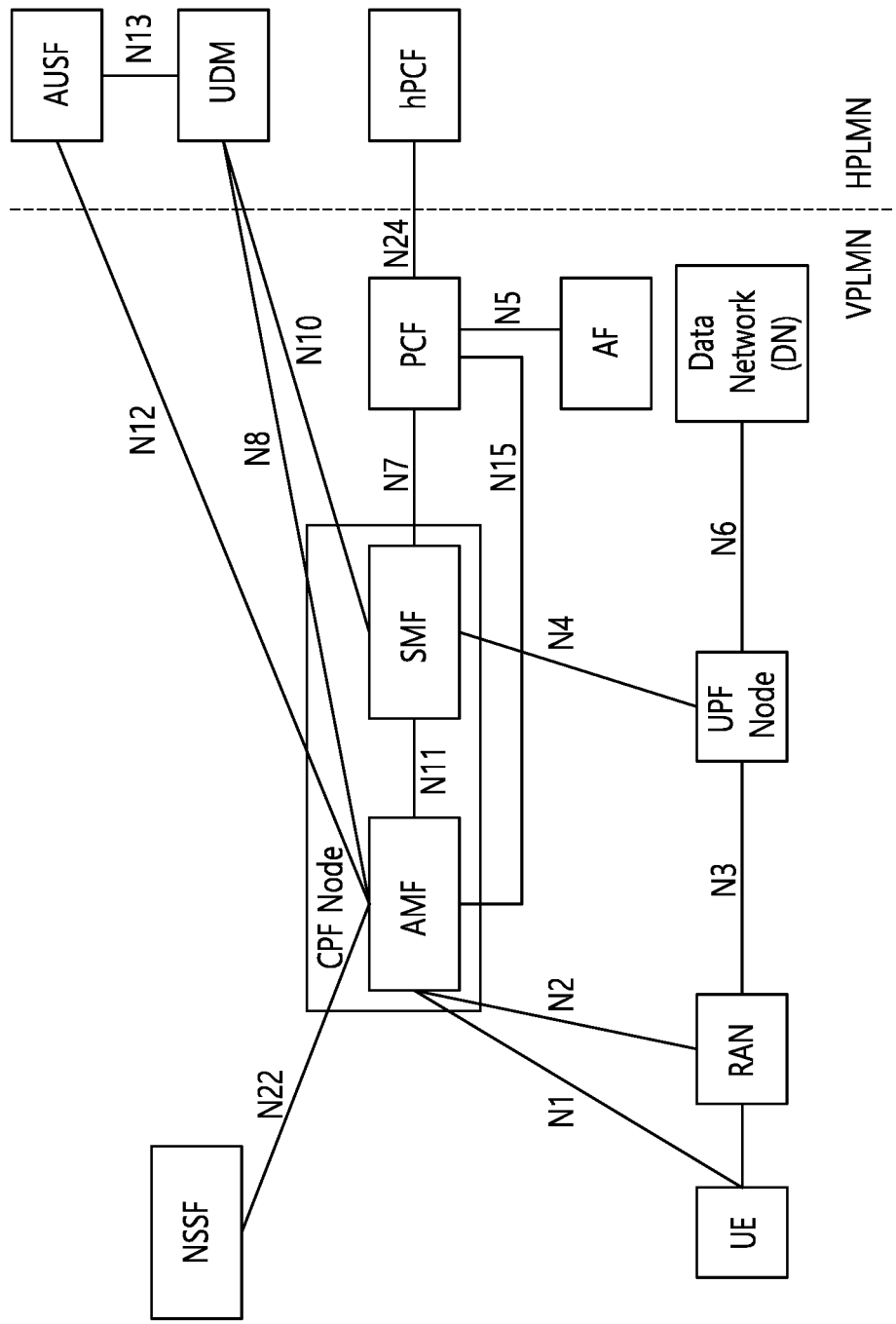

METHOD AND TERMINAL FOR DISPLAYING INFORMATION FOR USING MA PDU SESSION

CROSS-REFERENCE TO RELATED APPLICATIONS

This application is the National Stage filing under 35 U.S.C. 371 of International Application No. PCT/KR2019/007774, filed on Jun. 27, 2019, which claims the benefit of earlier filing date and right of priority to Korean Application No. 10-2019-0017102, filed on Feb. 14, 2019, the contents of which is hereby incorporated by reference herein in its entirety.

TECHNICAL FIELD

The present specification relates to next-generation mobile communication.

BACKGROUND

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows a structure of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |

TABLE 1-continued

| REFERENCE POINT | DESCRIPTION |
|---|---|
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3 GPP anchor functions of a GPRS core and the S-GW. Furthermore, if a direct tunnel is not established, the reference point provides user plane tunneling. |
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

<Next-Generation Mobile Communication Network>

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

The 5G mobile communication defined in the international telecommunication union (ITU) provides a data transfer rate of up to 20 Gbps and a sensible transfer rate of at least 100 Mbps anytime anywhere. 'IMT-2020' is a formal name, and aims to be commercialized in the year 2020 worldwide.

The ITU proposes three usage scenarios, e.g., eMBB (enhanced Mobile BroadBand), mMTC (massive Machine Type Communication), and URLLC (Ultra Reliable and Low Latency Communications).

First, the URLLC relates to a usage scenario which requires a high reliability and a low latency. For example, a service such as autonomous driving, factory automation, and augmented reality requires a high reliability and a low latency (e.g., a latency less than or equal to 1 ms). At present, a latency of 4G (LTE) is statistically 21-43 ms (best 10%), 33-75 ms (median). This is insufficient to support a service requiring the latency less than or equal to 1 ms.

Next, an eMBB usage scenario relates to a usage scenario requiring a mobile ultra-wide band.

It seems that a core network designed for the existing LTE/LTE-A has difficulty in accommodating a high-speed service of the ultra-wide band.

Therefore, it is urgently required to re-design the core network in 5G mobile communication.

FIG. 2 shows an example of an expected structure of next-generation mobile communication from a node perspective.

As can be seen with reference to FIG. 2, a UE is coupled to a data network (DN) via a next generation radio access network (RAN).

The illustrated control plane function (CPF) node performs the entirety or part of a mobility management entity (MME) function of 4G mobile communication and the entirety or part of a control plane function of an S-serving gateway (SG) and PDN gateway (P-GW). The CPF node includes an access and mobility management function (AMF) and a session management function (SMF).

The illustrated user plane function (UPF) node is a type of a gateway through which user data is transmitted/received. The UPF node may perform the entirety or part of a user plane function of an S-GW or P-GW of 4G mobile communication.

The illustrated policy control function (PCF) is a node which controls a provider's policy.

The illustrated application function (AF) is a server for providing several services to the UE.

The illustrated unified data management (UDM) is a type of a server which manages subscriber information, such as a home subscriber server (HSS) of 4G mobile communication. The UDM stores the subscriber information in a unified data repository (UDR) and manages it.

The illustrated authentication server function (AUSF) authenticates and manages the UE.

The illustrated network slice selection function (NSSF) is a node for network slicing as described below.

In FIG. 2, the UE can simultaneously access two data networks by using multiple protocol data unit or packet data unit (PDU) sessions.

FIG. 3 shows an example of an architecture for supporting simultaneous access to two data networks.

In the architecture shown in FIG. 3, a UE uses one PDU session to simultaneously access the two data networks.

FIG. 4 is another exemplary diagram showing the structure of a radio interface protocol between the UE and the gNB.

The radio interface protocol is based on the 3GPP radio access network standard. The radio interface protocol is horizontally composed of a physical layer, a data link layer, and a network layer, and vertically a user plane and control for data information transmission. The radio interface protocol is vertically divided into a user plane for transmitting data information and a control plane for transmitting a control signal.

The protocol layers may be divided into L1 (Layer 1), L2 (Layer 2), and L3 (Layer 3) based on the lower three layers of the Open System Interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data is transmitted between the medium access control layer and the physical layer through the transport channel. And, data is transferred through a physical channel between different physical layers, that is, between the physical layers of the transmitting side and the receiving side.

The second layer includes a Medium Access Control (MAC) layer, a Radio Link Control (RLC) layer, and a Packet Data Convergence Protocol (PDCP) layer.

The third layer includes radio resource control (hereinafter abbreviated as RRC). The RRC layer is defined only in the control plane, and the RRC layer is responsible for control of logical channels, transport channels and physical channels, and the RRC layer is related to the establishment, re-establishment and release of radio bearers (abbreviated as RB). In this case, the RB means a service provided by the second layer for data transfer between the UE and the E-UTRAN.

The NAS (Non-Access Stratum) layer performs functions such as connection management (session management) and mobility management (Mobility Management).

The NAS layer is divided into a NAS entity for MM (Mobility Management) and a NAS entity for SM (session management).

1) The NAS entity for MM provides the following general functions.
   NAS procedures related to AMF, including the following.
   Registration management and access management procedures. AMF supports the following functions.
   Secure NAS signal connection between UE and AMF (integrity protection, encryption)

2) The NAS entity for SM performs session management between the UE and the SMF.

SM signaling messages are processed, ie, generated and processed in the NAS-SM layer of the UE and SMF. The content of the SM signaling message is not interpreted by the AMF.

In case of SM signaling transmission,
   The NAS entity for MM creates a NAS-MM message that derives how and where to forward the SM signaling message based on a security header indicating the NAS transmission of the SM signaling, additional information about the receiving NAS-MM.
   Upon reception of SM signaling, the NAS entity for SM performs an integrity check of the NAS-MM message and interprets additional information to derive a method and a place to derive the SM signaling message.

Meanwhile, in FIG. 4, the RRC layer, the RLC layer, the MAC layer, and the PHY layer located below the NAS layer are collectively referred to as an access layer (Access Stratum: AS).

<Network Slice>

The following describes the slicing of the network to be introduced in the next generation mobile communication.

Next-generation mobile communication introduces the concept of network slicing in order to provide various services through a single network. In this connection, slicing a network refers to a combination of network nodes with the functions needed to provide a specific service. The network node that constitutes the slice instance may be a hardware independent node, or it may be a logically independent node.

Each slice instance may consist of a combination of all the nodes needed to construct the entire network. In this case, one slice instance alone may provide service to the UE.

Alternatively, the slice instance may consist of a combination of some of the nodes that make up the network. In this case, the slice instance may provide service to the UE in association with other existing network nodes without the slice instacne alone providing the service to the UE. In addition, a plurality of slice instances may cooperate with each other to provide the service to the UE.

The slice instance may differ from a dedicated core network in that all network nodes, including the core network (CN) node and the RAN may be separated from each other. Further, the slice instance differs from the dedicated core network in that the network nodes may be logically separated.

FIG. 5A is an exemplary diagram illustrating an example of an architecture for implementing the concept of network slicing.

As can be seen from FIG. 5A, the core network (CN) may be divided into several slice instances. Each slice instance may contain one or more of a CP function node and a UP function node.

Each UE may use a network slice instance corresponding to its service through RAN.

Unlike the case shown in FIG. 5A, each slice instance may share one or more of a CP function node, and a UP function node with another slice instance. This will be described with reference to FIG. 5B below.

FIG. 5B is an exemplary view showing another example of an architecture for implementing the concept of network slicing.

Referring to FIG. 5B, a plurality of UP function nodes are clustered, and a plurality of CP function nodes are also clustered.

Further, referring to FIG. 5B, slice instance #1 (or instance #1) in the core network includes a first cluster of an UP function node. Moreover, the slice instance #1 shares the cluster of the CP function node with slice instance #2 (or instance #2). The slice instance #2 includes a second cluster of an UP function node.

The illustrated NSSF selects a slice (or instance) that can accommodate the UE's service.

The illustrated UE may use the service #1 via the slice instance #1 selected by the NSSF and may use the service #2 via the slice instance #2 selected by the NSSF.

<Roaming in Nest Generation Mobile Network>

Meanwhile, there are two types of a method for processing a signaling request from a UE while the UE roams to a visit network, for example, a visited public land mobile network (VPLMN). The first method is a local break out (LBO) method in which the signaling request from the UE is processed at the network. The second method is a home routing (HR) method in which the visit network transmit the signaling request from the UE to a home network of the UE.

FIG. 6A is a diagram illustrating an example of architecture to which the LBO method is applied during roaming, and FIG. 6B is a diagram illustrating an example of architecture to which the HR method is applied during roaming.

As illustrated in FIG. 6A, in the architecture to which the LBO method is applied, data of a user is transmitted to a data network in the VPLMN. To this end, a PCF in the VPLMN performs an interaction with an AF to create a PCC rule for a service in the VPLMN. A PCF node in the VPLMN creates the PCC rule based on a policy that is set according to a roaming agreement with a home public land mobile network (HPLMN) operator.

As illustrated in FIG. 6B, in the architecture to which the HR method is applied, the data of the UE is transmitted to the data network in the HPLMN.

<Data Offloading to Non-3GPP Network>

In next-generation mobile communication, data of a UE may be offloaded to a non-3GPP network, for example, a wireless local area network (WLAN) or a Wi-Fi.

FIGS. 7A to 7F illustrate architectures for offloading data to the non-3GPP network.

A WLAN or a Wi-Fi is regarded as an untrusted non-3GPP network. In order to connect the non-3GPP network to a core network, a non-3GPP interworking function (N3IWF) may be added.

Meanwhile, a PDU session may be established through a 3GPP access and a non-3GPP access. As such, an idea that suggests establishing a multi-access (MA) PDU session by bundling two separate PDU sessions established through the different accesses has been proposed.

Yet, a detailed method for establishing an MA PDU session and a method for efficiently managing an MA PDU session has not been discussed, and thus, it was not possible to carry out the idea.

SUMMARY

The disclosures of the specification has been made in an effort to solve the above-described problems.

In order to achieve the above object, one disclosure of the present specification provides a method of using a multi-access (MA) protocol data unit (PDU) session of a terminal. The method includes displaying a setting screen for whether to use the MA PDU session; displaying information indicating establishment or use of the MA PDU session when the MA PDU session is set to be usable and when both access networks are available; and displaying detailed information about the MA PDU session.

The method may further include automatically turning on a wireless LAN (WLAN) for establishment of the MA PDU session.

The method may further include displaying a screen asking whether to turn on a wireless LAN (WLAN) for establishment of the MA PDU session.

The method may further include displaying information indicating that the MA PDU session cannot be used when the MA PDU session is established but cannot be used.

The detailed information may include information on whether to use the MA PDU session for each application.

The detailed information may include a list of applications.

The information indicating establishment or use of the MA PDU session may be an indicator displayed on the status bar of the screen.

The terminal may be a mobile terminal or a device mounted on an autonomous vehicle.

The terminal may communicate with at least one of a network and an autonomous vehicle.

In order to achieve the above object, one disclosure of the present specification provides a terminal using a multi-access (MA) protocol data unit (PDU) session. The terminal includes a first transceiver for wireless local area network (WLAN) communication; a second transceiver for cellular communication; a display unit; an input unit; and a processor for controlling the first transceiver, the second transceiver, the display unit, and the input unit. The processor may display a setting screen for whether to use the MA PDU session on the display unit. The processor receives a setting input for use of the MA PDU session from the user through the input unit and displays information indicating establishment or use of the MA PDU session when both the WLAN communication and the cellular communication are available on the display unit can be displayed in The processor may display detailed information on the MA PDU session on the display unit.

According to the disclosure of the present disclosure, the problem of the conventional technology described above may be solved.

BRIEF DESCRIPTION OF THE DRAWINGS

FIG. 6A is a diagram illustrating an example of architecture to which the LBO method is applied during roaming.

DESCRIPTION OF EXEMPLARY EMBODIMENTS

Figure 1:
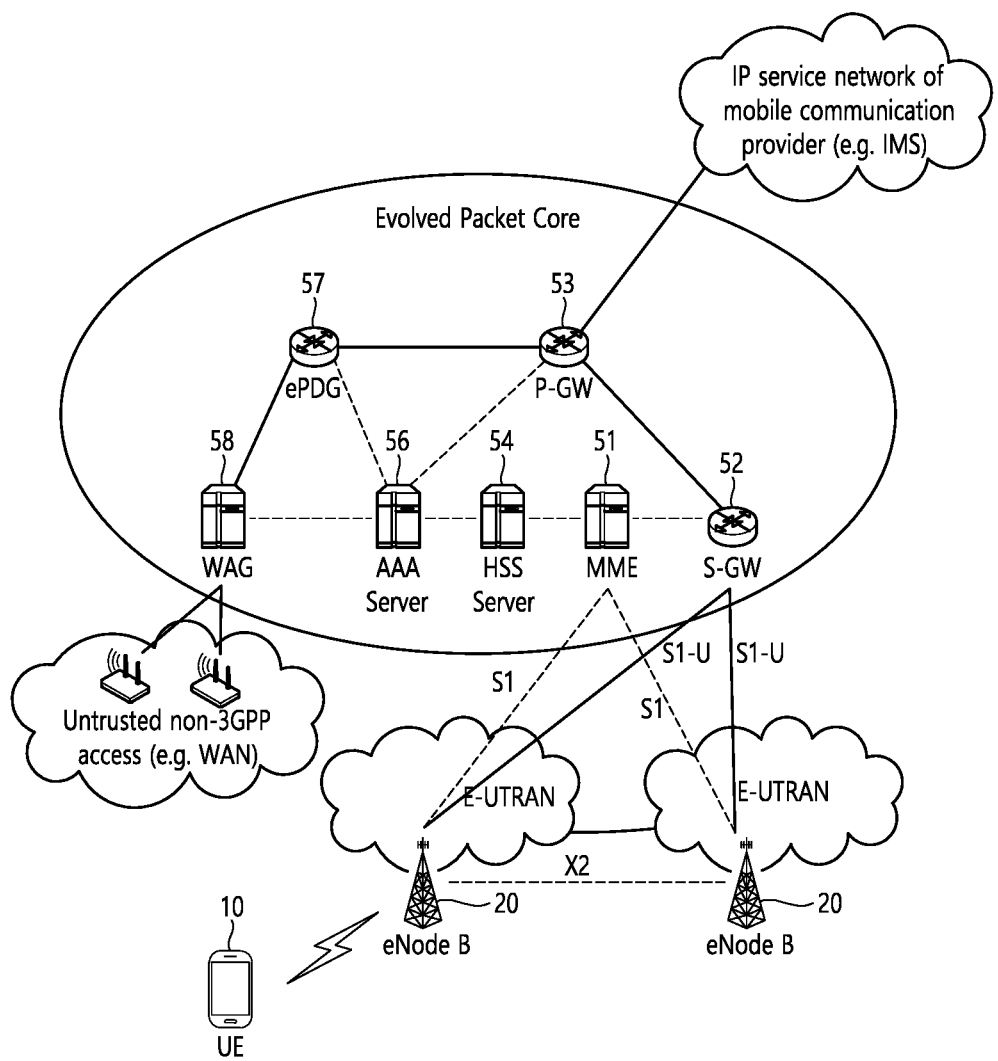
FIG. 1 shows an architecture of an evolved mobile communication network.
Figure 2:
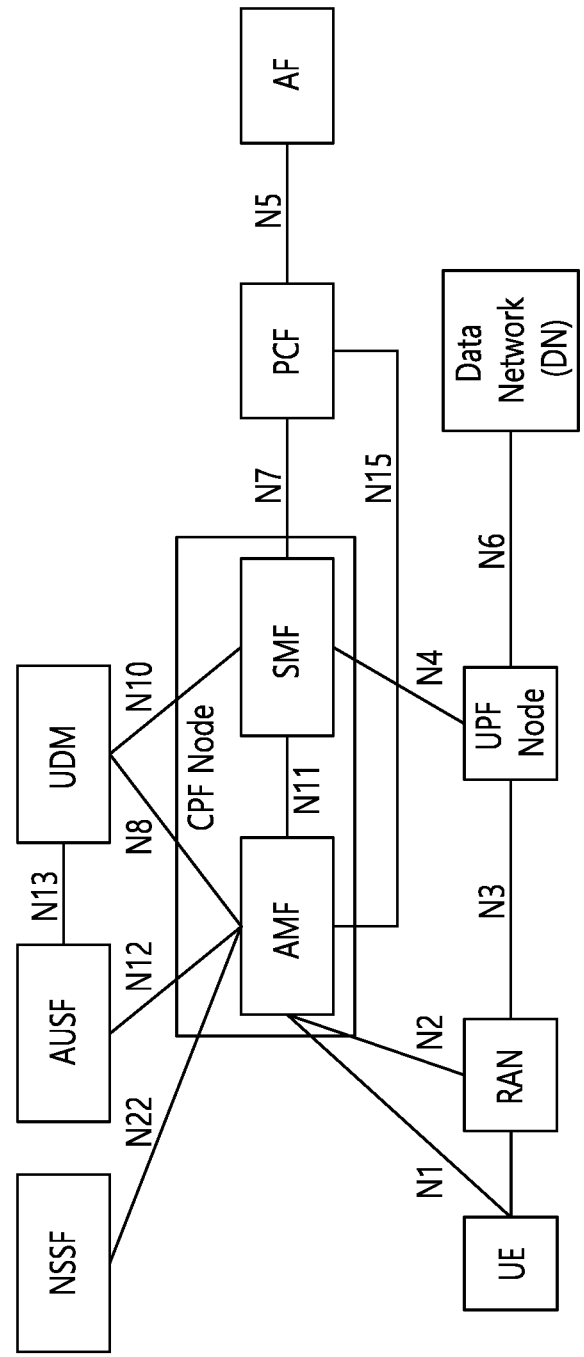
FIG. 2 shows an example of an expected structure of next-generation mobile communication from a node perspective.
Figure 3:
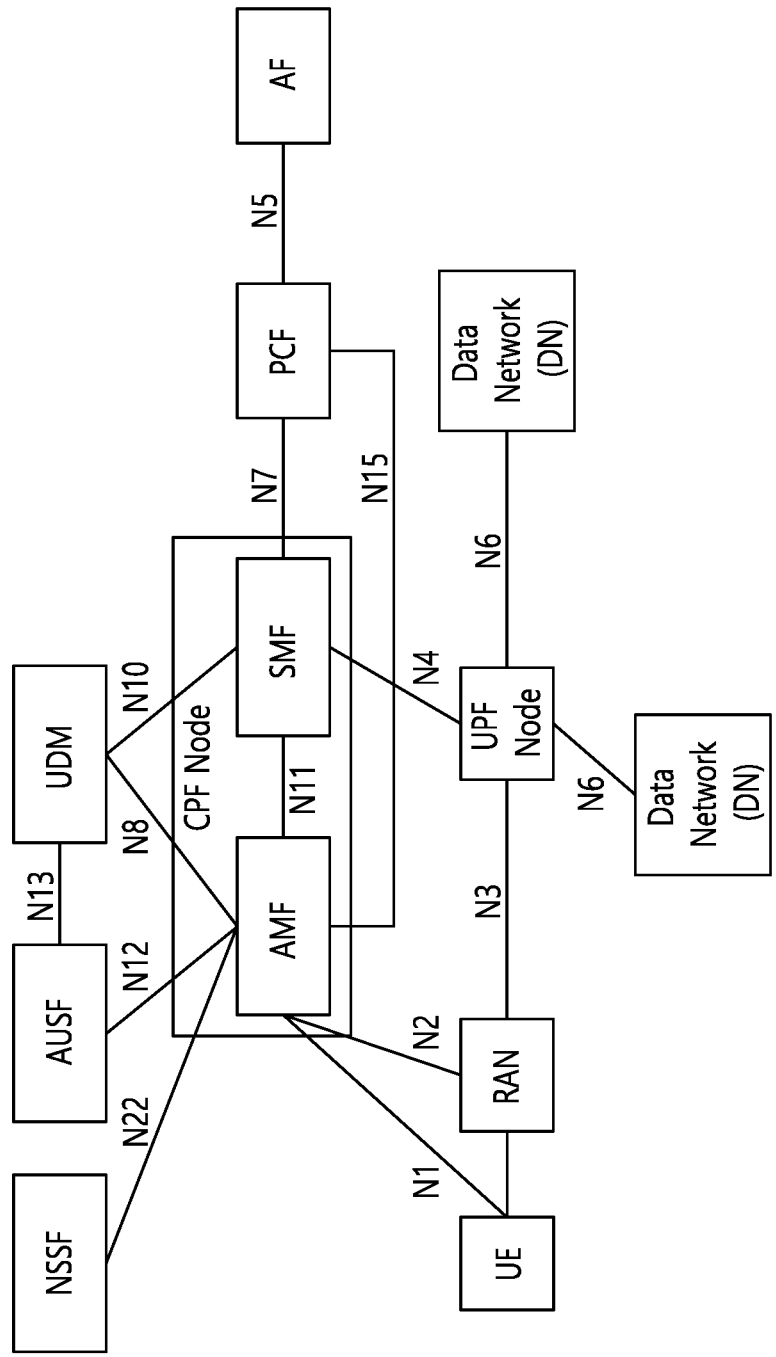
FIG. 3 shows an example of an architecture for supporting simultaneous access to two data networks.
Figure 4:
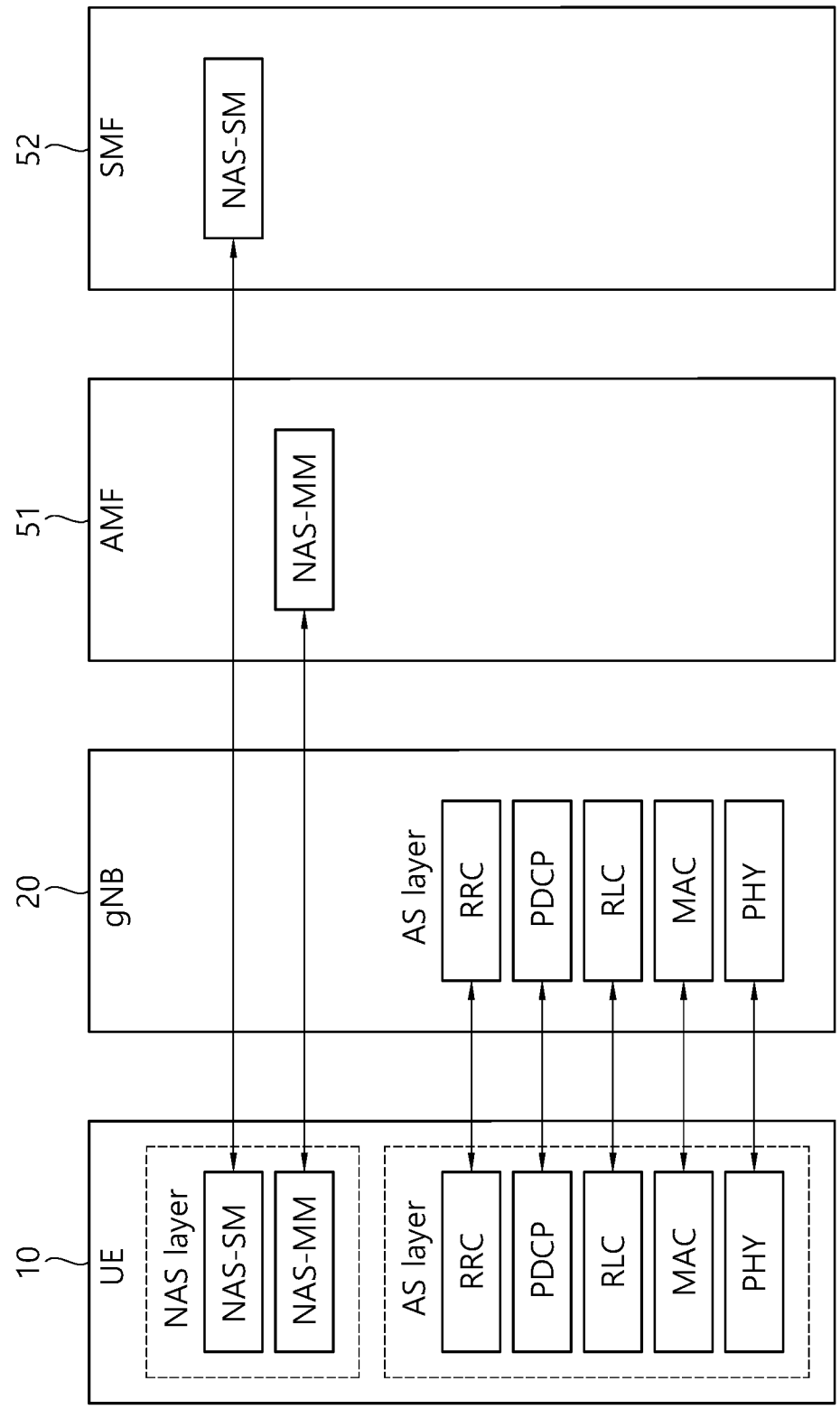
FIG. 4 is another exemplary diagram showing the structure of a radio interface protocol between the UE and the gNB.
Figure 5A:
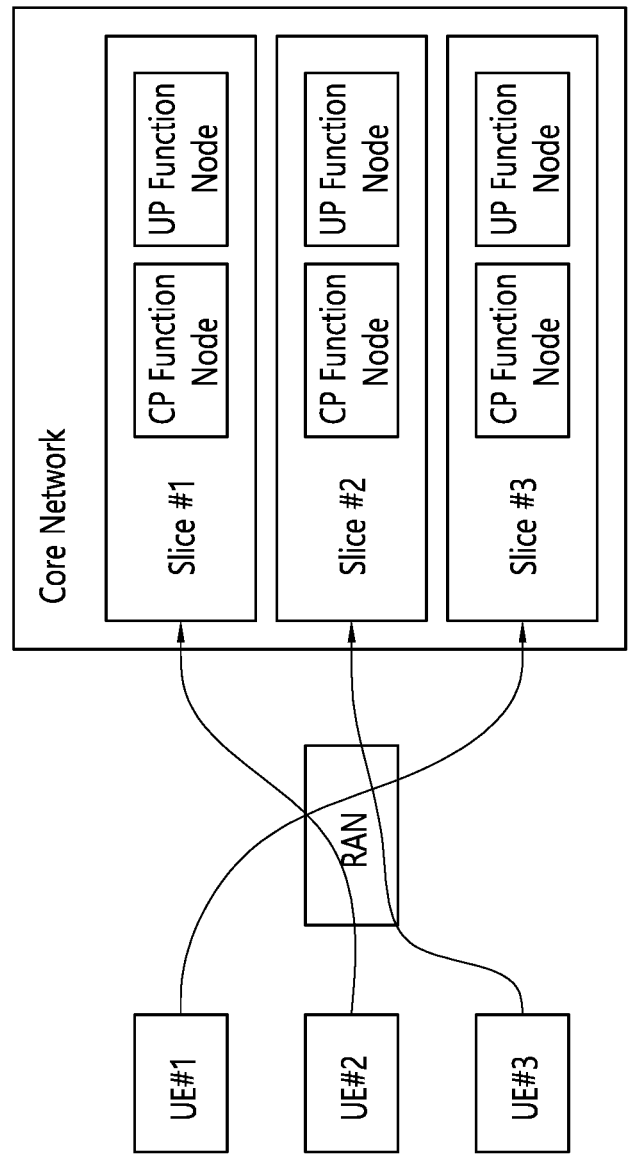
FIG. 5A is an exemplary diagram illustrating an example of an architecture for implementing the concept of network slicing.
Figure 5B:
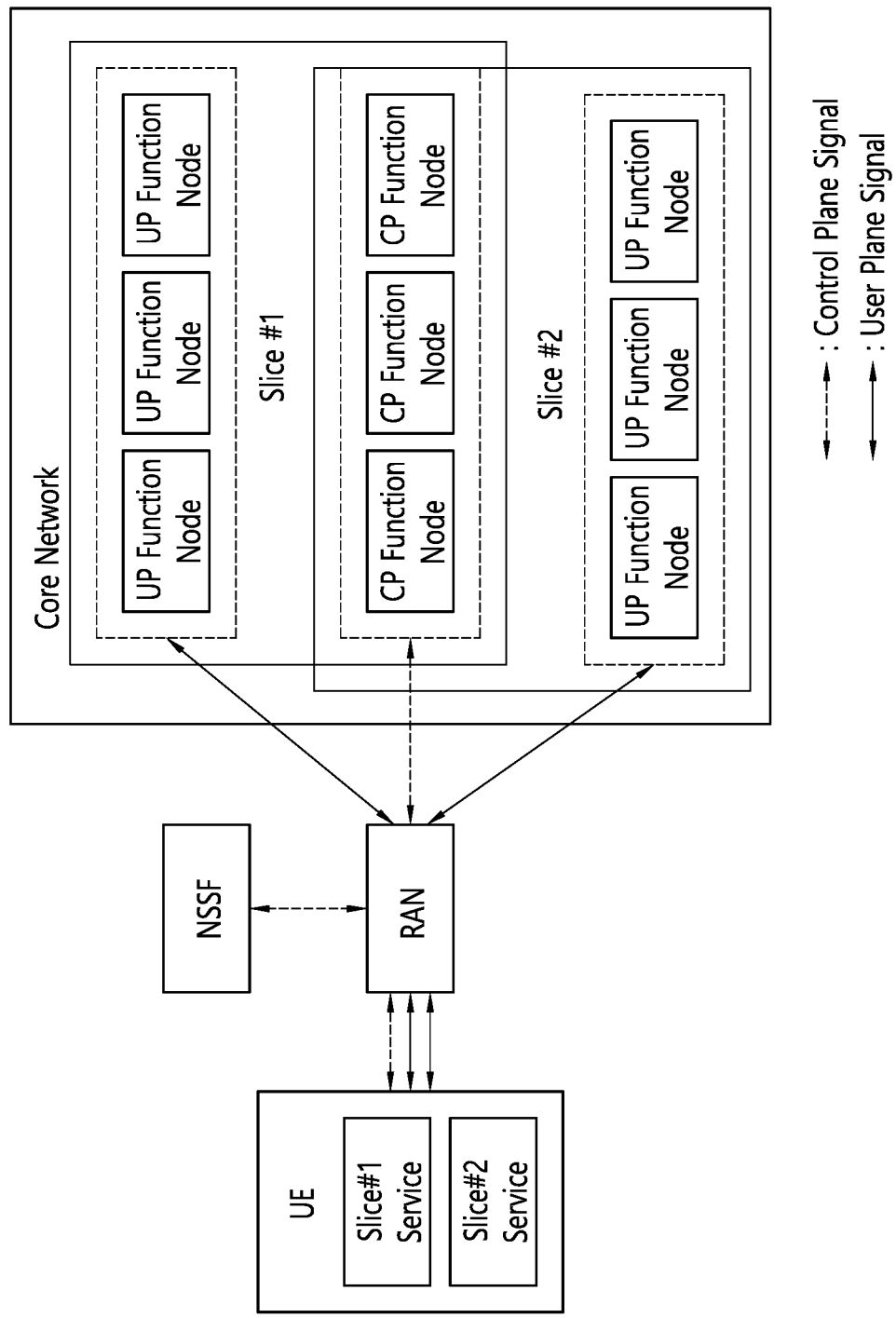
FIG. 5B is an exemplary view showing another example of an architecture for implementing the concept of network slicing.
Figure 6B:
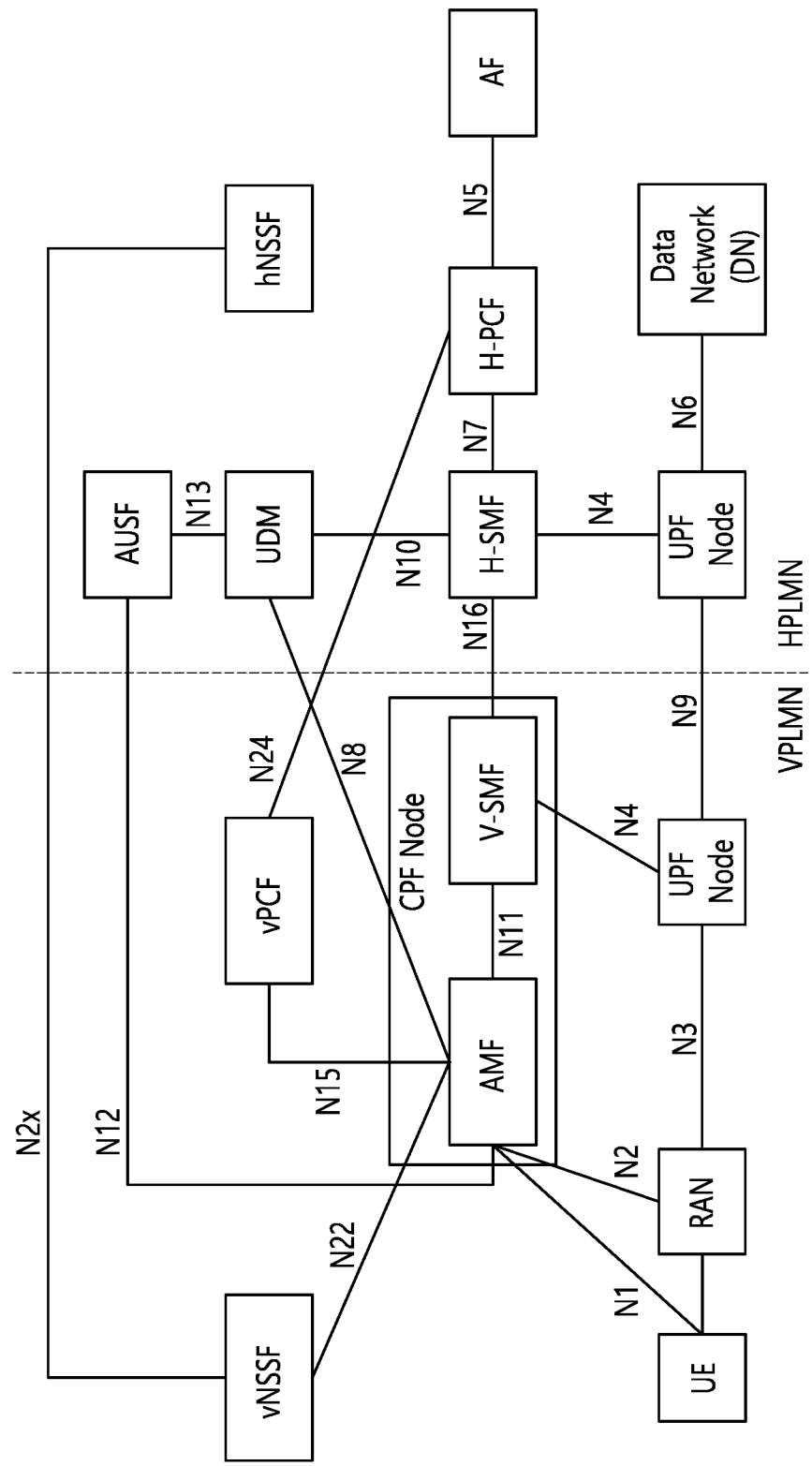
FIG. 6B is a diagram illustrating an example of architecture to which the HR method is applied during roaming.
Figure 7A:
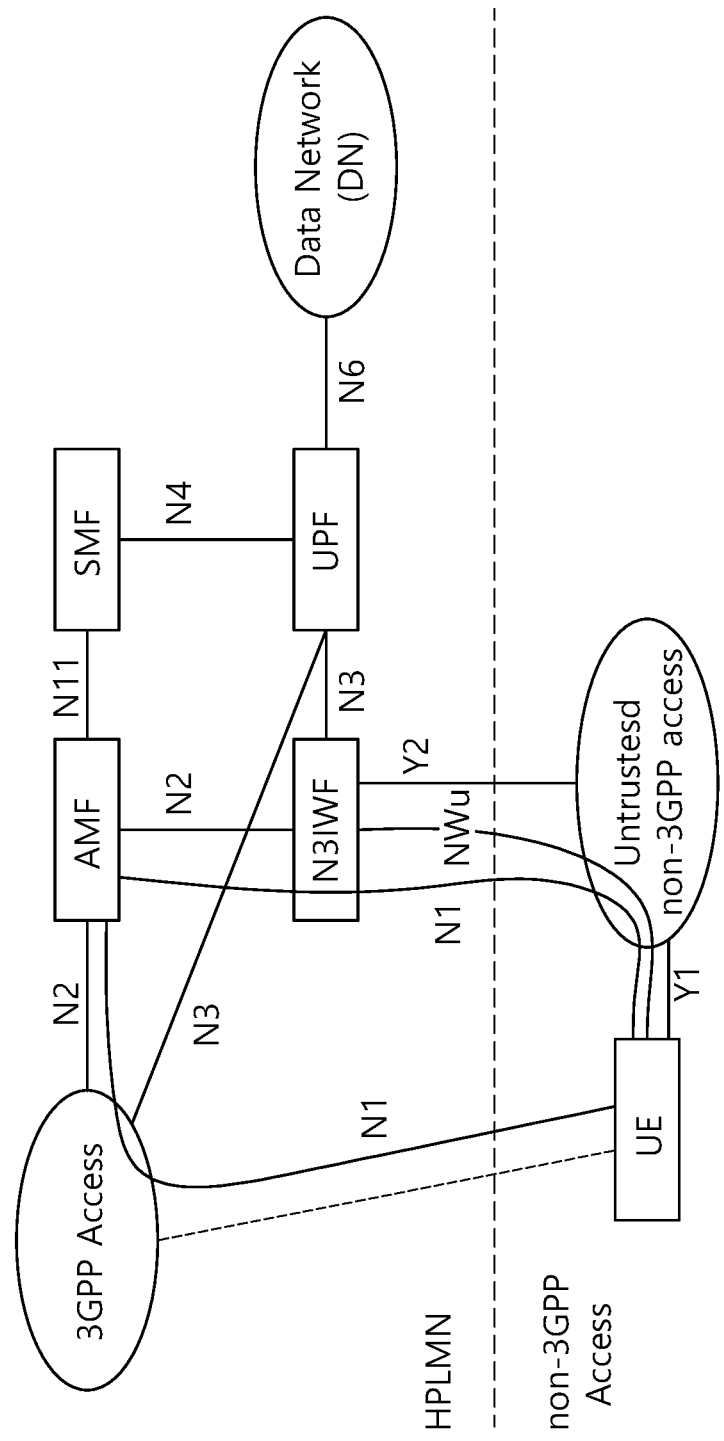
FIGS. 7A to 7F illustrate architectures for offloading data to the non-3GPP network.
Figure 7B:
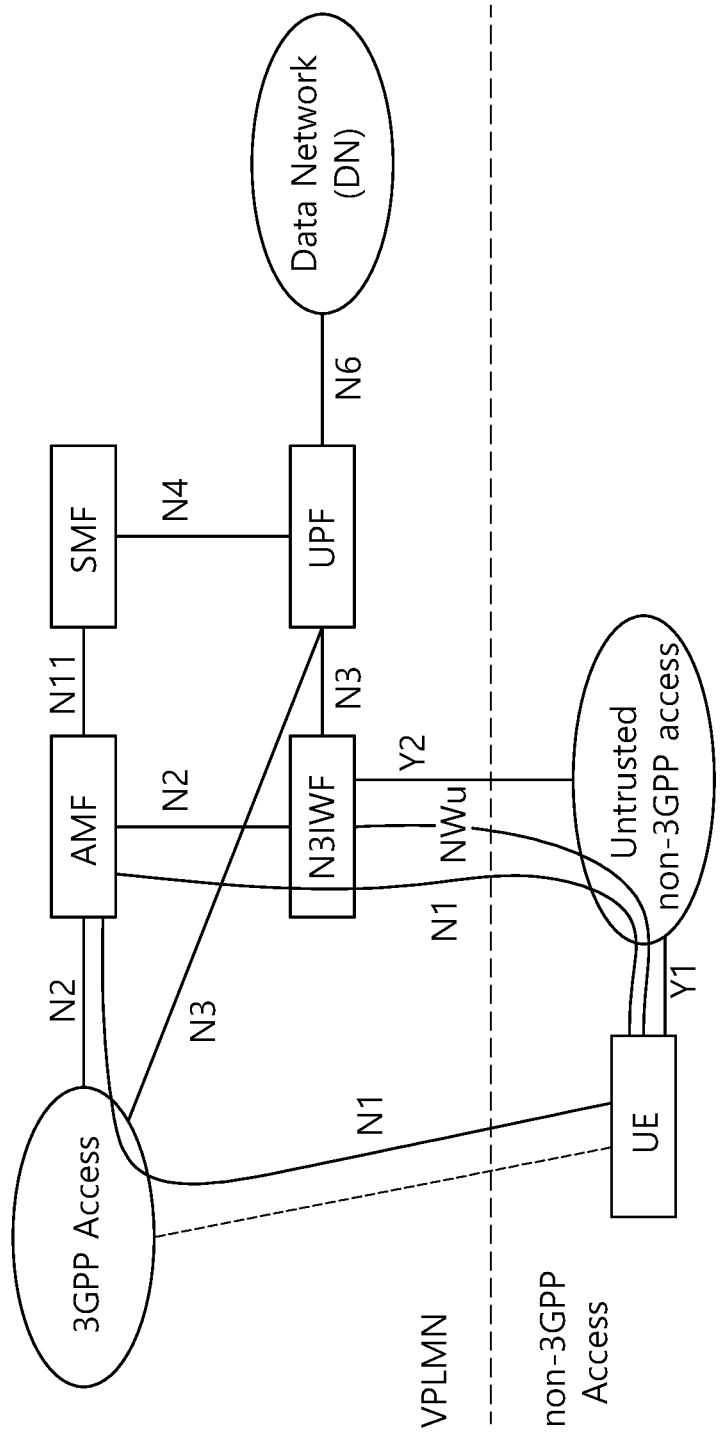
Figure 7C:
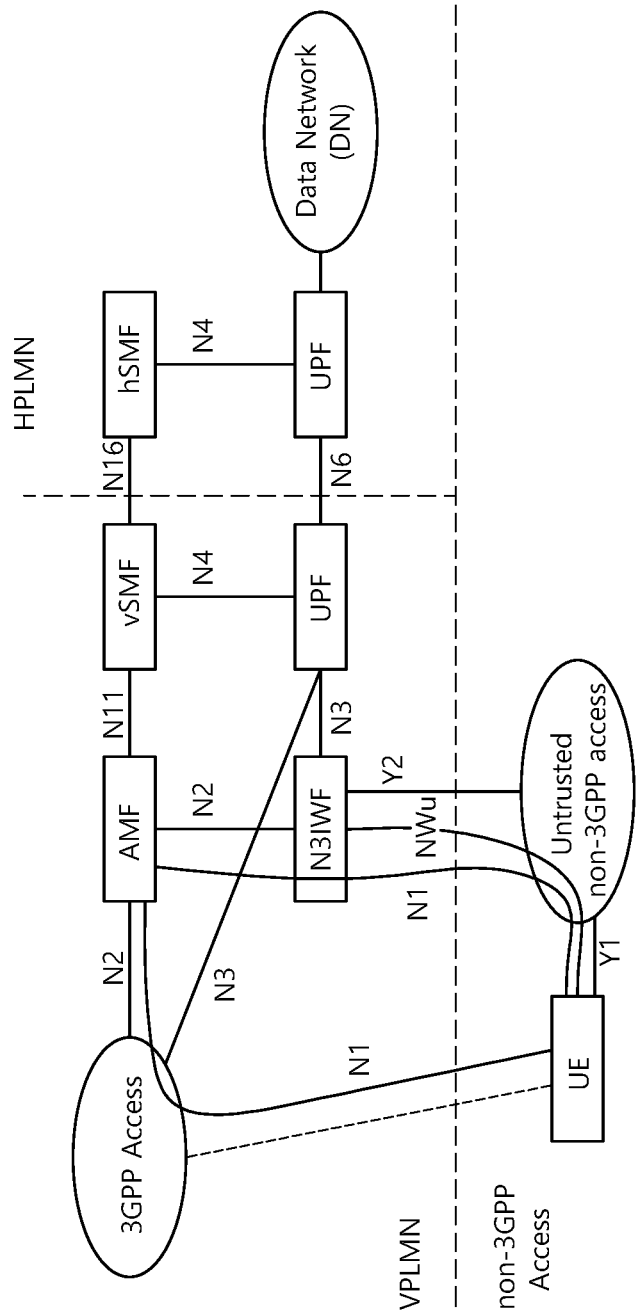
Figure 7D:
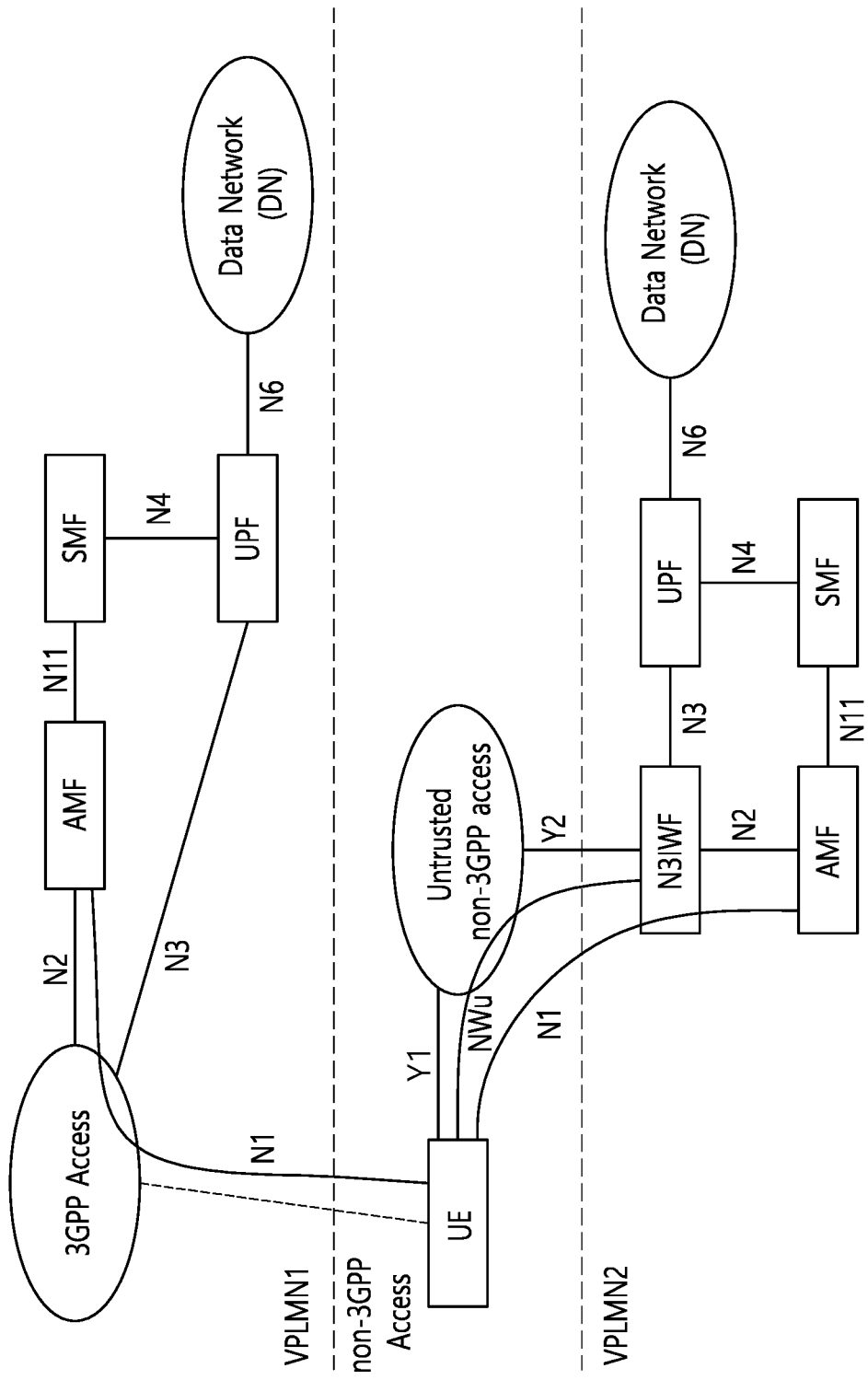
Figure 7E:
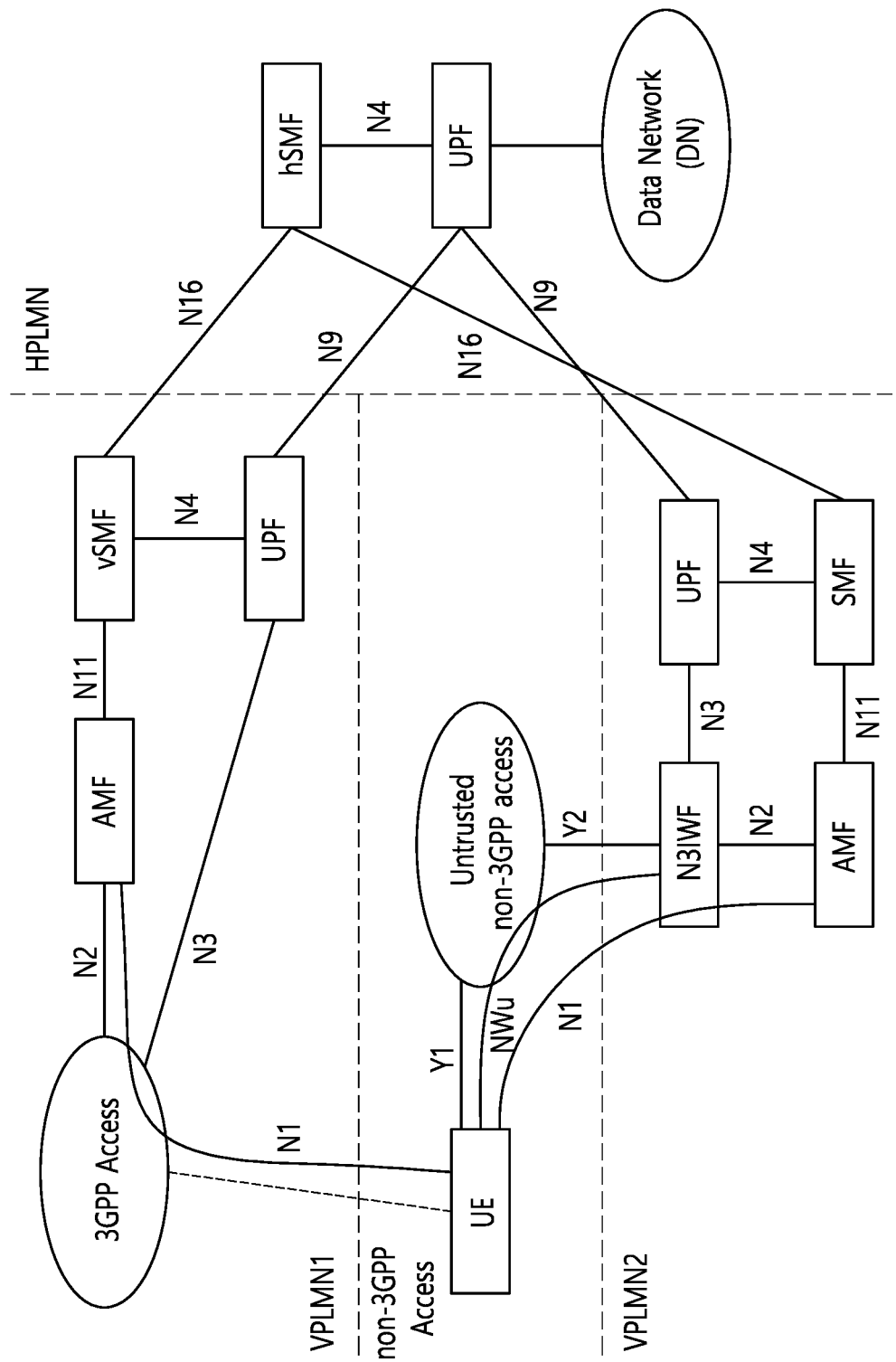
Figure 7F:
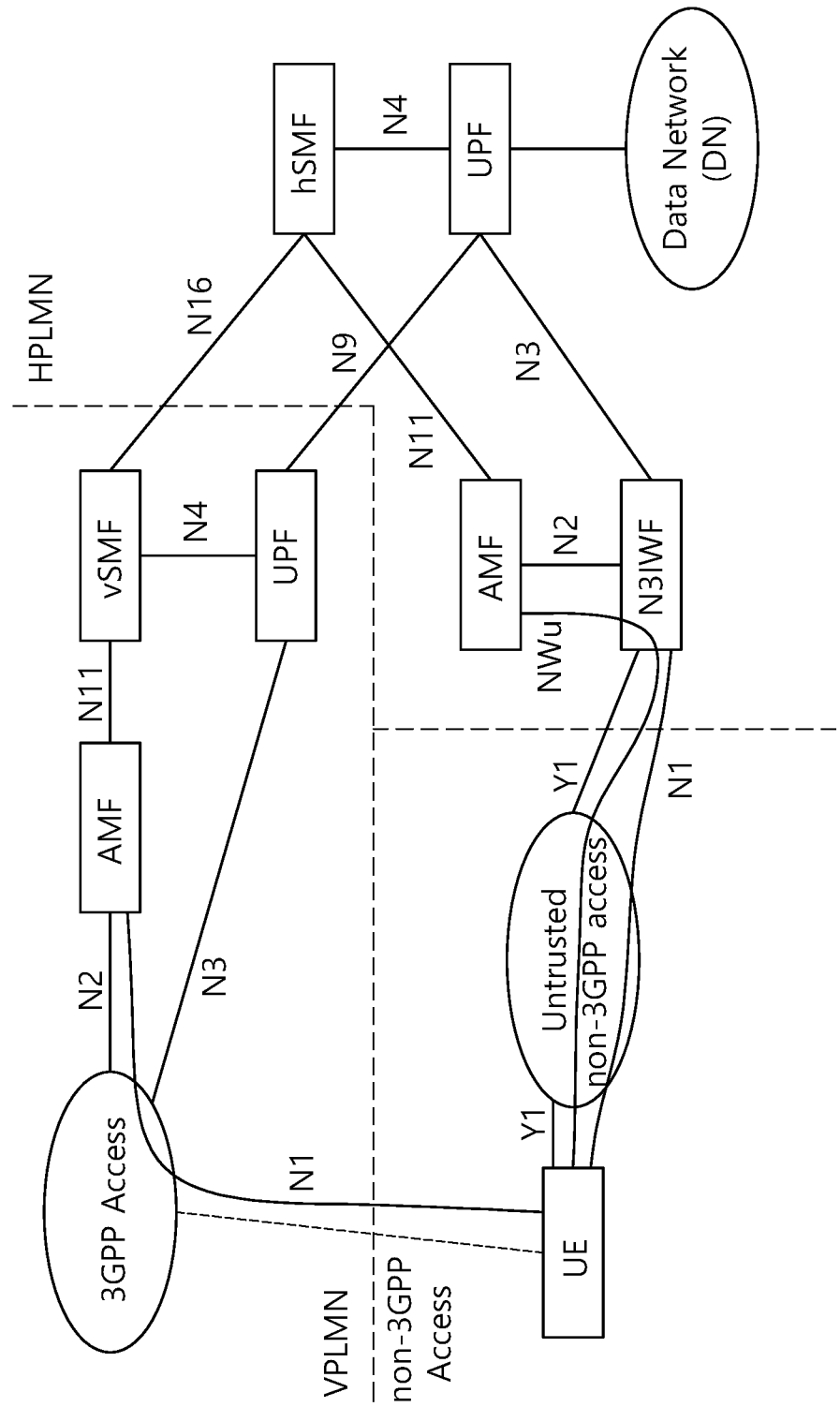

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the disclosure with reference to the accompanying drawings.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A Serving gateway (Serving GW) is a network node of an EPS network which performs functions, such as mobility anchor, packet routing, idle mode packet buffering, and triggering an MME to page UE.

An eNodeB is an eNodeB of an Evolved Packet System (EPS) and is installed outdoors. The cell coverage of the eNodeB corresponds to a macro cell.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

PLMN: as an abbreviation of Public Land Mobile Network, means a network identification number of a mobile communication provider. In roaming case of the UE, the PLMN is classified into a home PLMN (HPLMN) and a visited PLMN (VPLMN).

DNN: as an abbreviation of a data network name, means an access point for management in a network, similarly to an APN, and is provided to a UE. In the 5G system, the DNN is used equivalently as the APN.

NSSP (Network Slice Selection Policy): used by a UE for mapping an application and Session Network Slice Selection Assistance Information (S-NSSAI)

<Session and Service Continuity 22

A new mobile communication network provides various modes to support session and service continuity (SSC).

1) SSC Mode 1

In a protocol data unit (PDU) session establishing process, a UPF operating as a PDU session anchor is maintained regardless of an access technology (that is, an access type and a cell). In the case of an IP-type PDU session, IP continuity is maintained regardless of movement of a UE. SSC Mode 1 may be applied to any PDU session type and also applied to any access type.

2) SSC Mode 2

If a PDU session has a single PDU session anchor, a network may trigger release of the PDU session and instruct a UE to establish the same PDU session. In the new PDU session establishing process, a UE operating as the PDU session anchor may be newly selected. SSC Mode 2 may be applied to any PDU session type and also applied to any access type.

3) SSC Mode 3

In regard to a PDU session for SSC Mode 3, before releasing connectivity between a UE and a previous PDU session anchor, a network may allow connectivity establishment of a UE using a new PDU session with respect to the same data network. If a trigger condition is applied, the network may determine whether to select an appropriate PDU session anchor for the new condition, that is, a UPF. SSC Mode 3 may be applied to any PDU session type and also applied to any access type.

4) SSC Mode Selection

In order to determine a type of SSC mode regarding an application of a UE or an application group of the UE, an SSC mode selection policy may be used.

An operator may provide the UE with the SSC mode selection policy. The policy may include one or more SSC mode selection policy rules.

Figure 8:
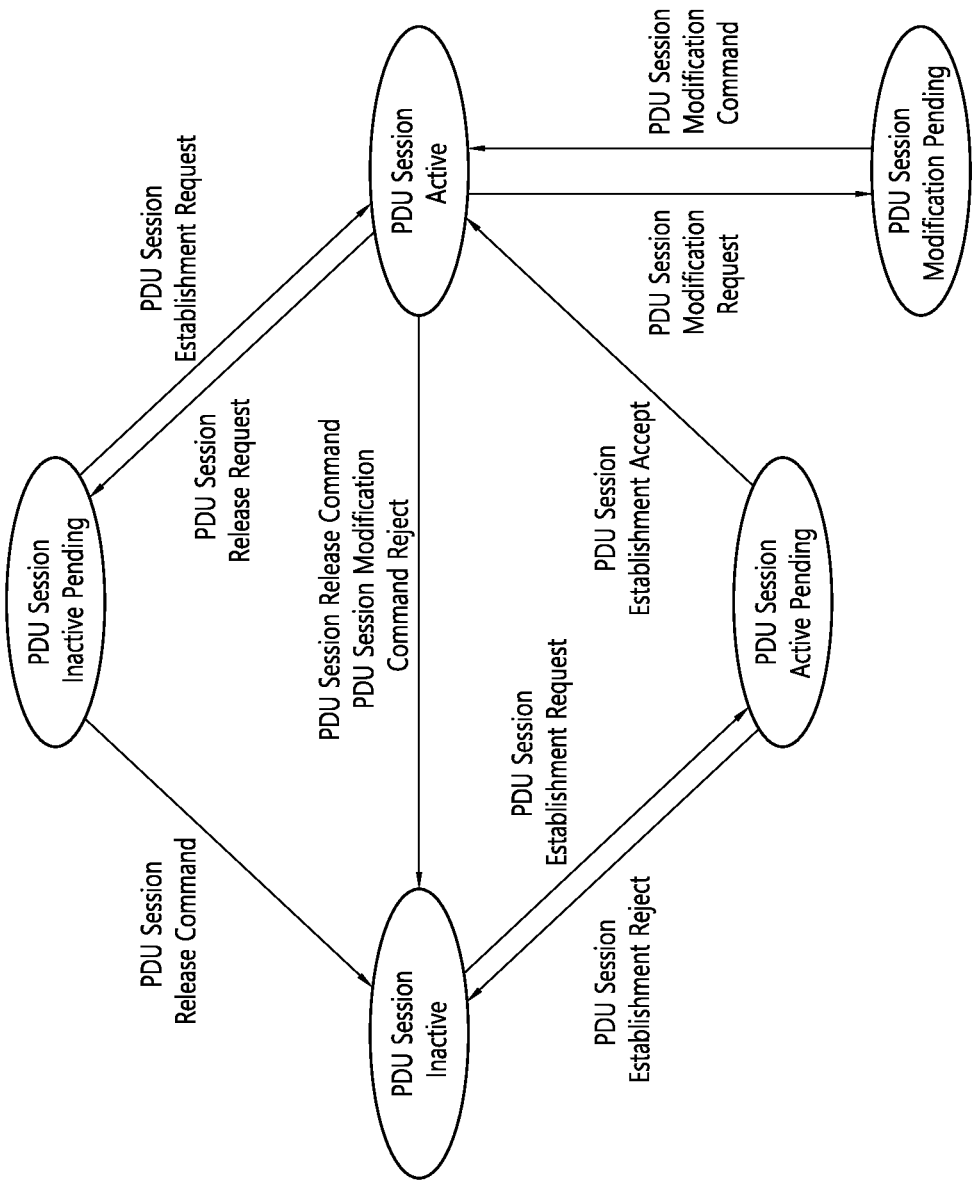
FIG. 8 illustrates the state of a PDU session.

FIG. 8 illustrates the state of a PDU session.

FIG. 8 shows a PDU session active state, a PDU session inactive state, a PUD session inactivation pending state, a PDU session activation pending state, and a PDU session modification pending state.

The PDU session inactive state refers to a state in which no PDU session context exists.

The PDU session activation pending state refers to a state in which a UE is waiting for a response from a network after initiating a PDU session establishment procedure to the network.

The PDU session active state refers to a state in which PDU session context is active in a UE.

The PDU session inactivation pending state refers to a state in which a UE is waiting for a response from a network after initiating a PDU session release procedure.

The PDU session modification pending state refers to a state in which a UE is waiting for a response from a network after initiating a PDU session modification procedure.

<Multi-access (MA) PDU Session>

In a conventional art, an MA PDU session may be generated by bundling two separate PDU sessions established over different accesses.

Figure 9:
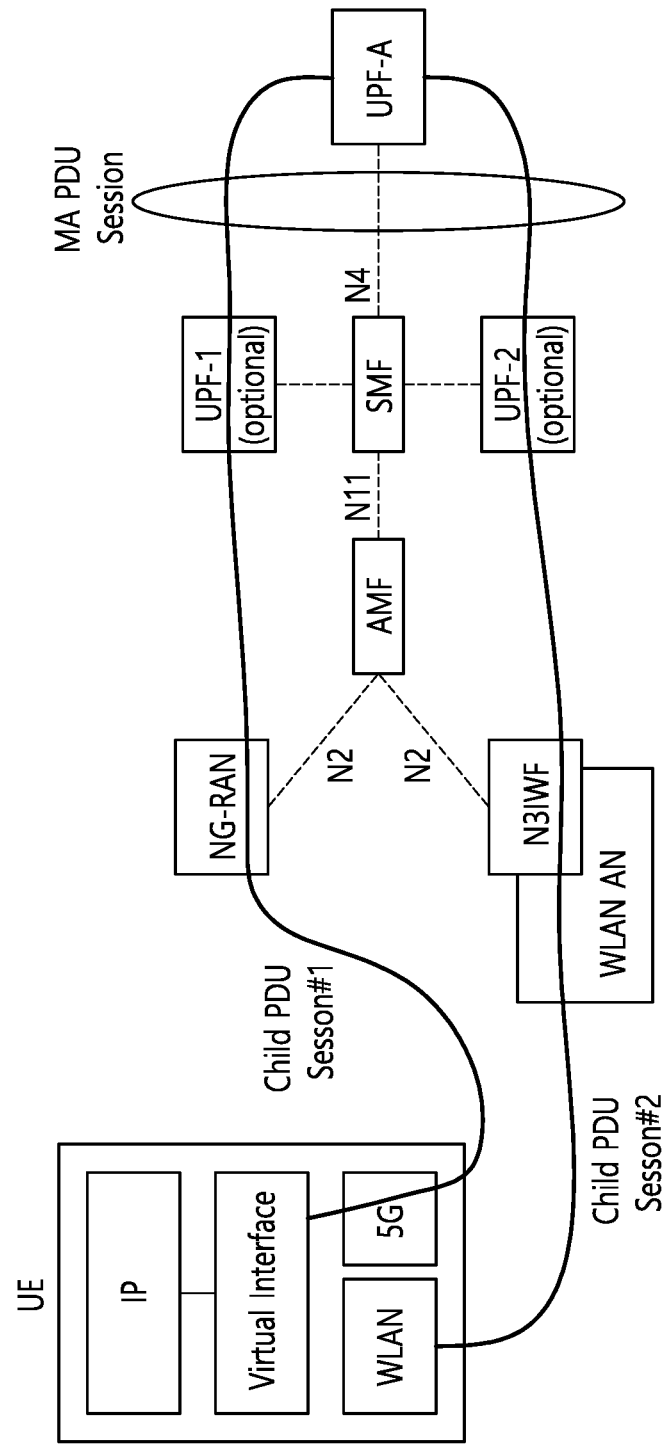
FIG. 9 shows an example in which an MA PDU session is generated according to a conventional art.

FIG. 9 shows an example in which an MA PDU session is generated according to a conventional art.

An MA PDU session includes at least two PDU sessions, referred to as child PDU sessions as shown in FIG. 9. One of the two PDU sessions is established over 3GPP access, and the other PDU session is established over untrusted non-3GPP access (e.g., WLAN AN).

The child PDU sessions of the MA PDU session may share the following characteristics:

(i) a common DNN;
(ii) a common UPF anchor (UPF-A);
(iii) a common PDU type (e.g., IPv6);
(iv) common IP addresses;
(v) a common SSC mode; and
(vi) a common S-NSSAI.

The MA PDU session enables a multi-path data link between a UE and an UPF-A. The MA PDU session may operate below an IP layer.

The MA PDU session may be established through one of the following procedures.

(i) The MA PDU may be established with two separate PDU session establishment procedures. This is called separate establishment.

(ii) The MA PDU may be established with a single MA PDU session establishment procedure. That is, two child PDU sessions are established in parallel. This is called combined establishment.

The child PDU sessions may have the same IP address.

After the MA PDU session is established, Session Management (SM) signaling related to the MA PDU session may be transmitted and received through random access.

A. Separate Establishment of MA PDU Session

The two child PDU sessions may be established through two separate PDU session establishment procedures. For example, the UE may establish a first PDU session over 3GPP access and may then establish a second PDU session over non-3GPP access. The two PDU sessions may be linked to each other and may become child PDU sessions of an MA PDU session.

A linked PDU session may be provided to a 5G Core Network (5GC). The 5GC links the second PDU session with the linked PDU session and designates the two PDU sessions as child PDU sessions of an MA PDU session.

Since the linked PDU session is provided to the 5GC, the UE does not need to request specific values for a DNN, an S-NSSAI, an SSC mode, a PDU type, and the like. The second PDU session may inherit all these values from the linked PDU session.

A request type in an establishment request message for establishment of the second PDU session may be set to "initial request". When the 5GC receives a PDU session establishment request message with the "linked" PDU session and with request type="initial request", the 5GC interprets the message as a request for establishing an MA PDU session and links the requested PDU session to the existing "linked" PDU session. Alternatively, when "initial request" is not appropriate as the request type, a new Request Type may be specified.

B. Combined Establishment

The two child PDU sessions may be established in parallel through a single procedure. This single procedure may be referred to as a UE-requested MA PDU session establishment procedure. This procedure may be useful when the UE intends to establish an MA PDU session while already registered in the 5GC via both accesses. Instead of initiating two separate PDU session establishment procedures, the UE may initiate one MA PDU establishment procedure, thereby establishing two child PDU sessions.

Figure 10:
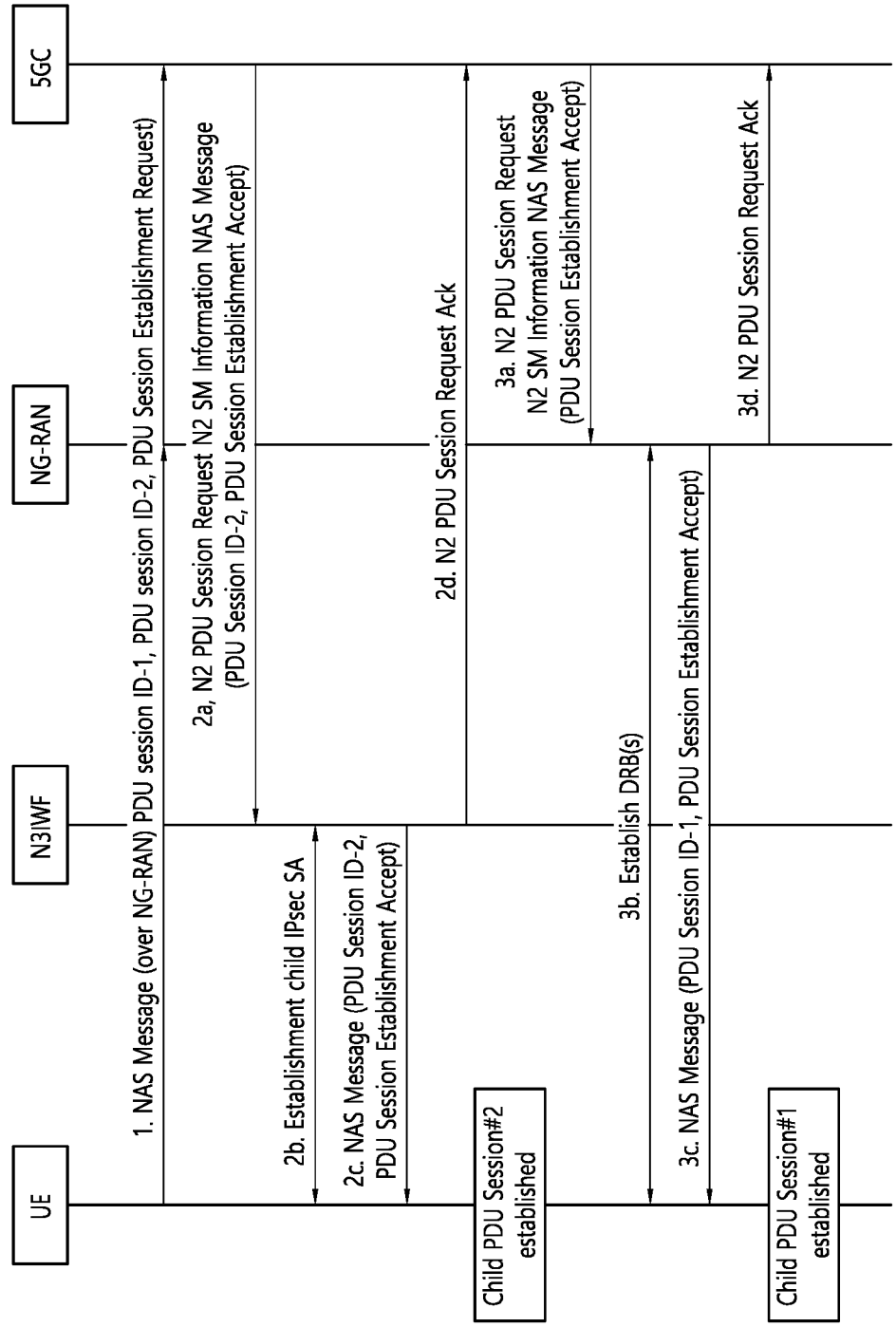
FIG. 10 shows an example of a procedure for combined establishment of an MA PDU session according to a conventional art.

FIG. 10 shows an example of a procedure for combined establishment of an MA PDU session according to a conventional art.

The combined establishment procedure illustrated in FIG. 10 shows a UE-requested MA PDU session establishment procedure. Two child PDU session establishment procedures have different PDU session IDs. In the example shown in FIG. 10, a child PDU session over 3GPP access is indicated by PDU session ID-1, and a child PDU session over non-3GPP access is indicated by PDU session ID-2. An SMF of a 5GC triggers two N2 PDU session establishment procedures. A UE may receive a PDU session establishment acceptance message for PDU session ID-1 over 3GPP access and may receive a PDU session establishment acceptance message for PDU session ID-2 over non-3GPP access. The SMF may anchor both PDU sessions to the same UPF and may allocate the same IP address to both PDU sessions.

<Problems to be Solved Through Disclosures of Specification>

The foregoing combined MA PDU session establishment procedure is a method of bundling PDU sessions over different accesses into an MA PDU session and managing the MA PDU session. To this end, a UE and a network need to separately manage context for a PDU session over each access and context for managing the two PDU sessions together, thus complicating maintenance of the sessions. It is assumed that the UE is registered over 3GPP access and non-3GPP access. However, when one access is unavailable as soon as a combined MA PDU session is established, a method for handling this case has not been studied so far. Further, when one access is unavailable during use of an MA PDU session, a method for managing the MA PDU session has not been studied so far.

<Disclosures of Specification>

Accordingly, an aspect of disclosures of this specification is to provide methods for an SMF to efficiently manage an MA PDU session.

I. First Disclosure

In this specification, an MA PDU session is a PDU session generated with one PDU session stretching across both 3GPP access and non-3GPP access. Accordingly, a UE can use 3GPP access and non-3GPP access in parallel with only one PDU session.

According to selective activation/inactivation criteria for a PDU session, a PDU session may be referred to as being active when user-plane (UP) resources are allocated, and may be referred to as being inactive when there is no user-plane (UP) resource. However, in the case of an MA PDU session generated over both 3GPP access and non-3GPP access, when a user-plane resource in either access is not allocated, the MA PDU may be defined as being in a new state or as being in an active state. In this section, when there is no user-plane resource only in either access, the MA PDU session is defined as being in a new state, for example, a partially active state.

Figure 11:
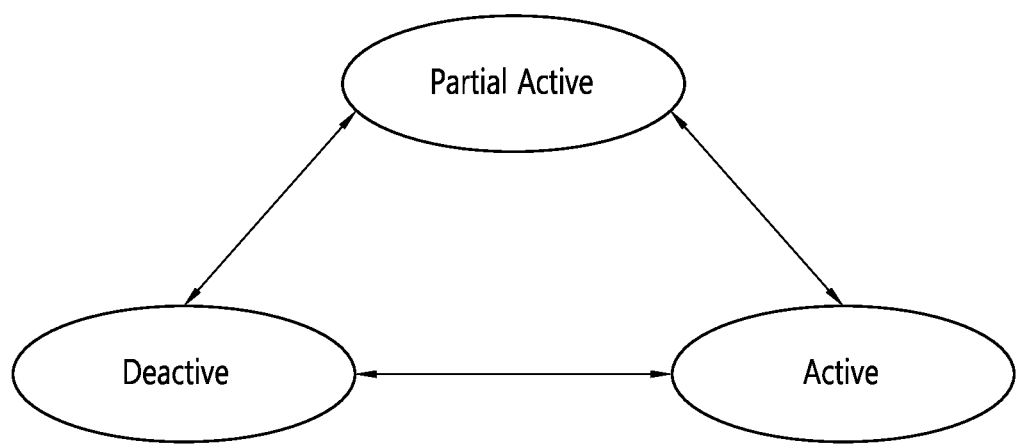
FIG. 11 illustrates states for managing an MA PDU session.

FIG. 11 illustrates states for managing an MA PDU session.

As illustrated in FIG. 11, an MA PDU session may be in any one of three states, which are an active state, an active state, and a partially active state. The MA PDU session may have these states in all of a UE, an SMF, and a PCF.

In the partially active state, access in which a user plane (UP) is generated (or in which a UP has been generated or which corresponds to an RM-REGISTERED state)=enabled and access in which a UP is not generated (or in which a UP has not been generated or which corresponds to an RM-DEREGISTERED state)=disabled may be additionally stored.

Alternatively, when a UP is generated (or a UP has been generated) for at least one access, the MA PPD session may be considered active, and information about enabled access and disabled access may be additionally stored.

Figure 12:
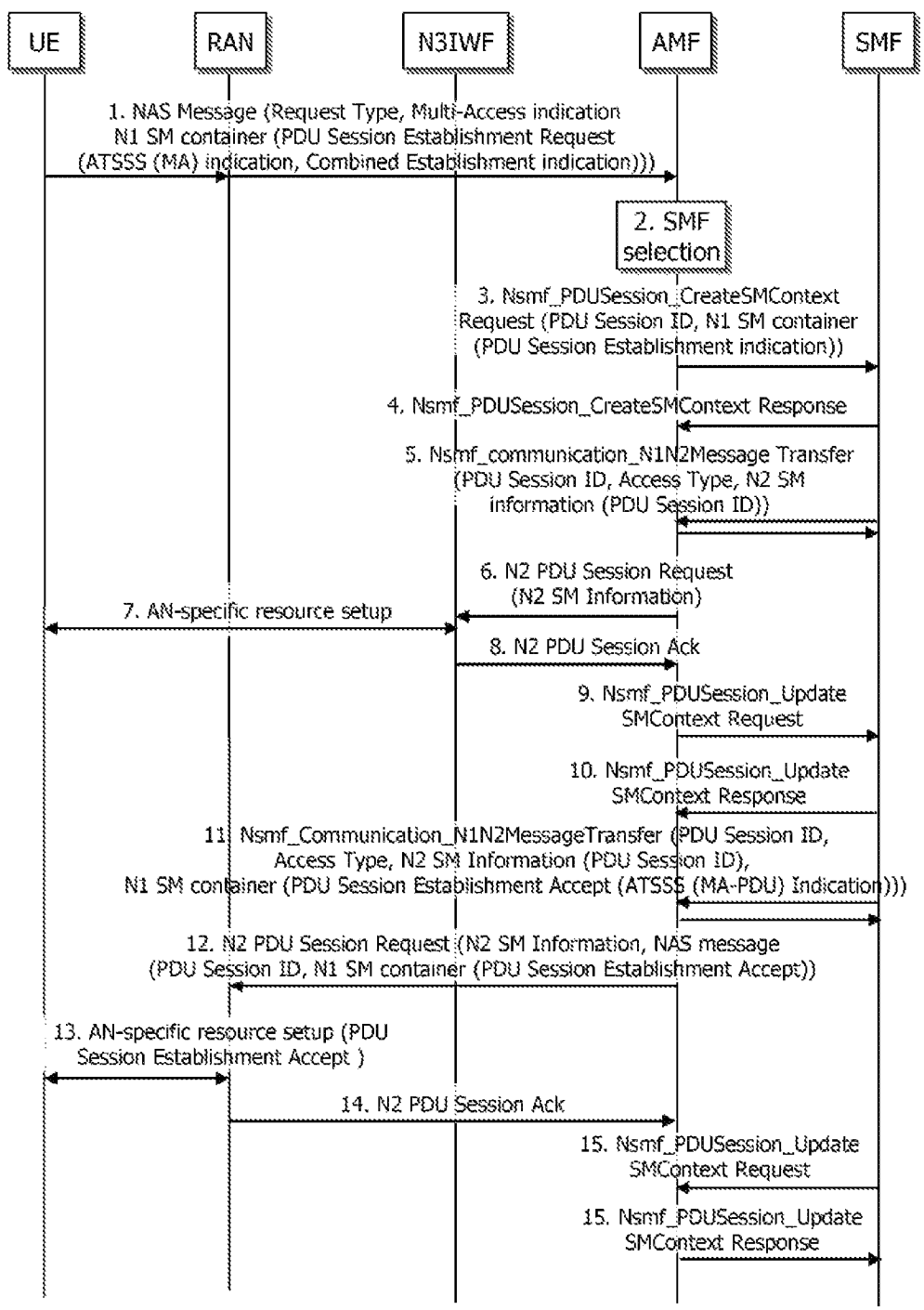
FIG. 12 is a flowchart illustrating an improved procedure for combined establishment of an MA PDU session according to a disclosure of the present specification.

FIG. 12 is a flowchart illustrating an improved procedure for combined establishment of an MA PDU session according to a disclosure of the present specification.

First, a UE assumes that both 3GPP access and non-3GPP access are registered in the same PLMN.

1) To perform a combined establishment procedure, the UE may transmit a PDU session establishment request message including an Access Traffic Steering, Switching and Splitting (ATSSS) indication/information (and/or MA indication) and a combined session establishment request indication. The MA indication is also included in an NAS message including the PDU session establishment request message, thereby notifying an AMF of a request for an MA PDU session.

2) The AMF generates context of the PDU session based on the MA indication of the MM NAS message transmitted by the UE and stores an access type as all accesses or MA. When selecting an SMF, the AMF selects an SMF supporting an MA PDU session based on the MA indication transmitted by the UE.

3-4) The AMF transmits the PDU session establishment request message to the SMF and also forwards information about whether the UE is registered via both 3GPP access/non-3GPP access. The information may indicate that the UE is registered via both accesses or may indicate that the UE is registered via only one access (via which access the UE is registered). The information may be either explicitly or implicitly forwarded to the SMF. Here, since access signaled by the UE is access to which the UE has already connected, the AMF may forward only information about the other access. In addition, the AMF may notify the SMF of not only a registered state but also an idle/connected state. When the UE is registered via non-3GPP access but is in the idle state, user plane setup cannot be performed, in which case the SMF does not transmit a UP resource setup request for non-3GPP.

The AMF may also transmit allowed NSSAI for each access to the SMF. Alternatively, the AMF may forward, to the SMF, information about whether S-NSSAI forwarded by the UE along with the PDU session establishment request is included in allowed NSSAI for both accesses. The SMF may accept the MA PDU establishment request only when the allowed NSSAI for both accesses includes the S-NSSAI forwarded by the UE based on the information. Alternatively, the AMF may directly determine to reject the request from the UE only when the S-NSSAI forwarded by the UE is not included in the allowed NSSAI for both accesses. In a case where the UE has been registered via only one access, when the UE is registered through the other access, the AMF identifies whether the S-NSSAI of the MA PDU session is included in allowed NSSAI for the other access. When the S-NSSAI of the MA PDU session is not included in the allowed NSSAI for the other access, the AMF may request the SMF to release the MA PDU session. In this case, the AMF may forward a cause value or indication indicating that the allowed NSSAI is not allowed for both accesses. Upon receiving the cause value or indication, the SMF may perform a procedure for releasing the MA PDU session or changing the MA PDU session to a normal PDU session (single-access PDU session) used only via access for which the S-NSSAI is allowed. When changing the MA PDU session to a normal PDU session, the SMF may perform a PDU session modification or PDU session release procedure. Regardless of the procedure to be performed, the SMF transmits, to the UE, a PDU session modification command/PDU session release command message including a cause value or indication indicating that the MA PDU session has been changed to the normal PDU session and indicates access over which the PDU session is allocated to the UE. Here, the SMF may indicate to the AMF that the MA PDU session has been changed to the normal PDU session using a Namf_PDU session_SMContextStatusNotify service or a different service. Further, the SMF may forward an access type indicating access through which the PDU session is generated. Upon receiving the access type, the AMF may update the access type of the MA PDU session based on both of the two accesses or the access type (3GPP access or non-3GPP access) indicated by the SMF. This operation may be performed for different reasons, e.g., when the UE has been registered over one access to generate an MA PDU session but is registered through a different PLMN over the other access, when S-NSSAI of an MA PDU session has been included in the allowed NSSAI for both accesses but S-NSSAI of the MA PDU session over one access is excluded from the allowed NSSAI due to mobility of the UE, when subscription information of the UE is updated (which is triggered by the SMF), or when a policy is updated by an operator or PCF and thus does not allow the MA PDU session any more.

5-10) The SMF performs combined session establishment based on the MA indication and the combined session establishment indication transmitted by the UE. The SMF performs a combined session establishment procedure only when the UE is registered over both accesses according to the information transmitted by the AMF. First, the SMF transmits an N2 SM message over access (e.g., 3GPP access) signaled by the UE and the other access (e.g., non-3GPP access), thereby allocating a user-plane resource (i.e., N3 resource). Here, the SMF may determine, based on the operator's policy, whether to first transmit the N2 SM message over one access or to simultaneously transmit the N2 SM message over both accesses in order to perform the procedure for allocating the user-plane resource. Generally, a PDU session acceptance message transmitted to the UE includes a QoS rule, and assuming that the QoS rule is available for both accesses, it is desirable to transmit the QoS rule to the UE after a QoS is set up for both accesses. Further, since transmissions of the N2 SM message and an NAS PDU session acceptance message are generally performed together by one N1N2MessageTransfer, a user plane may be set up over the opposite access and a QoS rule may be determined based on the user plane actually set up. In addition, when allocating user-plane resources over both accesses in parallel, the UE cannot identify access over which a user-plane resource is being allocated after receiving the PDU session establishment acceptance message and may thus autonomously perform a subsequent operation for allocating a user-plane resource (e.g., a PDU session establishment request or service request). In this case, the UE may transmit an unnecessary signal even though a user-plane resource allocation procedure is in progress in a network. To prevent this situation, the SMF may indicate access (e.g., both accesses, only 3GPP access, or only non-3GPP access) over which a user-plane resource is successfully allocated through an indication in the PDU session establishment acceptance message. Here, when a user-plane resource is allocated over only one access, the SMF may indicate the reason why the user-plane resource is allocated over only one access to the UE through a cause value or the like. For example, a user-plane resource may not be allocated because there is congestion in one access or when an MM procedure, such as a registration/service request, is in progress. Accordingly, the SMF first needs to perform a user-plane resource allocation procedure over access other than access for which the UE transmits a request message. The UE may determine when to request user-plane resource allocation over the other access based on the indication and the cause value received through the acceptance message.

Alternatively, even though the UE is registered over only one access, the SMF may perform a combined session establishment procedure. In this case, the SMF transmits the N2 SM message only over the access over which the UE is registered, thereby allocating a user-plane resource.

11-16) After the user-plane resource is successfully set up according to the foregoing processes 5-10, the SMF performs a process for allocating a user-plane resource through the access signaled by the UE. Here, the SMF also indicates to the UE that the MA PDU session has been successfully generated.

When the SMF fails to generate the user-plane resource over the access according to the foregoing processes 5-10 or when the UE is not registered over one access and thus the SMF does not attempt to generate a user-plane resource over access, the SMF manages the state of the MA PDU session as illustrated in FIG. 11. Further, in this case, the SMF indicates that the MA PDU session is successfully generated by transmitting a PDU session establishment acceptance message to the UE and indicates the access over which the user-plane resource is completely allocated (or indicates access over which no user-plane resource is allocated). Upon receiving the PDU session establishment acceptance message, the UE manages the state of the MA PDU session as illustrated in FIG. 11. When the UE is not registered over access over which no user-plane resource is allocated, the PDU session establishment acceptance message may enable the UE to recognize that the UE is not registered over the access over which no user-plane resource is allocated through separate or implicit information. When receiving a request for an MA PDU session, the SMF may transmit a PDU session acceptance message to the UE without any additional indication or cause value when accepting the request. In this case, when receiving no separate indication from the SMF and receiving an indication that a user plane is set up for the PDU session over both accesses from a lower layer (e.g., it is recognized that an AS layer has been generated in 3GPP access and a default IPsec tunnel has been generated in non-3GPP access), the UE may recognize that the request for the MA PDU session has been successful. Further, when recognizing that a user plane has been set up over only one access, the UE manages the state of the MA PDU session as illustrated in FIG. 11. When the SMF receives a request for an MA PDU session but allows the MA PDU session only as a normal PDU session (i.e., handles the request as a PDU session request for specific access), the SMF may transmit a PDU session acceptance message and may indicate that the MA PDU session is a normal PDU session rather than an MA PDU session through a cause value or indication. Alternatively, the SMF may transmit an indication only when the MA PDU session is allowed, and may not include an indication when the MA PDU session is allowed as a normal PDU session, thereby indicating the usage of the generated PDU session. When the MA PDU session is accepted as a normal PDU session, the SMF may also indicate access over which the PDU session has been generated. When there is no separate access information, the UE may recognize that a normal PDU session has been generated through access over which the acceptance message has been received.

When it is determined that the UE is registered over both accesses, a user-plane resource cannot be allocated over specific access for the following reasons.
- When the UE is in a CM-IDLE state over non-3GPP access and thus it is impossible to allocate a user-plane resource (in most cases, a UE in the CM-IDLE state over non-3GPP access may be in a state of being out of the coverage of non-3GPP access. Thus, the UE is not reachable, and accordingly it is impossible to allocate a user-plane resource).
- When the UE considers that the UE is registered over both accesses but a network has implicitly deregistered one random access
- When one access has congestion or insufficient radio resources and thus it is impossible to allocate a user-plane resource
- When an MM procedure, such as registration/service request, is in progress over one access The SMF may perform a session management policy establishment procedure with the PCF. Here, the SMF may provide information indicating that the generated PDU session is an MA PDU session and state information about the PDU session (the states illustrated in FIG. 11 and/or the enabled/disabled state of each access) to the PCF. When the PCF performs an operation of generating a traffic steering rule for the MA PDU session, the PCF may configure the traffic steering rule such that traffic is not routed over disabled access or disabled access has a lower priority than enabled access when selected as access over which traffic is routed. When the UE performs an operation of generating a traffic steering rule for the MA PDU session, the UE may configure the traffic steering rule such that traffic is not routed over disabled access or disabled access has a lower priority than enabled access when selected as access over which traffic is routed.

Similarly, when specific access is disabled with the traffic steering rule transmitted to a UPF, the SMF may transmit an indication or may update the traffic steering rule so as not to perform traffic steering over the access. This is because the UPF may not know access over which a user plane is set up. For example, when there is an additional UPF between an AN node and a PDU Session Anchor (PSA) UPF and there is no user plane for the access, the SMF can release only a connection between the AN node and the additional UPF. The SMF may not release a connection between the additional UPF and the PSA. In this case, the PSA performing ATSSS does not recognize whether a user plane is set up. Therefore, the SMF needs to directly indicate corresponding information to the PSA. In order to prevent such signaling, in the case of an MA PDU, the SMF may also always release the additional UPF when releasing a user plane over specific access. In this case, when the additional UPF need to be configured between the AN node and the PSA when setting up the user plane, more signaling may occur.

When a user plane is not allocated in the successfully generated MA PDU session (or in the disabled state), the UE may request user plane allocation through a registration/service request over the access. When the UE is temporarily deregistered from one access and then performs registration, the AMF may report the registration of the UE to the SMF, and the SMF may allocate a user-plane resource for the access. To this end, the SMF may request a notification service of reporting an event from the AMF when the UE is registered or is connected over access in which a user plane resource is not allocated while generating a PDU session. When the UE is registered or is connected, the AMF reports to the SMF that the UE is registered or is connected based on the notification service requested by the SMF. When the UE performs registration or performs a service request procedure, the UE may forward information indicating that the UE wants to activate the MA PDU session. Accordingly, the AMF may report to the SMF serving the PDU session that the PDU session needs to be activated over access which has been released or over which a service request has been performed. Subsequently, the SMF performs an operation of allocating a user-plane resource for the access.

When the UE performs a service request, the UE may use a list of PDU sessions to be activated in order to request activation of the MA PDU session. The AMF may request activation of the PDU session from the SMF based on the list. Generally, it is possible to activate only a PDU session for corresponding access. That is, when a service request message is transmitted through 3GPP access, it is possible to request activation of only a PDU session for 3GPP access. On the contrary, when a service request message is transmitted through non-3GPP access, it is possible to request activation of only a PDU session for non-3GPP access. However, since the MA PDU session is not a PDU session for specific access, it is possible to request activation of the PDU session regardless of access. In this case, when receiving a request for activation of a user plane from the AMF, the SMF can set up user planes for both accesses. Here, the SMF can set up a user plane only for access over which the UE is registered based on registration information from the AMF. Alternatively, the AMF may report setup of a user plane and may also report information about access for which the user plane is set up. That is, when the UE is registered over only one access, the AMF may forward access information to the access, thereby requesting setup of a user plane for the access. When the UE is registered over both accesses, the AMF may forward both accesses or multiple accesses, thereby requesting setup of user planes for both accesses. The SMF sets up a user plane only for access for which a user plane is not set up based on the information forwarded by the AMF.

When performing a registration request procedure, the UE may use the list of PDU sessions to be activated. Generally, the list of PDU sessions to be activated is included only in mobility registration or periodic registration. However, according to a disclosure of the present specification, in the case of an MA PDU session, it is possible to request activation of the PDU session through the list of PDU sessions to be activated in an initial registration procedure. For example, when successfully generating an MA PDU with registered over only 3GPP access, the UE may request PDU session activation for the MA PDU at the same time as performing initial registration over non-3GPP access. In this case, the AMF may forward the PDU session activation request for the MA PDU to the SMF only when the registration is successful.

The list of PDU sessions to be activated may be used to request allocation of a user-plane resource only for corresponding access rather than being used to request allocation of all user-plane resources for both accesses as in the above operation. In this case, the SMF allocates a user-plane resource only for access requested by the UE based on the list of PDU sessions to be activated. Separately, a new indication may be added to request allocation of all user-plane resources for both accesses. In this case, the UE determines which indication to use according to desired access for which a user-plane resource is allocated. Accordingly, when traffic needs to be transmitted over only one access, it is not necessary to allocate resources for both accesses, thus efficiently using resources (e.g., GBR QoS flow).

When the SMF successfully allocates a user-plane resource for disabled access, the disabled access is switched to the enabled state. When the state of the MA PDU session is managed as the partially active state, the state of the MA PDU session is updated to the active state. In order to indicate information about the state change to the PCF, the SMF may perform a session management policy modification operation with the PCF. When the PCF performs an operation of generating a traffic steering rule for the MA PDU session, the PCF may configure the traffic steering rule such that traffic is routed over enabled access or enabled access has a higher priority than access that was originally enabled when selected as access over which traffic is routed. The traffic steering rule may be generated for the MA PDU session such that traffic is routed over access when a user plane is activated for the access that was disabled. Alternatively, the traffic steering rule may configure a priority such that access over which traffic is routed is preferentially selected.

Similarly, when specific access is enabled with the traffic steering rule transmitted to the UPF, the SMF may transmit an indication or may update the traffic steering rule so as not to perform traffic steering over the access.

When the UE is registered over both 3GPP and non-3GPP, the UE transmits the PDU session establishment request message is transmitted through 3GPP access. Otherwise, when the UE is idle over 3GPP access, the AMF may need to transmit a paging signal to the UE in order to set up a user plane. Therefore, in order to reduce use of resources for the paging signal, the UE may transmit a PDU session establishment request over 3GPP access. When the UE is idle over 3GPP access, the UE may first perform a service request procedure and may then transmit the PDU session establishment request.

Generally, the AMF transmits a release request message to the SMF in order to release a PDU session generated through access from which deregistration needs to be performed. When deregistration from one access occurs while the MA PDU session is being used, the AMF reports to the SMF managing the MA PDU session that deregistration from the specific access has occurred. In this case, the SMF may perform one of the following operations based on an operator policy, a reason for the deregistration, and the like.

The SMF changes the MA PDU session to a normal PDU session, and releases a user-plane resource for deregistered access if the user-plane resource is allocated. In this case, the SMF reports to the AMF that the PDU session has been changed to the normal PDU session. Then, the AMF changes the access type of the PDU session to both accesses or to either 3GPP access or non-3GPP access. In addition, the SMF may also report to the PCF that the PDU session has been changed to the normal PDU session. The SMF also forwards the same information to the UE. For example, the SMF may report that the PDU session has been changed to the normal PDU session while performing a modification procedure for the PDU session. Then, the UE deletes all rules related to ATSSS. Alternatively, when the SMF deletes all rules related to ATSSS, the UE may recognize that the PDU session has been changed to the normal PDU session.

The SMF changes the state of the PDU session as shown in FIG. 11 while maintaining the MA PDU session as the MA PDU session. The SMF releases a user-plane resource for deregistered access if the user-plane resource is allocated. In addition, the SMF may also report a change in the state of the PDU session to the PCF.

When the PCF generates/updates a traffic steering rule for the MA PDU session:

i) The PCF may generate/configure the traffic steering rule such that traffic is not routed over access deregistered with respect to the PDU session which is changed to the normal PDU session or the deregistered access has a lower priority in the traffic steering rule than registered access when selected as access over which the traffic is routed.

ii) If the SMF maintains the MA PDU session as the MA PDU session, the PCF may generate/configure the traffic steering rule such that traffic is not routed over disabled access or the disabled access has a lower priority in the traffic steering rule than enabled access when selected as access over which the traffic is routed.

The UE also manages the PDU session by changing the state of the PDU session in response to the operation performed by the SMF.

When the UE performs an operation of generating a traffic steering rule for the MA PDU session, the UE may perform the above operations i) and ii) according to the changed state of the PDU session.

Figure 13:
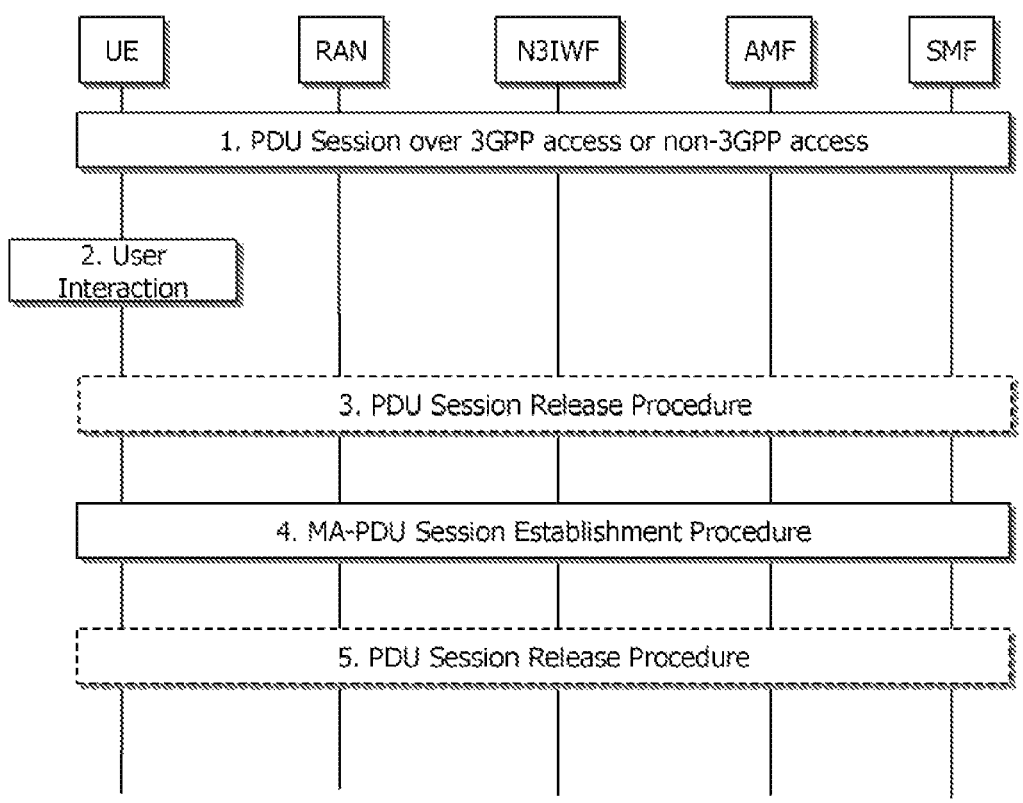
FIG. 13 is an exemplary diagram illustrating an interaction with a user for establishment of an MA PDU session, which is improved according to the disclosure of the present specification, and a release of an existing PDU session.

FIG. 13 is an exemplary diagram illustrating an interaction with a user for establishment of an MA PDU session, which is improved according to the disclosure of the present specification, and a release of an existing PDU session.

1) The UE is performing communication through a normal PDU session using any one of 3GPP access and non-3GPP access.

2) The UE may perform user interaction on whether to use the MA PDU session. That is, the UE may display a screen for receiving an input of whether to use the MA PDU session on the display and receive an input from the user.

3) The UE may perform a procedure for releasing the normal PDU session.

4) If the input received from the user is to use the MA PDU session, the UE performs the procedure of establishing the MA PDU session. If the normal PDU session is released in step 3 above, the UE may create the MA-PDU session based on the same attribute with an attribute of the normal PDU session (eg, the same DNN, the same S-NSSAI, the same SSC mode, etc.).

5) If step 3 is not performed, the UE may perform a procedure for releasing the normal PDU session. That is, for service continuity, the UE may release the normal PDU session after establishing the MA-PDU session.

Meanwhile, after establishing the MA-PDU session, if it is determined that the MA PDU session is not allowed according to the ATSSS rule, the UE may release the MA PDU session and re-create a normal PDU session.

Figure 14:
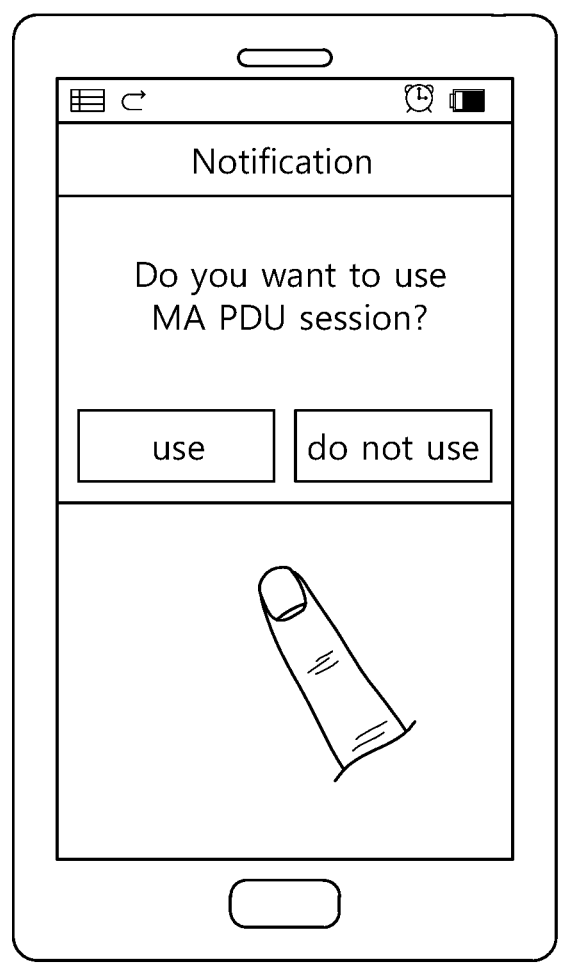
FIG. 14 is an exemplary diagram illustrating a screen for interaction with a user during the establishment procedure of an improved MA PDU session according to the disclosure of the present specification.

FIG. 14 is an exemplary diagram illustrating a screen for interaction with a user during the establishment procedure of an improved MA PDU session according to the disclosure of the present specification.

The screen shown in FIG. 14 may be displayed before step 1 shown in FIG. 12.

The UE may display a screen for receiving a user's setting for whether to use the MA PDU session on the display. Specifically, the setting screen may display a text regarding whether to use the MA PDU session.

In addition, the UE may display a screen for receiving a setting for simultaneous use of 3GPP access (or cellular network) and non-3GPP access (or WLAN) for a specific application or PDU session on the display.

And when the display has a built-in input unit (ie, a touch screen), the screen may display a button (eg, use or disable) for a touch input.

Figure 15A:
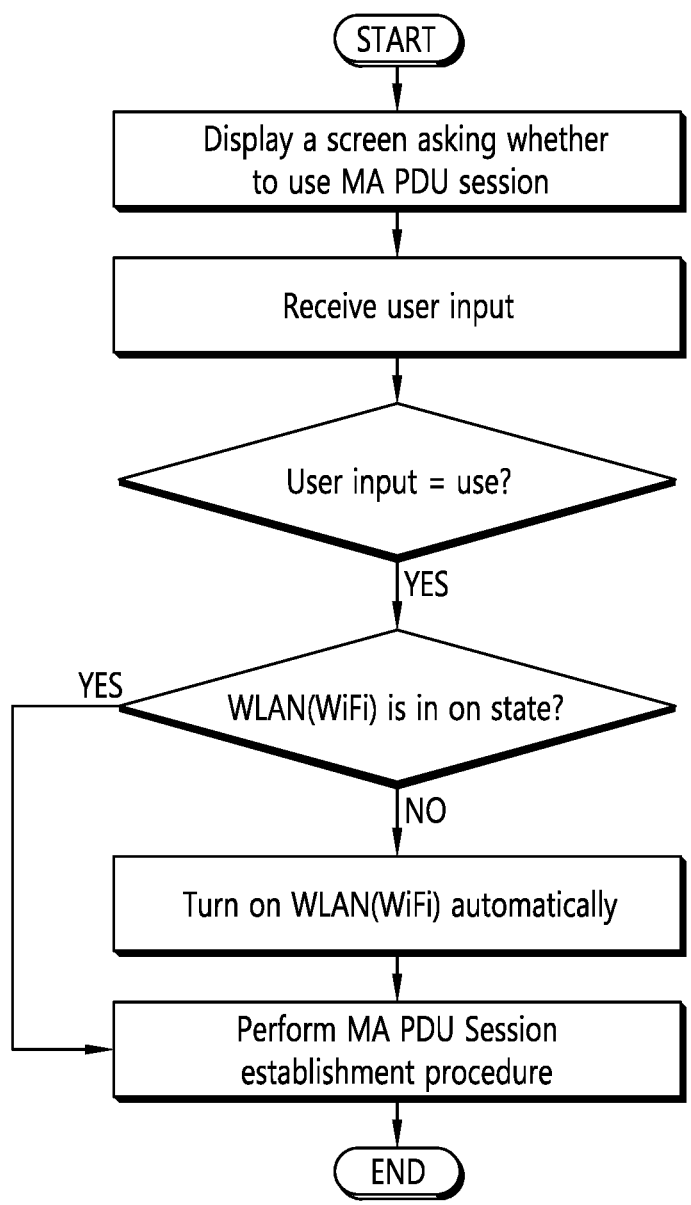
FIG. 15A is an exemplary flowchart illustrating a procedure for interaction with a user during the establishment procedure of an improved MA PDU session according to the disclosure of this specification.

FIG. 15*a* is an exemplary flowchart illustrating a procedure for interaction with a user during the establishment procedure of an improved MA PDU session according to the disclosure of this specification.

Referring to FIG. 15, the UE displays a screen for asking whether to use the MA PDU session.

If the input received from the user is to use the MA PDU session, the UE determines whether WLAN (or WiFi) is on.

Figure 15B:
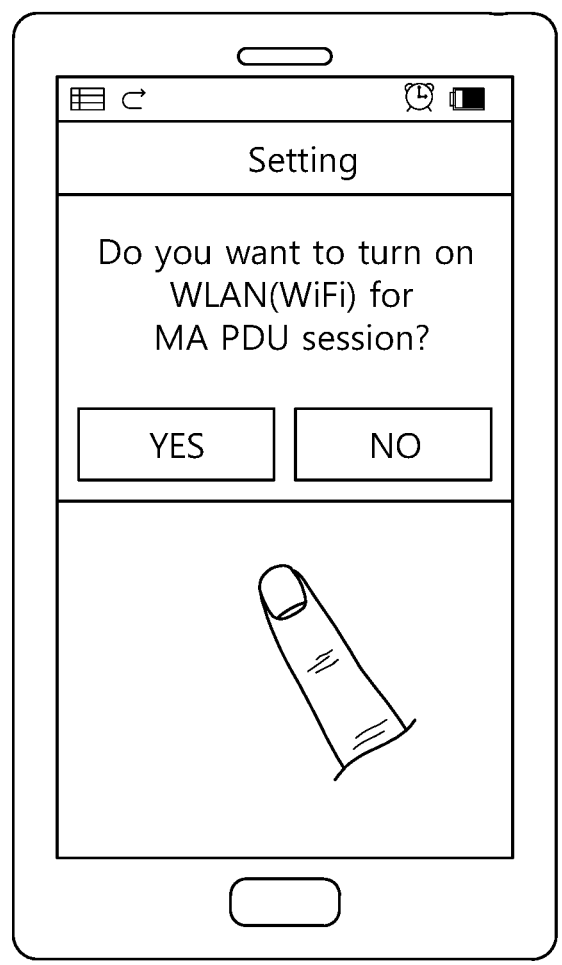
FIG. 15B is an exemplary diagram illustrating a screen for activating WLAN (Wi-Fi) in order to establish a MA PDU session.

If the WLAN (or WiFi) is not on, the UE turns on the WLAN (or WiFi). The UE may automatically turn on the WLAN, but the UE may also interact with the user through a screen as shown in FIG. 15B.

And the UE performs the MA PDU session establishment procedure.

On the other hand, although not shown, if the input received from the user is not using the MA PDU session (or the input received from the user is not using both 3GPP access (or cellular network) and non-3GPP access (or WLAN) at the same time for a specific application or a specific PDU session), the UE may not perform a procedure for establishing a MA PDU session.

On the other hand, in a state in which the UE uses the specific application or the specific PDU session through WLAN (or WiFi), when the UE displays a screen for asking whether to use the MA PDU session, the UE may further indicate information that data may be transmitted via 3GPP access, which may incur charges if the user uses MA PDU session.

FIG. 15*b* is an exemplary diagram illustrating a screen for activating WLAN (Wi-Fi) in order to establish a MA PDU session.

As shown in FIG. 15*b*, if WLAN (Wi-Fi) is not on, the UE may display a screen asking the user whether to turn on WLAN (Wi-Fi) in order to establish a MA PDU session.

Figure 16A:
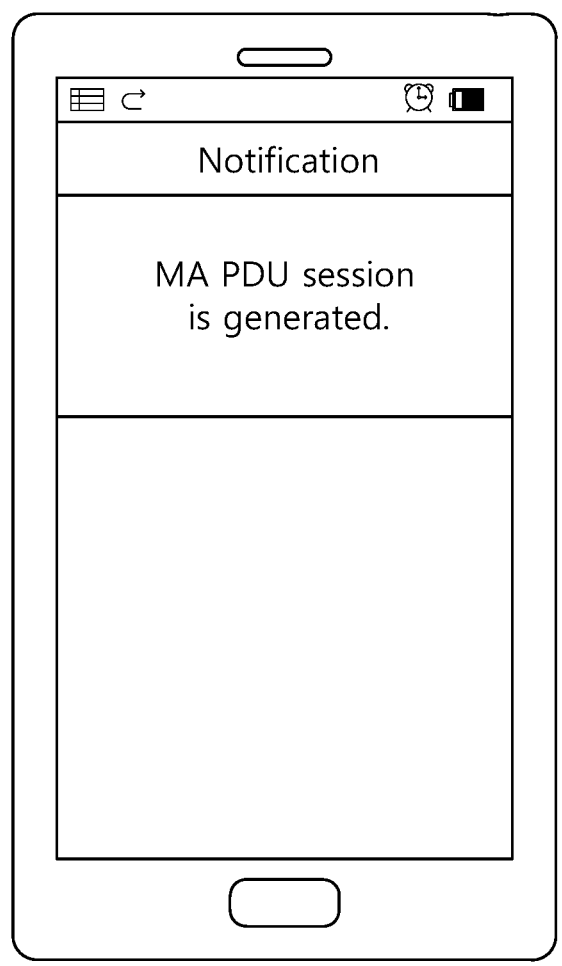
FIGS. 16A to 16C are exemplary views illustrating an example of a screen displayed after an improved MA PDU session is established according to the disclosure of the present specification.
Figure 16B:
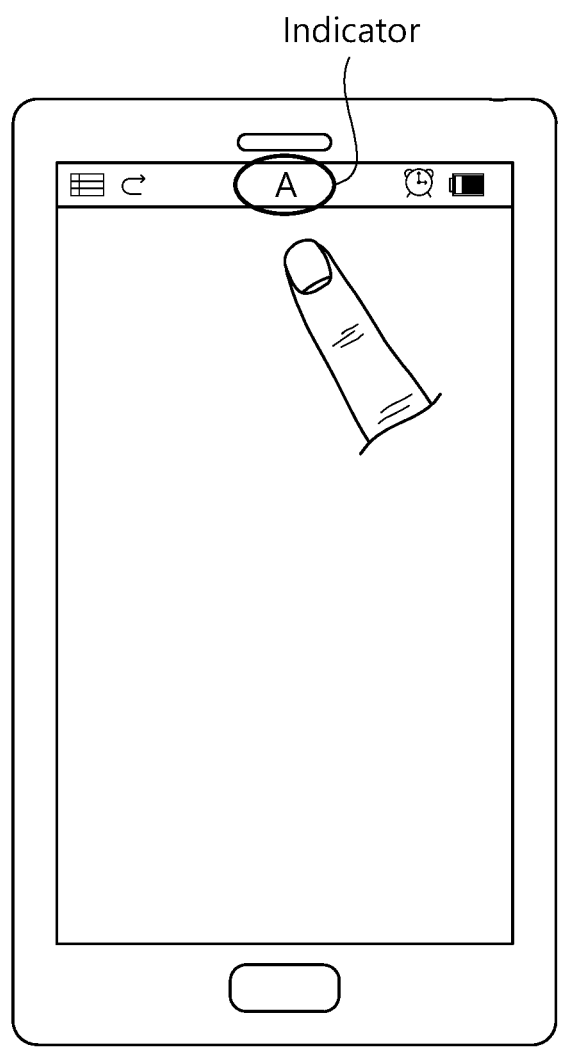
Figure 16C:
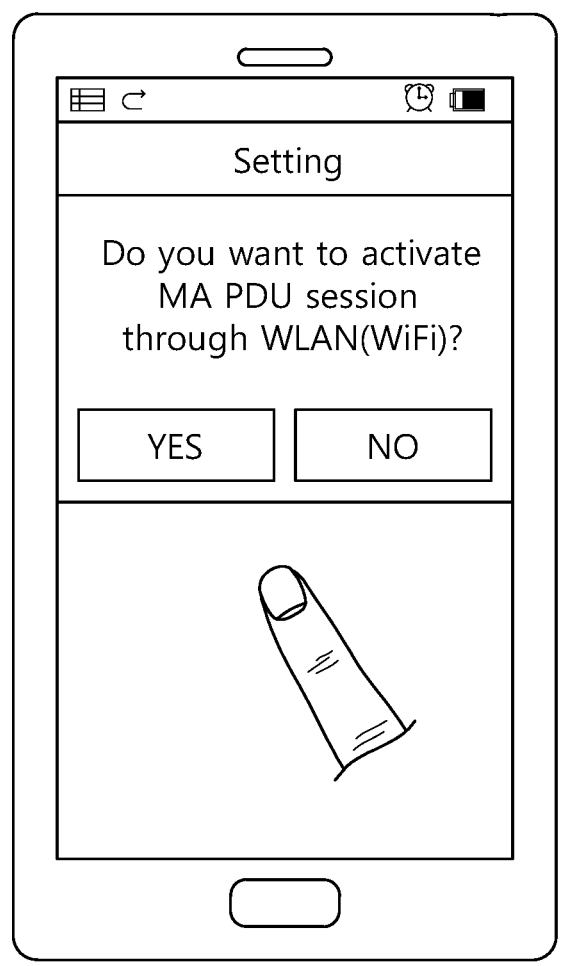

FIGS. 16*a* to 16*c* are exemplary views illustrating an example of a screen displayed after an improved MA PDU session is established according to the disclosure of the present specification.

When the MA PDU session is established, that is, when a PDU session establishment accept message is received, the UE may display information indicating establishment of the MA PDU session. The information may be a notification window, as shown in FIG. 16*a*. Alternatively, the information may be an indicator (or icon) as shown in FIG. 16*b*.

On the other hand, referring again to FIG. 13, if communication is being performed through a normal PDU session using either one of 3GPP access and non-3GPP access in step 1, the UE may not display an indicator (or icon) as shown in FIG. 16*b* or may display an indicator different from the indicator (or icon) shown in FIG. 16*b*. That is, before the MA PDU session is established, the UE may not display the indicator (or icon) or may display another indicator. The other indicator may be different depending on whether the access for which the normal PDU session is established is 3GPP access or non-3GPP access.

On the other hand, the UE may display the indicator differently depending on whether the MA PDU session is established through both accesses or preferentially through only one access. To this end, the UE may determine which access the user plane resources for the PDU session are allocated based on the user plane setup indication or the indication in the PDU session establishment acceptance message received in the process of establishing the MA PDU session. For example, in a case of user plane resources for the MA PDU session are allocated only through 3GPP access, in a case of user plane resources are allocated only through non-3GPP access, in a case of user plane resources are allocated through both 3GPP access and non-3GPP access, different indicators may be displayed for each cases.

When user plane resources for the MA PDU session are preferentially allocated only in one access, and when access to which user plane resources are not yet allocated becomes available (eg, in a case that the UE was out of coverage of non-3GPP access (ie, WLAN), thus user plane resources were not allocated through the non-3GPP access, the UE enters the non-3GPP (ie, WLAN) coverage), as can be seen with reference to FIG. 16*c*, the UE may display a screen asking whether to activate the MA PDU session through the WLAN MA PDU session.

If the user decides to activate the MA PDU session through the MA PDU session, the UE may request user plane resource allocation from the network.

On the other hand, the UE may display information to inform the user of the ATSSS rule based on the received ATSSS rule while establishing the MA-PDU session. For example, the UE may display information indicating which access is to be used for each application. For example, the UE may display that 3GPP access (i.e. cellular data network) for voice calls, 3GPP access (i.e. cellular data network) or non-3GPP access (i.e. WLAN) for Internet, and non-3GPP access (i.e. WLAN) for video streaming. That is, WLAN) and the like. In addition, the UE may display a screen that can receive a setting input from the user about which access to transmit and receive data of each application. If the setting value received through the user input and the ATSSS rule allowed by the network collide with each other, the UE may display a screen informing of the collision. For example, according to the ATSSS rule, voice call data is set to use 3GPP access, but when a user attempts to change it to non-3GPP access, the UE may display information indicating that it cannot be changed. Also, according to the ATSSS rule, when data of a certain application is set to use a specific access, the UE may deactivate the user input for the corresponding application while displaying the screen.

Figure 17:
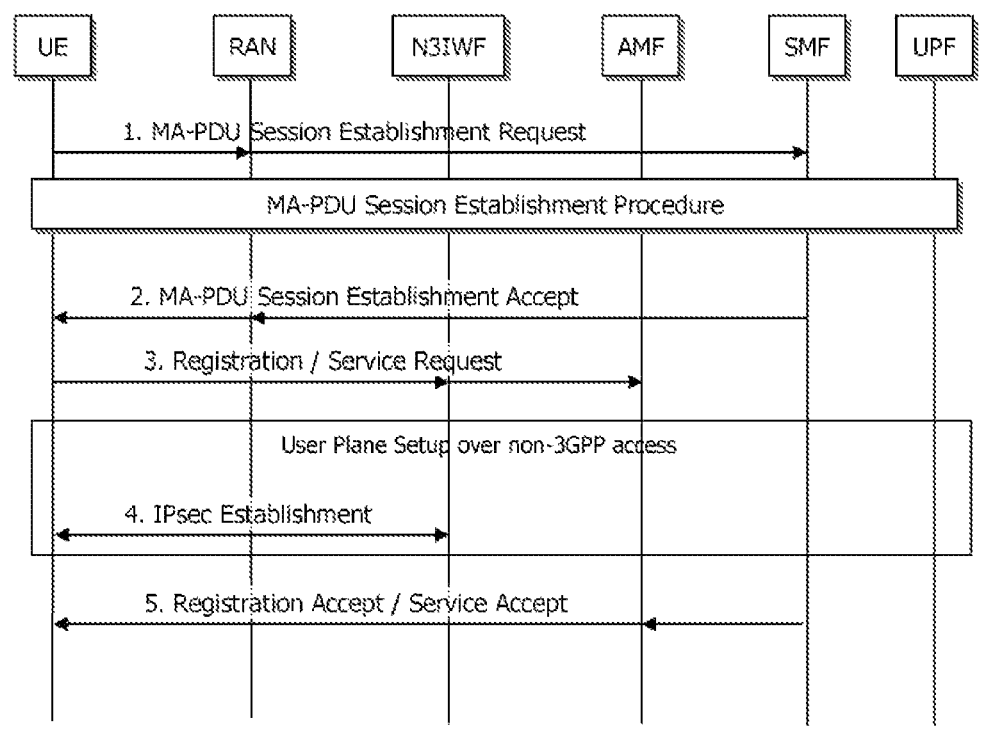
FIG. 17 illustrates a procedure in which a UE initiates setup of a user plane according to a disclosure of the present specification.

FIG. 17 illustrates a procedure in which a UE initiates setup of a user plane according to a disclosure of the present specification.

FIG. 17 shows a procedure in which a UE initiates setup of a user plane for non-3GPP access when an MA PDU session is generated in a state of being registered over only 3GPP access or being deregistered from non-3GPP access/idle over non-3GPP access.

1) The UE may transmit an MA PDU session establishment request message through 3GPP access. A specific procedure has been described with reference to FIG. 12.

2) An MA PDU session is established, and an SMF transmits an MA PDU session establishment acceptance message to the UE. Specifically, when accepting an MA PDU session establishment request, the SMF may transmit a PDU session acceptance message that does not include a separate indication or cause value to the UE. When receiving no separate indication from the SMF and receiving an indication that a user plane for the PDU session has been set up over both accesses from a lower layer (e.g., it is recognized that an AS layer has been generated in 3GPP access and a default IPsec tunnel has been generated in non-3GPP access), the UE may recognize that the request for the MA PDU session has been successful.

The UE may determine that the MA PDU session has been established but the user plane has been set up over only one access based on some or a combination of a plurality of the following conditions.

- When the PDU session acceptance message includes an indication that the PDU session is generated as an MA PDU session or does not include an indication that the PDU session is generated as a PDU session for one access
- When the PDU session acceptance message includes an indication/information indicating that a user plane has been set up over only one access (e.g., 3GPP access or non-3GPP access)
- When the AS layer of the UE receives an indication that a user plane has been set up within a certain time but the IPsec tunnel for the PDU session is not generated over non-3GPP access
- When the IPsec tunnel for the PDU session is generated over non-3GPP access within a certain time but the AS layer of the UE does not receive an indication that a user plane has been set up 3) The UE performs a registration procedure or a service request procedure through non-3GPP. Here, the UE may request activation of the MA PDU session by including a list of PDU sessions to be activated in a registration/service request message. When receiving the request, an AMF reports the request to the SMF. The SMF performs a user plane setup procedure for non-3GPP access according to the requests received from the UE and the AMF.

4) The UE and an N3IWF generate an IPsec tunnel for the MA PDU through non-3GPP access, and accordingly the UE may recognize that the MA PDU session is successfully activated.

5) The UE receives a service acceptance message or a registration acceptance message. The UE may recognize that the user plane has been successfully set up based on a PDU session reactivation result included in the received message.

Since the user plane can be set up in the service request procedure/registration procedure, it is possible to quickly set up the user plane. However, the UE needs to actively request user plane setup.

Figure 18:
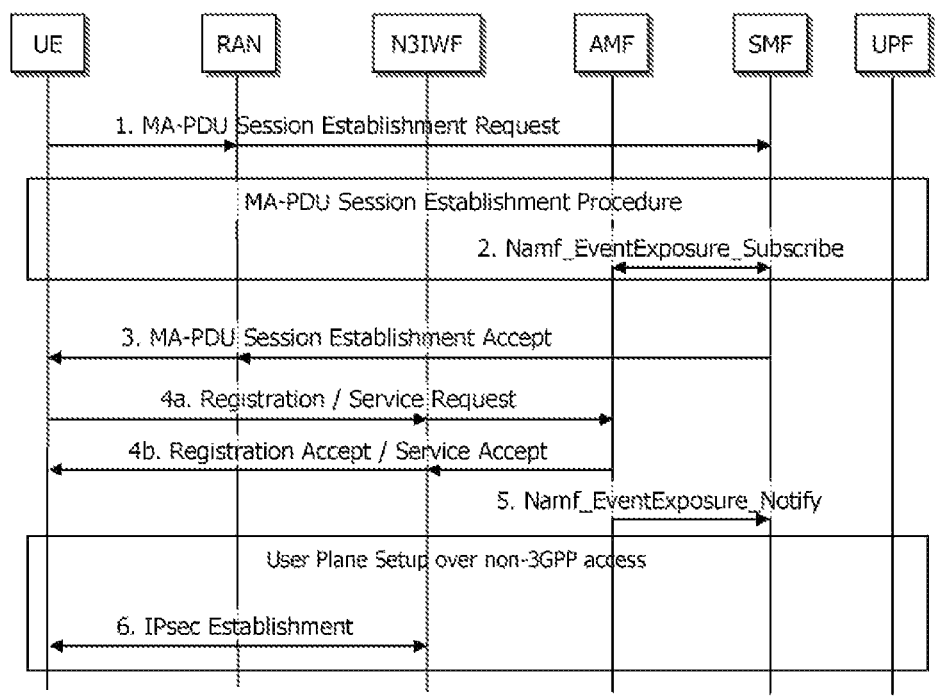
FIG. 18 illustrates a procedure in which a network initiates setup of a user plane according to a disclosure of the present specification.

FIG. 18 illustrates a procedure in which a network initiates setup of a user plane according to a disclosure of the present specification.

FIG. 18 shows a procedure in which a UE initiates setup of a user plane for non-3GPP access when an MA PDU session is generated in a state of being registered over only 3GPP access or being deregistered from non-3GPP access/idle over non-3GPP access.

1) The UE may transmit an MA PDU session establishment request through 3GPP access. A specific procedure has been described with reference to FIG. 12.

2) A process for generating an MA PDU session is performed. In the process for generating the MA PDU session, when an SMF accepts establishment of an MA PDU session and sets up a user plane over only one access, the SMF transmits a request for notification through Namf_EventExposure_Subscribe to the AMF in occurrence of an event in which the UE is registered (in the state of the UE being deregistered from non-3GPP access) or in occurrence of an event of transition to the connected state (in the state of the UE being deregistered from non-3GPP access or being idle over non-3GPP access).

3) An MA PDU session is established, and an SMF transmits an MA PDU session establishment acceptance message to the UE.

4a-4b) The UE transmits a registration request message or a service request message through non-3GPP access. The UE receives a registration acceptance message or a service request acceptance message through the AMF.

5) The AMF reports to the SMF that the UE is registered/connected based on the notification request from the SMF in process 2.

6) When receiving a notification of the event from the UE and the AMF, the SMF performs a user plane setup procedure for non-3GPP access. In this process, the UE and an N3IWF generate an IPsec tunnel for the MA PDU session through non-3GPP access, and accordingly the UE may recognize that the MA PDU session is successfully activated. In addition, the UE may recognize that the user plane has been successfully set up based on a PDU session reactivation result in the service request acceptance message or the registration acceptance message.

According to the procedure illustrated in FIG. 18, it is possible to set up a user plane without an additional operation of the UE. To this end, however, the AMF needs to make a notification request to the SMF and sets up a user plane according to a detected event after a registration procedure/service request procedure is over, thus complicating the procedure and slightly retarding a procedure of setting up the user plane.

The UE-initiated procedure illustrated in FIG. 17 and the network-initiated procedure illustrated in FIG. 18 may be used in combination. In the UE-initiated procedure, a list of PDU sessions to be activated is conventionally transmitted when there is data to be transmitted. Therefore, when there is no data to be transmitted, the UE may not configure and transmit a list of PDU sessions to be activated. In this case, when there is downlink data, even though the UE is registered over both accesses, a network may transmit data over only one access in an MA PDU. Therefore, even when the UE-initiated procedure is used in the network, if a user plane is generated over only one access while generating an MA PDU session, the SMF requests a notification of an event from the AMF, and thus the network-initiated procedure may be used together. That is, when there is user-plane data to be transmitted, the UE configures and transmits a list of PDU sessions to be activated according to the UE-initiated procedure, and the AMF reports to the SMF that the MA PDU session is included in the list if the MA PDU session is included in the list, thereby setting up a user plane. Further, the AMF reports that the UE is registered or connected according to the event of which a notification is requested by the SMF. When the AMF requests a notification of an event, if there is no request to set up a user plane from the AMF for a certain time, the SMF may set up a user plane according to the network-initiated procedure. Alternatively, the SMF may recognize that the UE is connected, and may set up a user plane when there is actual downlink data.

II. Second Disclosure

The second disclosure illustrates an improvement in 3GPP standard technology based on the methods according to the first disclosure.

Figure 19:
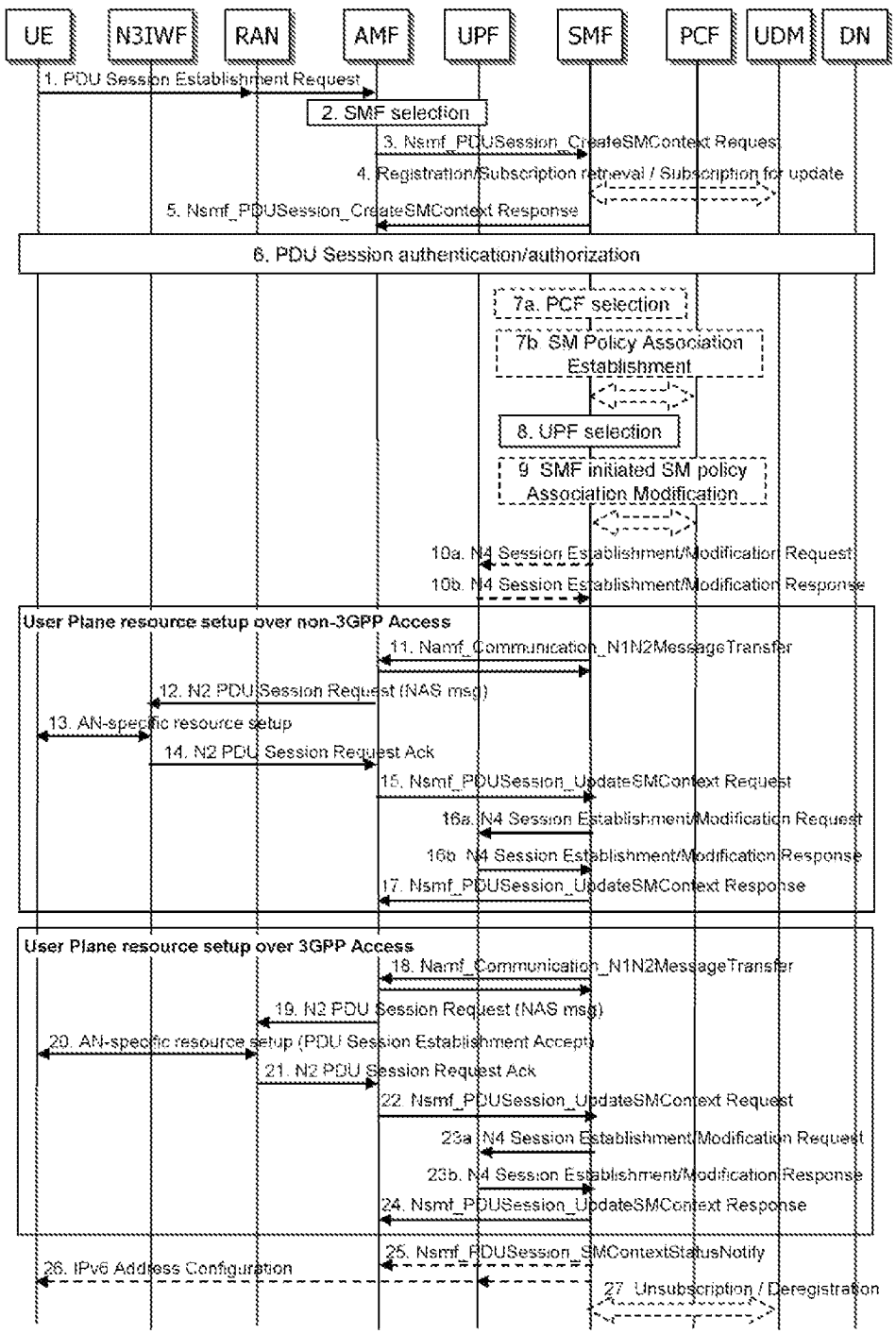
FIG. 19 is a flowchart illustrating a PDU session establishment process in a non-roaming case and an LBO roaming case.

FIG. 19 is a flowchart illustrating a PDU session establishment process in a non-roaming case and an LBO roaming case.

Hereinafter, improved procedures among processes illustrated in FIG. 19 will be mainly described.

1) A UE sets a request type in a PDU session establishment request message to "initial request". The message may include an MA PDU request indication.

2) An AMF selects an SMF. Here, the AMF sets and stores an access type as multi-access (MA). When an MA PDU request indication is included in the received message, the AMF may select an SMF supporting an ATSSS function.

3) When the AMF determines that the UE is registered via both accesses but requested S-NSSAI is not allowed on both accesses, the AMF may reject the multi-access PDU session establishment request.

The AMF determines the access type of access over which the message is received.

When the AMF supports the ATSSS function and the received message includes the MA-PDU request indication, the AMF may include the MA PDU request indication and RM state information of each access in a Nsmf_PDUSession_CreateSMContext request message.

7) When the received message includes the MA-PDU request indication, the SMF selects a PCF supporting the ATSSS function.

When the UE has ATSSS capability and MPTCP capability, the SMF may accept the PDU session establishment request based on the AMF capability, an operator policy and subscription information obtained from a UDM.

When dynamic PCC is deployed and both the AMF and the SMF support an MA PDU session, the SMF transmits an MA PDU request indication and associated access information to the PCF via the SM policy control create message. The PCF determines whether the MA PDU session is allowed based on the operator policy and the subscription information.

The PCF provides PCC rules related with the MA PDU session during a policy association establishment procedure.

From the received PCC rules, the SMF derives ATSSS rules, which will be transmitted to the UE to control traffic steering, and N4 rules.

8) The SMF selects an UPF supporting ATSSS capability and MPTCP capability.

11-17) When the UE is registered over second access, the SMF initiates user-plane resource setup over the second access (e.g. non-3GPP access) different from first access (e.g., 3GPP access) over which the PDU session establishment request is received.

The SMF may include an access type indicating the second access in a Namf_Communication_N1N2MessageTransfer message.

18-24) The SMF initiates user-plane resource setup over the first access over which the PDU session establishment request is received.

The SMF may include an access type indicating the first access in the Namf_Communication_N1N2MessageTransfer message.

When the SMF accepts PDU session establishment, the SMF may forward an N1 SM container (PDU session establishment acceptance message) having an ATSSS capability and/or MPTCP function indication and the ATSSS rules.

25) When the PDU session establishment request message received by the SMF includes information about the ATSSS capability and the MPTCP capability and the SMF determines to activate only one access PDU session, the SMF notifies associated access of the PDU session. Then, the AMF may update information about the access type of the PDU session.

III. Third Disclosure-Implementation Example

FIGS. 20a to 20d are exemplary views showing a screen according to an implementation example.

Figure 20A:
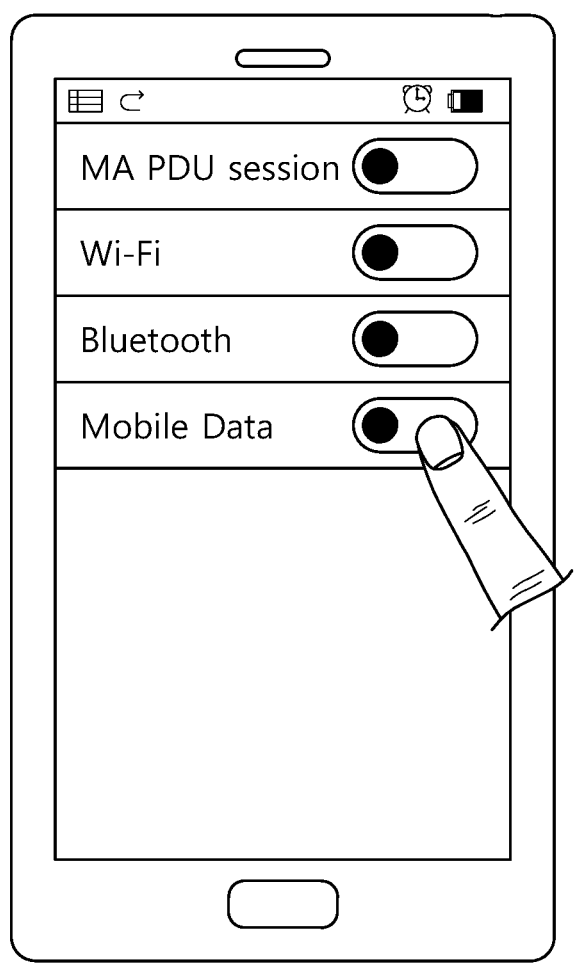
FIGS. 20A to 20D are exemplary views showing a screen according to an implementation example.

As can be seen with reference to FIG. 20a, the UE may display a setting screen. The setting screen may include a button for asking for activation/deactivation (or whether to permit or not) for the MA PDU session. The button may be a toggle button or a flip-flop button as shown, or an allow (or active) button and a block (or inactive) button. This is only an example and may be displayed as various types of buttons for receiving a user's selection as an input. In addition, the setting screen may include a button for whether to allow (activate) WLAN (WiFi), Bluetooth (Bluetooth), mobile data, etc.

Figure 20B:
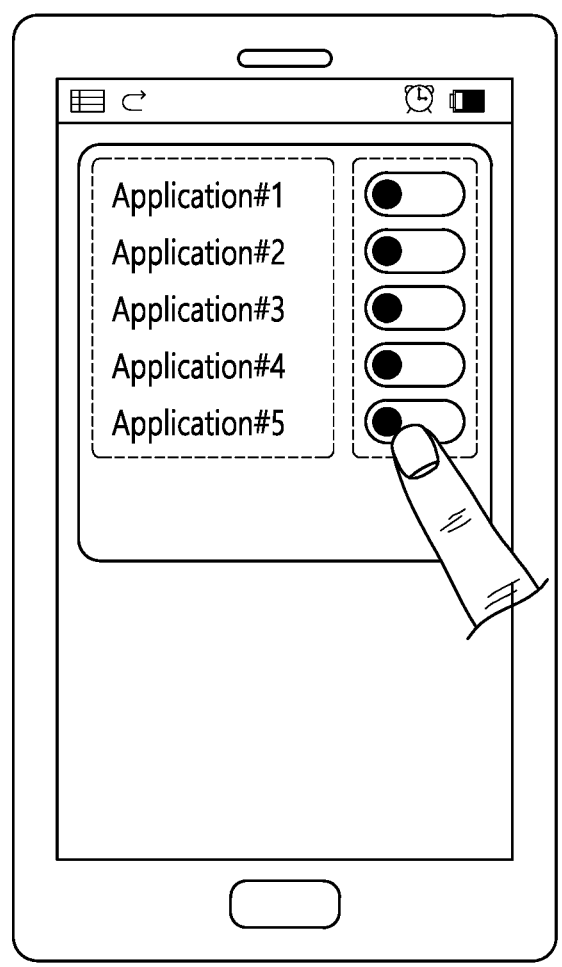

Alternatively, the UE may display a setting screen as shown in FIG. 20b. The setting screen may include a button for setting whether to allow the MA PDU session for each application (or whether to activate the MA PDU session). The application may be, for example, a large-capacity data service, a multimedia service, or applications requiring high reliability. The setting screen may include the name of one or more applications and a button for selecting/receiving from the user whether to allow (or want) the corresponding MA PDU session for each application. The button may be a toggle button or a flip-flop button as described above.

On the above setting screen, the names of the applications may be displayed in an order according to the operator's policy or may be displayed in an order of high frequency of use by the user.

Figure 20C:
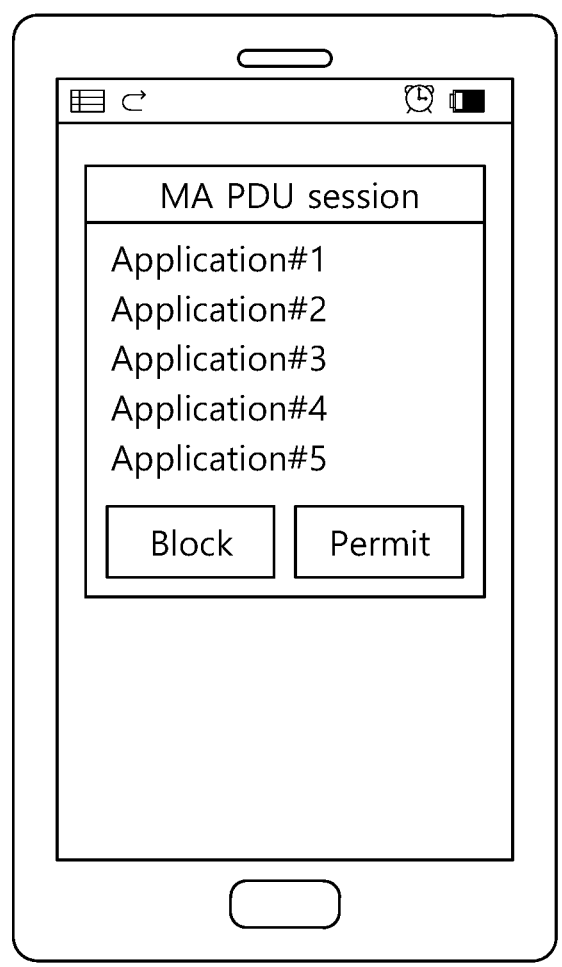

As shown in FIG. 20c, the UE may display a screen indicating that MA PDU session establishment is possible for a specific service or a specific application. In this case, the screen may display information about a service or application. In addition, the screen may include a button for receiving a user's selection whether to receive the corresponding service or application through the MA PDU session.

When an input for permission (or activation) is received from the user, an indicator may be displayed on a status bar as shown in FIG. 16b. In this case, in the state in which the MA PDU session is established, the indicator may be displayed without blinking. However, when a MA PDU session is established and data is being transmitted/received through the established MA PDU session, the indicator may be displayed with blinking or moving. Alternatively, upon receiving the input for blocking (or deactivation) from the user, the indicator as shown in FIG. 16b may not be displayed.

On the other hand, when the MA PDU session is in a state that can be activated, the UE may display a screen as shown in FIG. 14. In this case, the screen may display information about a service (or an application) (eg, an application name, access information to be used according to the ATSSS rule, etc.).

Figure 20D:
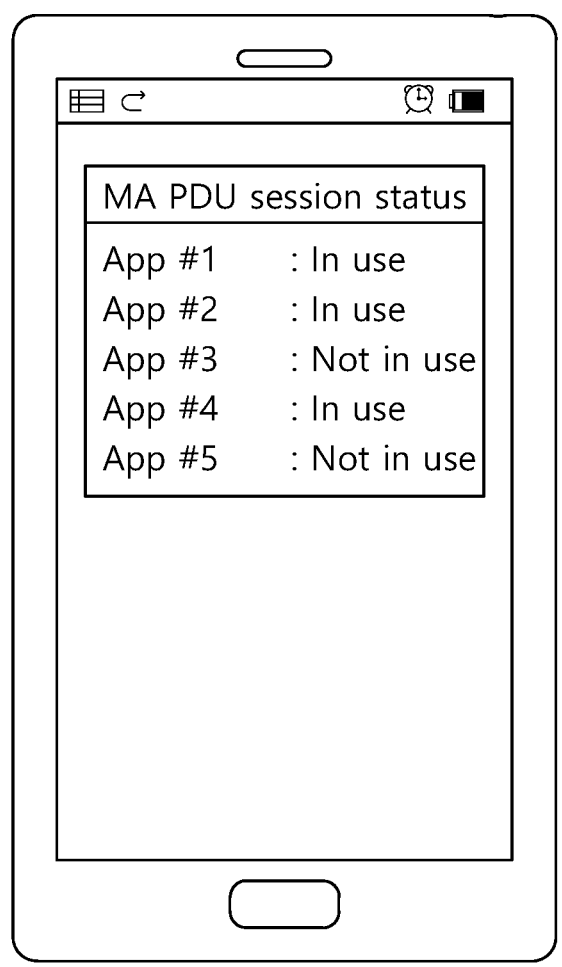

On the other hand, when the use of the MA PDU session becomes available, the MA PDU session can be automatically activated after automatic connection to two accesses without receiving an input for allowing/blocking the MA PDU session from the user. In addition, the UE may display a screen as shown in FIG. 16a or an indicator in a status bar as shown in FIG. 16b. In this way, the settings for automatic connection and automatic activation may be input from the user through the screens shown in FIGS. 20a and 20b On the other hand, when a user drags an indicator on a status bar as shown in FIG. 16b, one of screens as shown in FIGS. 20a to 20d may be displayed. When a screen as shown in FIG. 20D is displayed, the color of the application name text may be changed according to the allow/block state. For example, when the MA PDU session is in an allowed state or in use, the text of an application using the corresponding MA PDU session may be displayed in black, and in a blocked state, it may be displayed in gray.

As the UE moves, the service that can be provided at the location of the UE may change, so the name of the application or service displayed on the screen of FIG. 20c may be displayed or disappear depending on the location of the UE.

Meanwhile, on the screen shown in FIG. 20c or 20d, along with the name of the service or application, the UE may indicate which access to use for each application for the corresponding service based on the ATSSS rule.

Figure 21A:
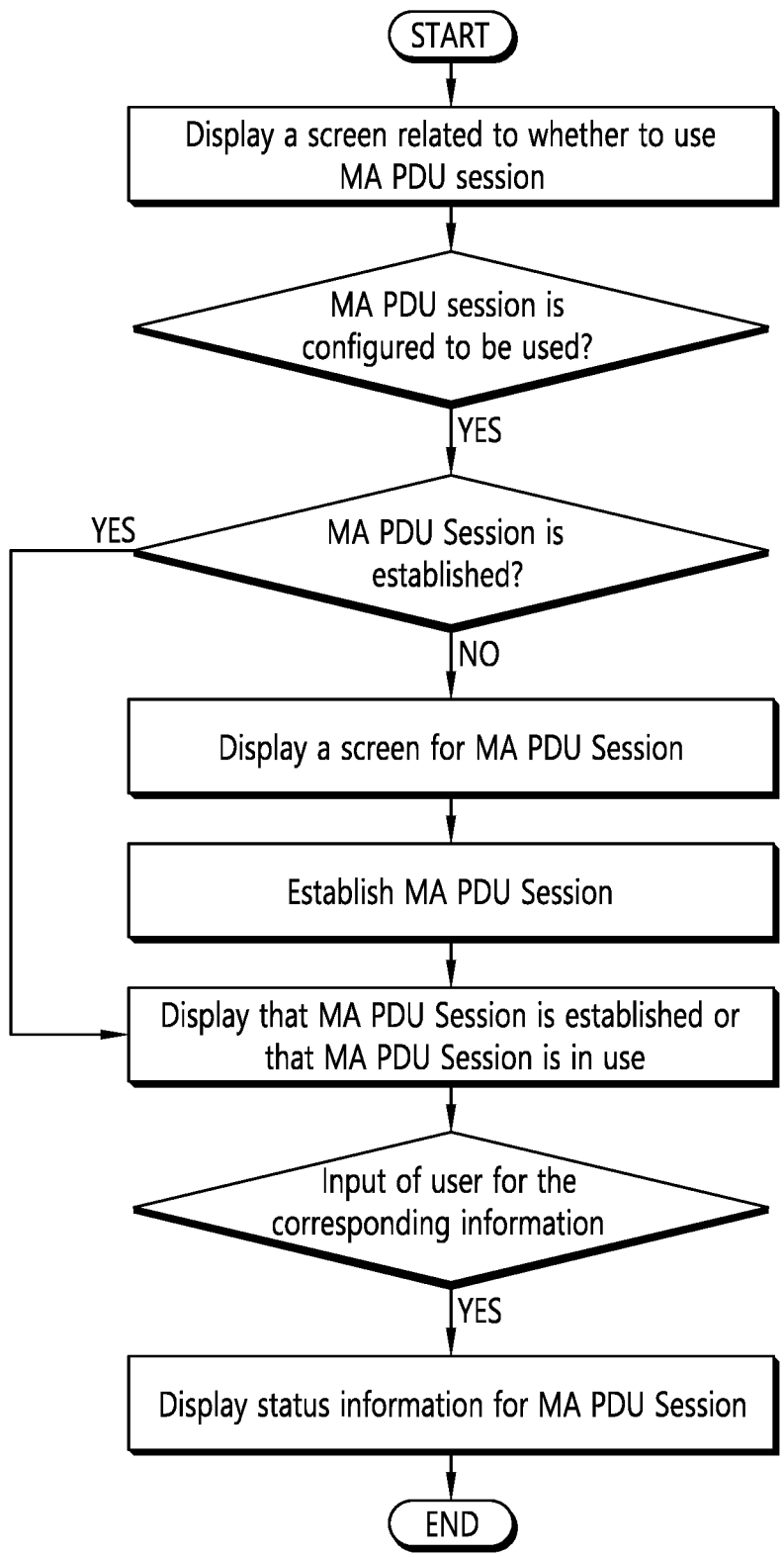
FIGS. 21A and 21B are flowcharts illustrating an embodiment presented herein.
Figure 21B:
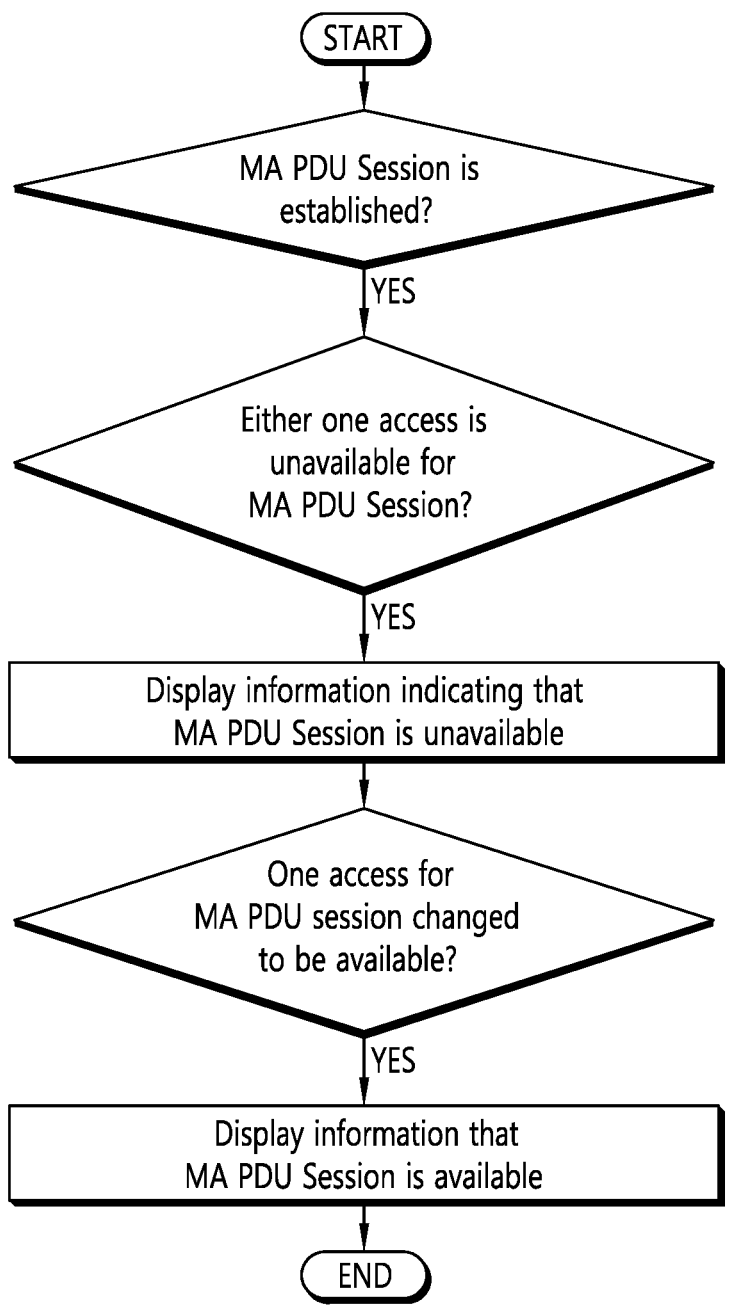

FIGS. 21a and 21b are flowcharts illustrating an embodiment presented herein.

Referring to FIG. 21a, the UE may first display a setting screen for whether to use the MA PDU session. The setting screen may be a screen as shown in FIGS. 14, 15b, 16c, and 20a to 20c.

When receiving an input for setting the use of the MA PDU session from the user on the setting screen, the UE determines whether the MA PDU session has already been established.

If the MA PDU session is not established, the UE displays a screen for establishing the MA PDU session. The screen may be the screen shown in FIGS. 14, 15b, 16c, and 20a to 20c. When receiving a setup input for establishment of a MA PDU session from the user on the screen, and when both accesses are available, the UE establishes the MA PDU session.

And the UE displays information indicating that the MA PDU session is established or in use. The information may be a screen shown in FIG. 16A or an indicator shown in FIG. 16B.

If a selection input is received from the user for the screen shown in FIG. 16a or the indicator shown in FIG. 16b, the UE may display status information for the MA PDU session. The status information may be displayed like a screen as shown in FIG. 20d.

On the other hand, as shown in FIG. 20b, when either access becomes unavailable while the MA PDU session is being established, the UE may display information indicating that the MA PDU session cannot be used.

However, when either access becomes available again, the UE may display information indicating that the MA PDU session is available.

Figure 22:
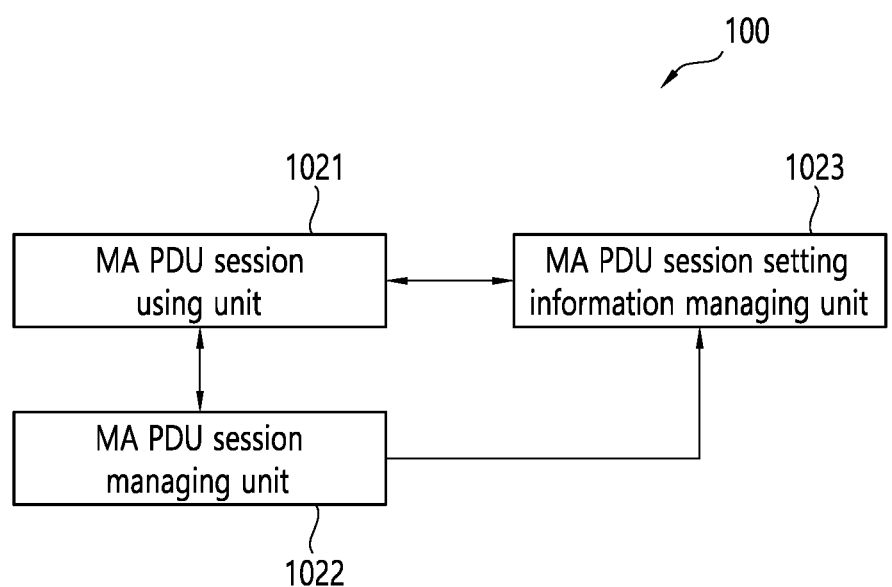
FIG. 22 is a block diagram of a terminal in which an embodiment presented in this specification is implemented.

FIG. 22 is a block diagram of a terminal in which an embodiment presented in this specification is implemented.

Referring to FIG. 22, the terminal (or wireless device) 100 may include an MA PDU session using unit 1021, an MA PDU session managing unit 1022, and an MA PDU session setting information managing unit 1023.

Figure 23:
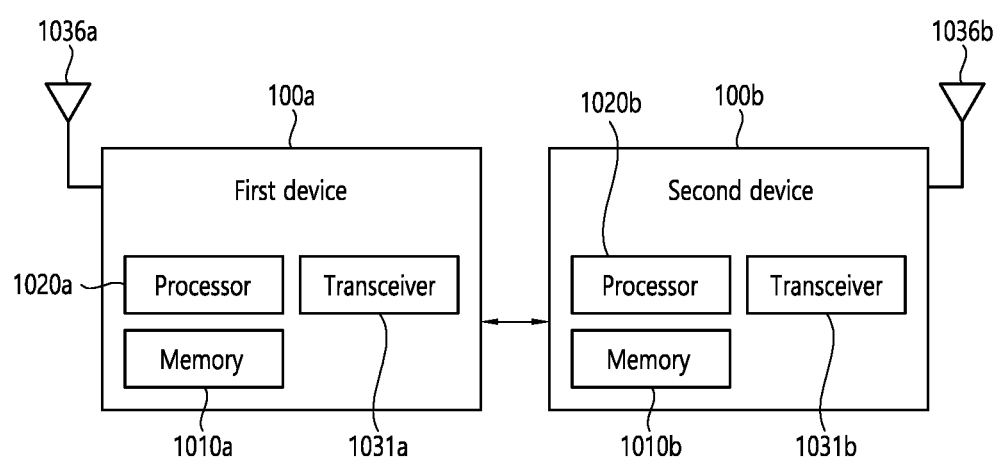
FIG. 23 illustrates a wireless communication system according to an embodiment.
Figure 25:
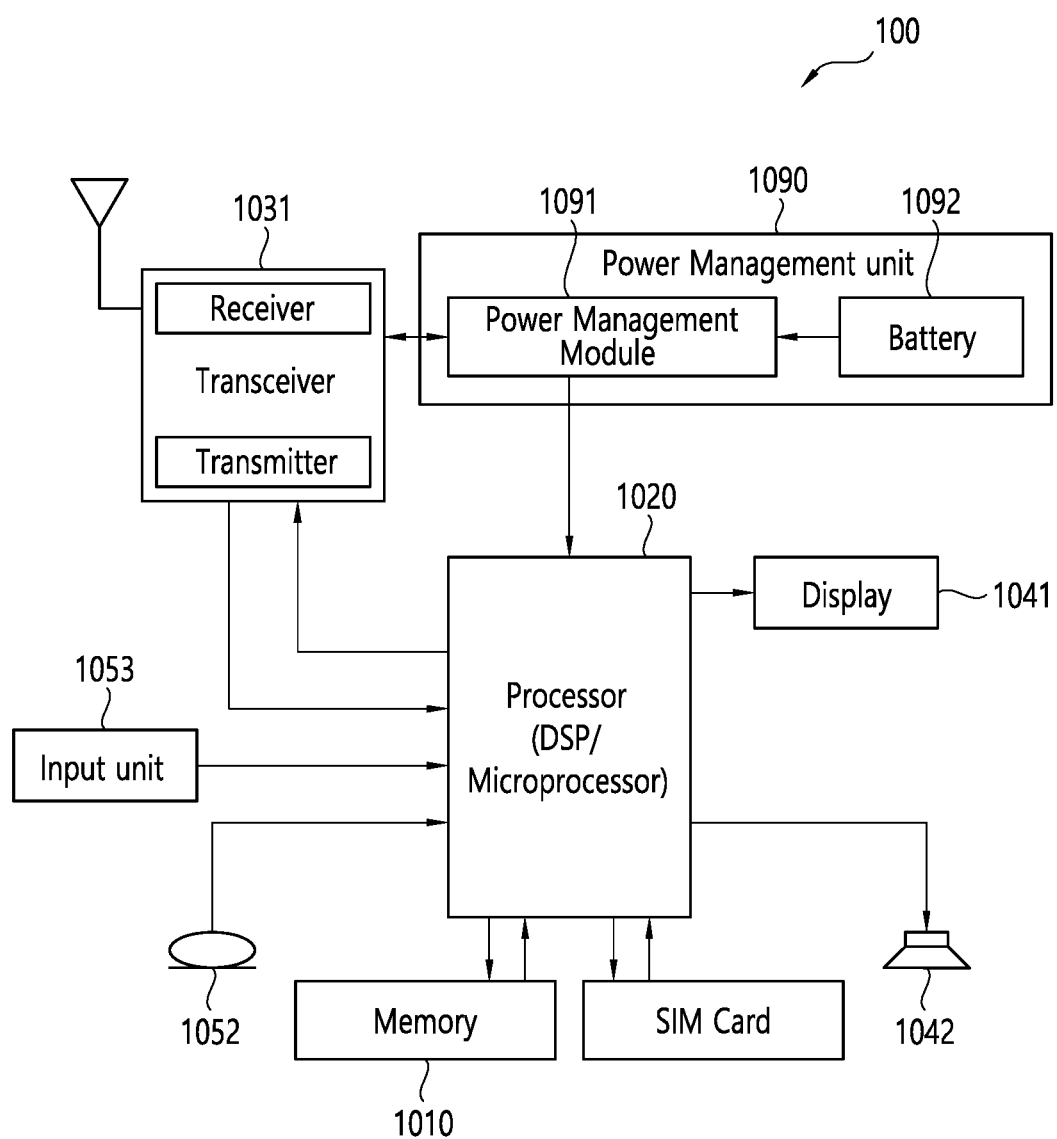
FIG. 25 is a block diagram of a UE according to an embodiment of the present disclosure.
Figure 26:
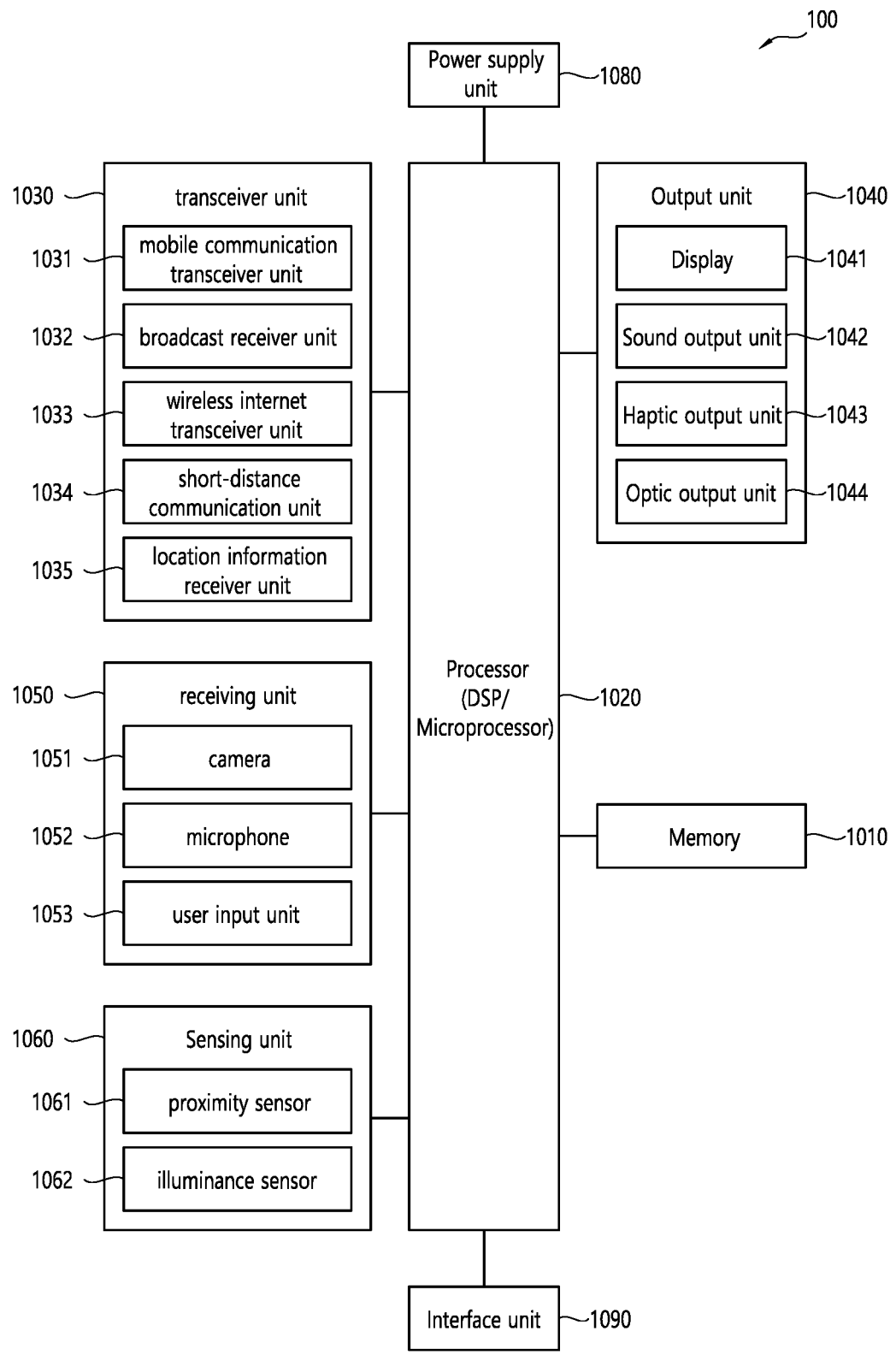
FIG. 26 is a block diagram showing the configuration of the terminal shown in FIG. 25 in more detail.

The MA PDU session using unit 1021, the MA PDU session managing unit 1022, and the MA PDU session setting information managing unit 1023 may be included in the processor 1020a of FIG. 23, the processor 1020 of FIG. 25, and the processor 1020 of FIG. 26.

The MA PDU session use unit 1021 may include one or more applications or services. When the MA PDU session is established, the MA PDU session use unit may transmit/receive data through the established MA PDU session.

The MA PDU session managing unit 1022 manages establishment/release of the MA PDU session. The MA PDU session managing unit 1022 may display the screen shown in FIG. 14, the screen shown in FIG. 15b, the screen shown in FIG. 16c, and the screen shown in FIGS. 20a to 20c for establishing the MA PDU session. When the MA PDU session is established, the MA PDU session managing unit 1022 may display the notification screen shown in FIG. 16a, the indicator shown in FIG. 16b, and the screen shown in FIG. 20d. The MA PDU session managing unit 1022 may transmit an input from the user to the MA PDU session configuration information managing unit 1023.

The MA PDU session setup information managing unit 1023 may store the LADN ATSSS rule received from the network, and transmit the received ATSSS rule to the MA PDU session managing unit 1022. In addition, the MA PDU session setup information managing unit 1023 may receive input from the user from the MA PDU session managing unit 1022 and store and manage it.

IV. Usage Examples for the Disclosure of the Present Specification

An example in which the disclosure of the present specification can be utilized will be described as follows.

<General Device to which the Disclosure of the Present Specification can be Applied>

Hereinafter, an apparatus to which the present specification can be applied will be described.

FIG. 23 illustrates a wireless communication system according to an embodiment.

Referring to FIG. 23, the wireless communication system may include a first device 100a and a second device 100b.

The first device 100a may be a device related to a base station, a network node, a transmission terminal, a reception terminal, a wireless device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a device related to a base station, a network node, a transmission terminal, a reception terminal, a radio device, a wireless communication device, a vehicle, a vehicle on which a self-driving function is mounted, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a personal digital assistants (PDA), a portable multimedia player (PMP), a navigation, a slate PC, a tablet PC, an ultrabook, a wearable device (e.g., a watch type terminal (smartwatch), a glass type terminal (smart glass), a head mounted display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or point of sales (POS). For example, the climate/environment device may include a device for monitoring or predicting the climate/environment.

The first device 100a may include at least one processor such as a processor 1020a, at least one memory such as memory 1010a, and at least one transceiver such as a transceiver 1031a. The processor 1020a may perform the above-described functions, procedures, and/or methods. The processor 1020a may perform one or more protocols. For example, the processor 1020a may perform one or more layers of a radio interface protocol. The memory 1010a is connected to the processor 1020a, and may store various forms of information and/or instructions. The transceiver 1031a is connected to the processor 1020a, and may be controlled to transmit and receive radio signals.

The second device 100b may include at least one processor such as a processor 1020b, at least one memory device such as memory 1010b, and at least one transceiver such as a transceiver 1031b. The processor 1020b may perform the above-described functions, procedures and/or methods. The processor 1020b may implement one or more protocols. For example, the processor 1020b may implement one or more layers of a radio interface protocol. The memory 1010b is connected to the processor 1020b, and may store various forms of information and/or instructions. The transceiver 1031b is connected to the processor 1020b and may be controlled transmit and receive radio signals.

The memory 1010a and/or the memory 1010b may be connected inside or outside the processor 1020a and/or the processor 1020b, respectively, and may be connected to another processor through various technologies, such as a wired or wireless connection.

The first device 100a and/or the second device 100b may have one or more antennas. For example, an antenna 1036a and/or an antenna 1036b may be configured to transmit and receive radio signals.

Figure 24:
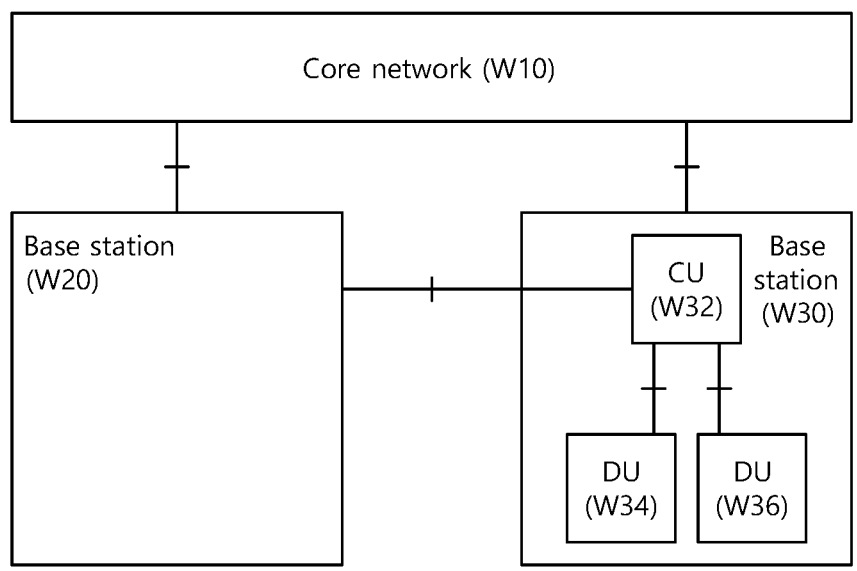
FIG. 24 illustrates a block diagram of a network node according to an embodiment.

FIG. 24 illustrates a block diagram of a network node according to an embodiment.

In particular, FIG. 24 is a diagram more specifically illustrating a case that a base station is divided into a central unit (CU) and a distributed unit (DU).

Referring to FIG. 24, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts radio resource control (RRC), service data adaptation protocol (SDAP) and packet data convergence protocol (PDCP) layers of the base station (e.g., gNB). The DU W34, W36 may be a logical node that hosts radio link control (RLC), media access control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

FIG. 25 is a block diagram of a UE according to an embodiment of the present disclosure.

In particular, FIG. 25 is a diagram illustrating the terminal of FIG. 23 in more detail above.

A UE includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed function, process and/or method described in the present disclosure. Layers of a wireless interface protocol may be implemented in the processor 1020. The processor 1020 may include application-specific integrated circuit (ASIC), other chipset, logical circuit and/or data processing apparatus. The processor 1020 may be an application processor (AP). The processor 1020 may include at least one of a digital signal processor (DSP), a central processing unit (CPU), a graphics processing unit (GPU) and a modulator and demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store international mobile subscriber identity (IMSI) used for identifying a subscriber in a mobile telephoning apparatus such as a mobile phone and a computer and the related key. Many types of contact address information may be stored in the SIM card.

The memory 1010 is coupled with the processor 1020 in a way to operate and stores various types of information to operate the processor 1020. The memory may include read-only memory (ROM), random access memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is connected to the processor 1020 in a way to operate and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

FIG. 26 is a block diagram showing the configuration of the terminal shown in FIG. 25 in more detail.

The terminal 100 may include a transceiver unit 1030, a processor 1020, a memory 1030, a sensing unit 1060, an output unit 1040, an interface unit 1090, an input unit 1050, and a power supply unit 1080, etc. Since the components shown in FIG. 26 are not essential for implementing the terminal, the terminal described in this specification may have more or fewer components than those listed above.

More specifically, among the components, the transceiver 1030 include one or more modules that enable wireless communication between the terminal 100 and the wireless communication system, between the terminal 100 and another terminal 100, or between the terminal 100 and an external server. In addition, the transceiver 1030 may include one or more modules for connecting the terminal 100 to one or more networks.

The transceiver 1030 may include at least one of a broadcast receiver 1032, a mobile communication transceiver 1031, a wireless Internet transceiver 1033, a short-range communication unit 1034, and a location information module 1150.

The input unit 1050 includes a camera 1051 or an image input unit for inputting an image signal, a microphone 1052 or an audio input unit for inputting an audio signal, and a user input unit 1053 for receiving information from a user, for example, a touch key, a push key (mechanical key), etc. The voice data or image data collected by the input unit 1050 may be analyzed and processed as a user's control command.

The sensing unit 1060 may include one or more sensors for sensing at least one of information in the mobile terminal, surrounding environment information surrounding the mobile terminal, and user information. For example, the sensing unit 1060 may include a proximity sensor 1061, an illumination sensor 1062, an illumination sensor, a touch sensor, an acceleration sensor, a magnetic sensor, gravity Sensor (G-sensor), gyroscope sensor, motion sensor, RGB sensor, infrared sensor (IR sensor: infrared sensor), fingerprint sensor (finger scan sensor), ultrasonic sensor, optical sensors (eg, cameras (see 1051)), microphones (see 1052), battery gauges, environmental sensors (eg, barometers, hygrometers, thermometers, radiation sensors, It may include at least one of a thermal sensor, a gas sensor, etc.) and a chemical sensor (eg, an electronic nose, a healthcare sensor, a biometric sensor, etc.). Meanwhile, the mobile terminal disclosed in the present specification may combine and utilize information sensed by at least two or more of these sensors.

The output unit 1040 is for generating an output related to visual, auditory or tactile sense, the output unit 1040 may include at least one of a display unit 1041, a sound output unit 1042, a haptip output unit 1043, and an optical output unit 1044. The display unit 1041 may implement a touch screen by forming a layer structure with the touch sensor each other or integrally formed with the touch sensor. Such a touch screen may function as a user input unit 1053 that provides an input interface between the terminal 100 and a user, and may provide an output interface between the terminal 100 and a user.

The interface unit 1090 serves as a passage with various types of external devices connected to the terminal 100. This interface unit 1090 may include at least one of a wired/wireless headset port (port), an external charger port (port), a wired/wireless data port (port), a memory card (memory card) port, a port connecting a device equipped with an identification module, an audio input/output (I/O) port, a video input/output (I/O) port, and an earphone port. Corresponding to the connection of the external device to the interface unit 1090, the terminal 100 may perform appropriate control related to the connected external device.

In addition, the memory 1030 stores data supporting various functions of the terminal 100. The memory 1030 may store a plurality of application programs (or applications) driven in the terminal 100, data for operation of the terminal 100, and commands. At least some of these application programs may be downloaded from an external server through wireless communication. Also, at least some of these application programs may exist on the terminal 100 from the time of shipment for basic functions (eg, functions for incoming calls, outgoing functions, message reception, and message outgoing functions) of the terminal 100. Meanwhile, the application program may be stored in the memory 1030, installed on the terminal 100, and driven by the processor 1020 to perform an operation (or function) of the mobile terminal.

The processor 1020 generally controls the overall operation of the terminal 100 in addition to the operation related to the application program. The processor 1020 may provide or process appropriate information or functions to a user by processing signals, data, information, etc. input or output through the above-described components or by driving an application program stored in the memory 1030.

In addition, the processor 1020 may control at least some of the aforementioned components in order to drive an application program stored in the memory 1030. Furthermore, the processor 1020 may operate by combining at least two or more of the components included in the terminal 100 to drive the application program.

The power supply unit 1080 receives external power and internal power under the control of the processor 1020 to supply power to each component included in the terminal 100. The power supply unit 1080 includes a battery, and the battery may be a built-in battery or a replaceable battery.

At least some of the respective components may operate in cooperation with each other to implement an operation, control, or control method of a mobile terminal according to various embodiments to be described below. In addition, the operation, control, or control method of the mobile terminal may be implemented on the mobile terminal by driving at least one application program stored in the memory 1030.

Hereinafter, before looking at various embodiments implemented through the terminal 100 as described above, the above-listed components will be described in more detail with reference to the drawings.

First, referring to the transceiver 1030, the broadcast receiver 1032 of the transceiver 1030 receives a broadcast signal and/or broadcast related information from an external broadcast management server through a broadcast channel. The broadcast channel may include a satellite channel and a terrestrial channel. Two or more of the broadcast reception modules may be provided to the mobile terminal 100 for simultaneous broadcast reception or broadcast channel switching for at least two broadcast channels.

The mobile communication transceiver 1031 transmit and receive wireless signal with at least one of a base station, an external terminal, and a server on a mobile communication network constructed according to the technical standards or communication methods for mobile communication (eg, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), LTE-A (Long Term Evolution-Advanced), 3GPP NR (New Radio access technology), etc.).

The wireless signal may include various types of data according to transmission and reception of a voice call signal, a video call signal, or a text/multimedia message.

The wireless Internet transceiver 1033 refers to a module for wireless Internet access, and may be built-in or external to the terminal 100. The wireless Internet transceiver 1033 is configured to transmit and receive wireless signals in a communication network according to wireless Internet technologies.

As wireless Internet technologies, for example, WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), High Speed Downlink Packet Access (HSDPA), High Speed Uplink Packet Access (HSUPA), Long Term Evolution (LTE), Long Term Evolution-Advanced (LTE-A), 3GPP NR, and the like, and The Internet transceiver 1033 transmits and receives data according to at least one wireless Internet technology within a range including Internet technologies not listed above.

From the point of view that wireless Internet access by WiBro, HSDPA, HSUPA, GSM, CDMA, WCDMA, LTE, LTE-A, 3GPP NR, etc, is made through a mobile communication network, the wireless Internet transceiver 1033 performing wireless Internet access through the mobile communication network may be understood as a type of the mobile communication transceiver 1031.

The short-range communication unit 1034 is for short-range communication, and may support short-distance communication by using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, and Wireless USB (Wireless Universal Serial Bus) technologies. The short-distance communication unit 1034 may support wireless communication between the terminal 100 and the wireless communication system, between the terminal 100 and the other terminal 100, or between the terminal 100 and another network in which the other terminal (1000, or external server) is located. The local area network may be wireless personal area networks.

Here, the other terminal 100 is a wearable device capable of exchanging (or interworking) data with the terminal 100 according to the present specification, for example, a smart watch, a smart glass, neckband, HMD (head mounted display). The short-range communication unit 1034 may detect (or recognize) a wearable device capable of communicating with the terminal 100 in the vicinity of the terminal 100. Furthermore, when the detected wearable device is a device authenticated to communicate with the terminal 100 according to the present specification, the processor 1020 transmits at least a portion of data processed by the terminal 100 to a wearable device through the short-range communication unit 1034. It can be transmitted. Accordingly, the user of the wearable device may use data processed by the terminal 100 through the wearable device. For example, according to this, when a call is received in the terminal 100, it is possible for the user to perform a phone call through the wearable device, or when a message is received in the terminal 100, it is possible for the user to receive the received message through the wearable device.

Furthermore, screen mirroring with a TV located in the house or a display inside a car is performed through the short-distance communication unit 1034, and a corresponding function is performed based on, for example, the MirrorLink or Miracast standard. In addition, it is also possible to directly control a TV or a display inside a vehicle by using the terminal 100.

The location information module 1150 is a module for acquiring a location (or current location) of a mobile terminal, and a representative example thereof includes a Global Positioning System (GPS) module or a Wireless Fidelity (WiFi) module. For example, if the mobile terminal utilizes a GPS module, it can acquire the location of the mobile terminal by using a signal transmitted from a GPS satellite. As another example, if the mobile terminal utilizes the Wi-Fi module, the location of the mobile terminal may be obtained based on information of the Wi-Fi module and a wireless access point (AP) that transmits or receives a wireless signal. If necessary, the location information module 1150 may perform any function of the other modules of the transceiver 1030 to obtain data on the location of the mobile terminal as a substitute or additionally. The location information module 1150 is a module used to obtain the location (or current location) of the mobile terminal, and is not limited to a module that directly calculates or obtains the location of the mobile terminal.

Each of the broadcast receiver 1032, the mobile communication transceiver 1031, the short-range communication unit 1034, and the location information module 1150 may be implemented as a separate module performing a corresponding function, and functions corresponding to two or more of the transceiver 1031, the short-range communication unit 1034, and the location information module 1150 may be implemented by one module.

Next, the input unit 1050 is for inputting image information (or signal), audio information (or signal), data, or information input from a user, for input of image information, the terminal 100 may be provided with one or a plurality of cameras 1051. The camera 1051 processes an image frame such as a still image or a moving image obtained by an image sensor in a video call mode or a photographing mode. The processed image frame may be displayed on the display unit 1041 or stored in the memory 1030. On the other hand, the plurality of cameras 1051 provided in the terminal 100 may be arranged to form a matrix structure, and through the cameras 1051 forming the matrix structure as described above, image information may be input to the terminal 100 has a plurality of cameras having various angles or focal points. In addition, the plurality of cameras 1051 may be arranged in a stereo structure to acquire a left image and a right image for realizing a stereoscopic image.

The microphone 1052 processes an external sound signal as electrical voice data. The processed voice data may be utilized in various ways according to a function (or a running application program) being performed by the terminal 100. Meanwhile, various noise removal algorithms for removing noise generated in the process of receiving an external sound signal may be implemented in the microphone 1052.

The user input unit 1053 is for receiving information from a user, and when information is input through the user input unit 1053, the processor 1020 may control the operation of the terminal 100 to correspond to the input information. The user input unit 1053 is a mechanical input means (or a mechanical key, for example, a button located on the front, rear or side of the terminal 100, a dome switch, a jog wheel, a jog switch, etc.) and a touch input means. As an example, the touch input means consists of a virtual key, a soft key, or a visual key displayed on the touch screen through software processing, or consists of a touch key (touch key) disposed on a part other than the touch screen. On the other hand, the virtual key or the visual key, is possible to be displayed on the touch screen while having various forms, for example, graphic, text, icon, video or a combination of these forms.

Meanwhile, the sensing unit 1060 senses at least one of information in the mobile terminal, surrounding environment information surrounding the mobile terminal, and user information, and generates a sensing signal corresponding thereto. The processor 1020 may control the driving or operation of the terminal 100 or perform data processing, functions, or operations related to an application program installed in the terminal 100 based on the sensing signal. Representative sensors among various sensors that may be included in the sensing unit 1060 will be described in more detail.

First, the proximity sensor 1061 refers to a sensor that detects the presence or absence of an object approaching a predetermined detection surface or an object existing in the vicinity without mechanical contact using the force of an electromagnetic field or infrared rays. The proximity sensor 1061 may be disposed in an inner region of the mobile terminal covered by the touch screen described above or in the vicinity of the touch screen.

Examples of the proximity sensor 1061 include a transmission type photoelectric sensor, a direct reflection type photoelectric sensor, a mirror reflection type photoelectric sensor, a high frequency oscillation type proximity sensor, a capacitive type proximity sensor, a magnetic type proximity sensor, an infrared proximity sensor, and the like. In the case where the touch screen is capacitive, the proximity sensor 1061 may be configured to detect the proximity of an object having conductivity as a change in an electric field according to the proximity of the object. In this case, the touch screen (or touch sensor) itself may be classified as a proximity sensor.

On the other hand, for convenience of description, the act of approaching an object on the touch screen without being in contact so that the object is recognized that it is located on the touch screen is called "proximity touch", and the act of actually touching an object on the screen is called "contact touch". The position where the object is touched in proximity on the touch screen means a position where the object is perpendicular to the touch screen when the object is touched in proximity. The proximity sensor 1061 may detect a proximity touch and a proximity touch pattern (eg, proximity touch distance, proximity touch direction, proximity touch speed, proximity touch time, proximity touch position, proximity touch movement state, etc.). On the other hand, the processor 1020 processes data (or information) corresponding to the proximity touch operation and the proximity touch pattern detected through the proximity sensor 1061 as above, and further, print visual information corresponding to the processed data on the touch screen. Furthermore, the processor 1020 may control the terminal 100 to process different operations or data (or information) according to whether a touch to the same point on the touch screen is a proximity touch or a contact touch.

The touch sensor detects a touch (or touch input) applied to the touch screen (or the display unit 1041) using at least one of various touch methods such as a resistive film method, a capacitive method, an infrared method, an ultrasonic method, and a magnetic field method, etc.

As an example, the touch sensor may be configured to convert a change in pressure applied to a specific part of the touch screen or a change in capacitance occurring in a specific part of the touch screen into an electrical input signal. The touch sensor may be configured to detect a position in which a touch object applying a touch on the touch screen, an area, a pressure at the time of touch, an electrostatic capacitance at the time of touch, etc. Here, the touch object is an object that applies a touch to the touch sensor, and may be, for example, a finger, a touch pen or a stylus pen, a pointer, or the like.

As such, when there is a touch input to the touch sensor, a signal(s) corresponding thereto is sent to the touch controller. The touch controller processes the signal(s) and then sends the corresponding data to the processor 1020. Accordingly, the processor 1020 may know which area of the display unit 1041 has been touched, and the like. Here, the touch controller may be a component separate from the processor 1020, or may be the processor 1020 itself.

Meanwhile, the processor 1020 may perform different controls or may perform the same control according to the type of the touch object that touches the touch screen (or a touch key provided other than the touch screen). Whether to perform different control or the same control according to the type of the touch object may be determined according to the current operating state of the terminal 100 or a running application program.

On the other hand, the touch sensor and the proximity sensor described above are independently or in combination, may sense various types of touch such as, a short (or tap) touch, a long touch, a multi touch, and a drag touch, flick touch, pinch-in touch, pinch-out touch, swype touch, hovering touch, etc.

The ultrasonic sensor may recognize location information of a sensing target by using ultrasonic waves. Meanwhile, the processor 1020 may calculate the position of the wave source based on information sensed by the optical sensor and the plurality of ultrasonic sensors. The position of the wave source may be calculated using the property that light is much faster than ultrasonic waves, that is, the time at which light reaches the optical sensor is much faster than the time at which ultrasonic waves reach the ultrasonic sensor. More specifically, the position of the wave source may be calculated by using a time difference from the time that the ultrasonic wave arrives using light as a reference signal.

On the other hand, the camera 1051 as described in terms of the components of the input unit 1050 includes at least one of a camera sensor (eg, CCD, CMOS, etc.), a photo sensor (or an image sensor), and a laser sensor.

The camera 1051 and the laser sensor may be combined with each other to detect a touch of a sensing target for a 3D stereoscopic image. The photo sensor may be stacked on the display device, and the photo sensor is configured to scan the motion of the sensing target close to the touch screen. More specifically, the photo sensor mounts photo diodes and transistors (TRs) in rows/columns and scans the contents placed on the photo sensors using electrical signals that change according to the amount of light applied to the photo diodes. That is, the photo sensor calculates the coordinates of the sensing target according to the amount of change in light, and through this, location information of the sensing target can be obtained.

The display unit 1041 displays (outputs) information processed by the terminal 100. For example, the display unit 1041 may display execution screen information of an application program driven in the terminal 100 or UI (User Interface) and GUI (Graphic User Interface) information according to the execution screen information.

Also, the display unit 1041 may be configured as a stereoscopic display unit for displaying a stereoscopic image.

A three-dimensional display method such as a stereoscopic method (glasses method), an auto stereoscopic method (glasses-free method), or a projection method (holographic method) may be applied to the stereoscopic display unit.

The sound output unit 1042 may output audio data received from the transceiver 1030 or stored in the memory 1030 in a call signal reception, a call mode or a recording mode, a voice recognition mode, a broadcast reception mode, and the like. The sound output unit 1042 also outputs a sound signal related to a function (eg, a call signal reception sound, a message reception sound, etc.) performed in the terminal 100. The sound output unit 1042 may include a receiver, a speaker, a buzzer, and the like.

The haptic module 1530 generates various tactile effects that the user can feel. A representative example of the tactile effect generated by the haptic output unit 1043 may be vibration. The intensity and pattern of vibration generated by the haptic output unit 1043 may be controlled by a user's selection or setting of a processor. For example, the haptic output unit 1043 may synthesize and output different vibrations or output them sequentially.

In addition to vibration, the haptic output unit 1043 may generate various tactile effects such as a pin arrangement that moves vertically with respect to the contact skin surface, a jet or suction force of air through a nozzle or an inlet, a touch on the skin surface, contact of an electrode, an electrostatic force, effect caused by heat absorption and the effect of reproducing a feeling of coolness and warmth using an element capable of absorbing heat or generating heat, etc.

The haptic output unit 1043 may not only deliver a tactile effect through direct contact, but may also be implemented so that the user can feel the tactile effect through a muscle sensation such as a finger or arm. Two or more haptic output units 1043 may be provided according to the configuration of the terminal 100.

The light output unit 1044 outputs a signal for notifying the occurrence of an event by using the light of the light source of the terminal 100. Examples of the event generated in the terminal 100 may be message reception, call signal reception, missed call, alarm, schedule notification, email reception, information reception through an application, and the like.

The signal output from the optical output unit 1044 is implemented as the mobile terminal emits light of a single color or a plurality of colors toward the front or rear side. The signal output may be terminated when the mobile terminal detects the user's event confirmation.

The interface unit 1090 serves as a passage with all external devices connected to the terminal 100. The interface unit 1090 receives data from an external device, receives power and transmits it to each component inside the terminal 100, or allows data inside the terminal 100 to be transmitted to an external device. For example, a wired/wireless headset port, an external charger port, a wired/wireless data port, a memory card port, a port for connecting a device equipped with an identification module (port), an audio I/O (Input/Output) port, a video I/O (Input/Output) port, an earphone port, etc. may be included in the interface unit 1090.

On the other hand, the identification module is a chip storing various information for authenticating the use authority of the terminal 100, the identification module may include a user identification module (UIM), a subscriber identity module (subscriber identity module; SIM), a universal user authentication module (universal subscriber identity module; USIM) and the like. A device equipped with an identification module (hereinafter, 'identification device') may be manufactured in the form of a smart card. Accordingly, the identification device may be connected to the terminal 100 through the interface unit 1090.

In addition, the interface unit 1090 may be a path through which power from the cradle is supplied to the terminal 100 when the terminal 100 is connected to an external cradle, or a path through which various commands signal input from the cradle by the user transmitted to the terminal 100. Various command signals or the power input from the cradle may be operated as signals for recognizing that the terminal 100 is correctly mounted on the cradle.

The memory 1030 may store a program for the operation of the processor 1020, and may temporarily store input/output data (eg, a phone book, a message, a still image, a moving image, etc.). The memory 1030 may store data related to vibrations and sounds of various patterns output when a touch input is performed on the touch screen.

The memory 1030 may include at least one type of storage medium such as a flash memory type, a hard disk type, a solid state disk type (SSD), a silicon disk drive type (SDD), and a multimedia card micro type), card-type memory (such as SD or XD memory), random access memory (RAM), static random access memory (SRAM), read-only memory (ROM), electrically erasable programmable read-only memory (EEPROM), a programmable read-only memory (PROM), a magnetic memory, a magnetic disk, and an optical disk. The terminal 100 may be operated in relation to a web storage that performs a storage function of the memory 1030 on the Internet.

Meanwhile, as described above, the processor 1020 controls the operation related to the application program and the general operation of the terminal 100 in general. For example, if the state of the mobile terminal satisfies a set condition, the processor 1020 may execute or release a lock state that restricts input of a user's control command to applications.

In addition, the processor 1020 may perform control and processing related to voice calls, data communication, video calls, etc., or perform pattern recognition processing capable of recognizing handwriting input or drawing input performed on the touch screen as text and images, respectively. Furthermore, the processor 1020 may control any one or a plurality of the components described above in combination to implement various embodiments described below on the terminal 100 according to the present specification.

The power supply unit 1080 receives external power and internal power under the control of the processor 1020 to supply power necessary for operation of each component. The power supply unit 1080 includes a battery, and the battery may be a built-in battery configured to be rechargeable, and may be detachably coupled to the terminal body for charging or the like.

In addition, the power supply unit 1080 may include a connection port, and the connection port may be configured as an example of the interface 1090 to which an external charger that supplies power for charging the battery is electrically connected.

As another example, the power supply unit 1080 may be configured to charge the battery in a wireless manner without using the connection port. In this case, power can be transmitted to the power supply unit 1080 uses one or more of an inductive coupling method based on a magnetic induction phenomenon or a resonance coupling method based on an electromagnetic resonance phenomenon from an external wireless power transmitter.

Meanwhile, various embodiments below may be implemented in, for example, a computer-readable recording medium using software, hardware, or a combination thereof.

On the other hand, the mobile terminal can be extended to a wearable device that can be worn on the body beyond the dimension that the user mainly holds in the hand. Such wearable devices include a smart watch, smart glass, and head mounted display (HMD) and the like. Hereinafter, examples of mobile terminals extended to wearable devices will be described.

The wearable device may be configured to be able to exchange (or interwork) data with another terminal 100. The short-range communication unit 1034 may detect (or recognize) a wearable device capable of communicating around the terminal 100. Furthermore, when the detected wearable device is a device authenticated to communicate with the terminal 100, the processor 1020 may transmit at least a portion of data processed in the terminal 100 to the wearable device through the short-range communication unit 1034. Accordingly, the user may use data processed by the terminal 100 through the wearable device. For example, it is possible to perform a phone call through the wearable device when a call is received in the terminal 100, or to check the received message through the wearable device when a message is received to the terminal 100.

Hereinafter, embodiments related to a control method that can be implemented in the mobile terminal configured as described above will be described with reference to the accompanying drawings. It is apparent to those skilled in the art that the present specification may be embodied in other specific forms without departing from the spirit and essential characteristics of the present specification.

The present specification described above can be implemented as computer-readable code on a medium in which a program is recorded. The computer-readable medium includes all kinds of recording devices in which data readable by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc, and also includes implementation in the form of a carrier wave (eg, transmission over the Internet). In addition, the computer may include a processor 1020 of the terminal. Accordingly, the above detailed description should not be construed as restrictive in all respects but as exemplary. The scope of the present specification should be determined by a reasonable interpretation of the appended claims, and all modifications within the equivalent scope of the present specification are included in the scope of the present specification.

Although user equipment (UE) is illustrated by way of example in the accompanying drawings, the illustrated UE may be referred to by terms such as a terminal, mobile equipment (ME), a wireless device, and a mobile terminal. In addition, the UE may be a portable device such as a laptop computer, a mobile phone, a PDA, a smart phone, a multimedia device, or the like, or may be a non-portable device such as a PC or a vehicle-mounted device.

In addition, the wireless device (or mobile terminal, etc.) described herein may include a mobile phone, a smart phone, a laptop computer, a digital broadcasting terminal, personal digital assistants (PDA), a portable multimedia player (PMP), Navigation, slate PC, tablet PC, ultrabook, wearable device (for example, watch-type terminal (smartwatch), glass-type terminal (smart glass), HMD (head) mounted display)). Furthermore, the wireless device (or mobile terminal, etc.) described herein may be used for controlling at least one device in an Internet of Things (IoT) environment or a smart greenhouse.

Those skilled in the art will readily appreciate that the configuration according to the embodiment described in this specification may be applied to a fixed terminal such as a digital TV, a desktop computer, and a digital signage, except when applicable only to a wireless device.

In the exemplary system described above, the methods are described on the basis of a flowchart as a series of steps or blocks, however, the present specification is not limited to the order of the steps, and some steps may occur in a different order or concurrent with other steps as described above. In addition, those skilled in the art will understand that the steps shown in the flowchart are not exhaustive and that other steps may be included or that one or more steps of the flowchart may be deleted without affecting the scope of the present specification.

VI. Scenarios to which the Disclosure of the Present Disclosure is Applicable Hereinafter, scenarios to which the present disclosure is applicable are described.

In the present disclosure, an always-on PDU session for URLLC having a low-latency characteristic may be used for artificial intelligence, robots, autonomous driving, extended reality, and the like among the 5G scenarios below.

<5G Usage Scenario>

Figure 27:
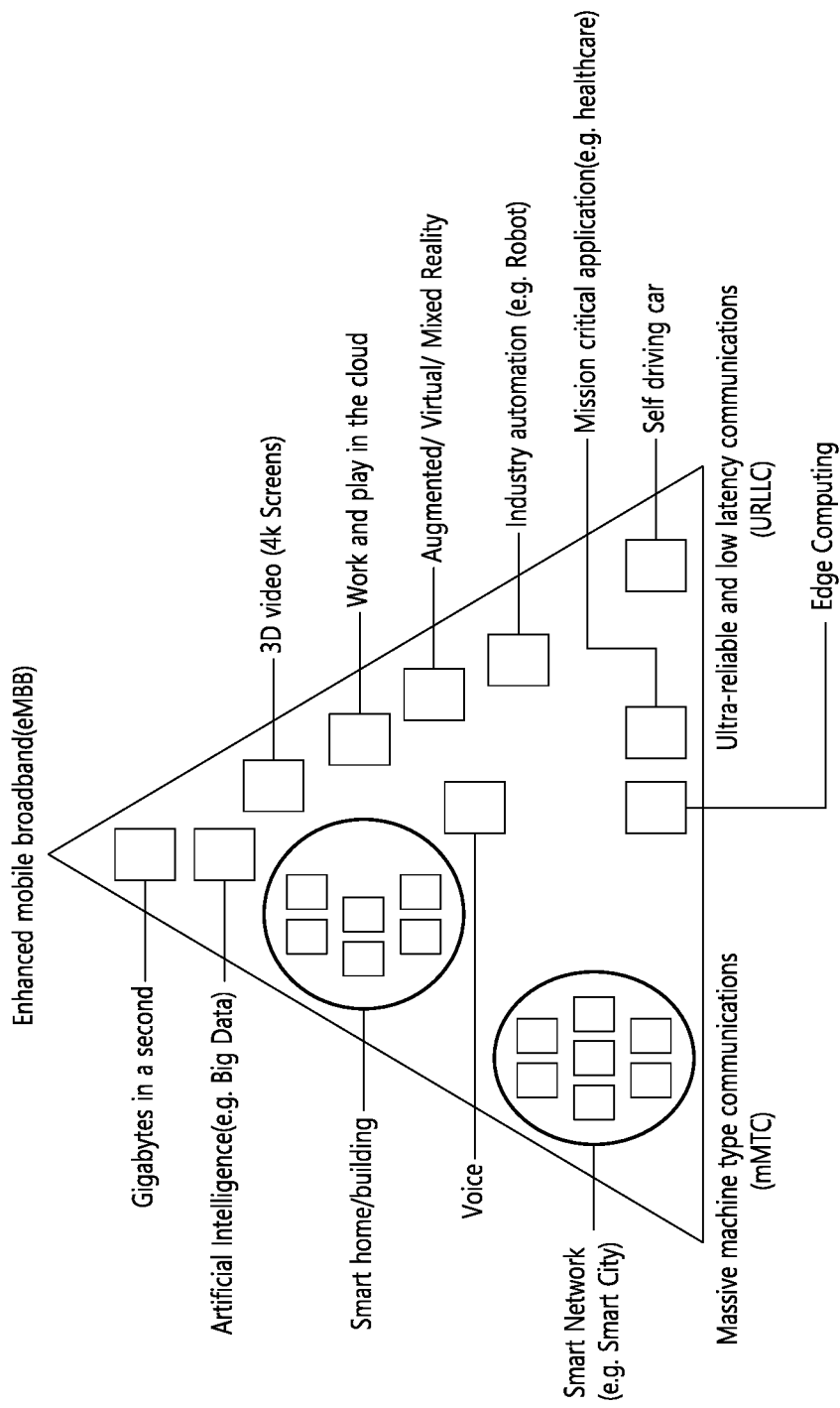
FIG. 27 illustrates an example of 5G use scenarios.

FIG. 27 illustrates an example of 5G use scenarios.

The 5G usage scenarios illustrated in FIG. 27 are merely exemplary, and the technical features of the present disclosure may also be applied to other 5G usage scenarios that are not illustrated in FIG. 27.

Referring to FIG. 27, three major requirement areas of 5G include: (1) an enhanced mobile broadband (eMBB) area, (2) a massive machine type communication (mMTC) area, and (3) an ultra-reliable and low latency communications (URLLC) area. Some examples of usage may require multiple areas for optimization, while other examples of usage may focus only on one key performance indicator (KPI). The 5G supports these various examples of usage in a flexible and reliable way.

The eMBB focuses generally on improvements in data rate, latency, user density, and capacity and coverage of mobile broadband access. The eMBB aims at a throughput of about 10 Gbps. The eMBB makes it possible to far surpass basic mobile Internet access, and covers full-duplex operations, media in cloud or augmented reality, and entertainment applications. Data is one of the key drivers of 5G, and it may not be possible to see dedicated voice services for the first time in the 5G era. In 5G, voice is expected to be processed as an application program simply using data connection provided by a communication system. A main reason for an increased traffic volume is an increase in content size and an increase in the number of applications requiring high data rates. Streaming services (audio and video), interactive video and mobile Internet connections will become more prevalent as more devices are connected to the Internet. Many of these applications require always-on connectivity to push real-time information and notifications to users. Cloud storage and applications are rapidly increasing in mobile communication platforms, which may be applied to both work and entertainment. Cloud storage is a special use case that drives the growth of uplink data rates. 5G is also used for remote work in the cloud and requires much lower end-to-end latency to maintain a good user experience when tactile interfaces are used. In entertainment, for example, cloud gaming and video streaming are another key factor requiring improvement in mobile broadband capabilities. Entertainment is essential on smartphones and tablets anywhere, including in highly mobile environments such as trains, cars and airplanes. Another use case is augmented reality and information retrieval for entertainment. Here, augmented reality requires very low latency and an instantaneous data amount.

The mMTC, which is designed to enable communication between a large number of low-cost devices powered by batteries, is provided to support smart metering, logistics, fields, and applications such as body sensors. The mMTC aims at about 10-year batteries and/or about one million devices per $km^2$. The mMTC enables seamless connection of embedded sensors in all fields to form a sensor network and is one of the most anticipated 5G use cases. Potentially, IoT devices are predicted to reach 20.4 billion by 2020. Smart networks utilizing industrial IoT is one of the areas where 5G plays a key role in enabling smart cities, asset tracking, smart utilities, agriculture and security infrastructure.

The URLLC, which enables devices and machines to communicate with high reliability, very low latency, and high availability, are ideal for vehicle communications, industrial control, factory automation, telesurgery, smart grid, and public safety applications. The URLLC aims at a delay of about 1 ms. The URLLC includes new services that will change the industry through ultra-reliable/low-latency links such as remote control of key infrastructures and autonomous vehicles. Levels of reliability and latency are essential for smart grid control, industrial automation, robotics, and drone control and adjustment.

Next, a plurality of usage examples included in the triangle of FIG. 27 will be described in more detail.

5G, which is a means of providing streams that are rated as hundreds of megabits per second to a gigabit per second, may complement fiber-to-the-home (FTTH) and cable-based broadband (or data over cable service interface specifications (DOCSIS)). Such a high speed may be required to deliver TVs with resolution of 4K or higher (6K, 8K and higher) as well as virtual reality (VR) and augmented reality (AR). VR and AR applications involve almost immersive sports events. Specific applications may require special network configuration. For example, in the case of VR games, a game company may need to integrate a core server with an edge network server of a network operator to minimize latency.

Automotive is expected to be an important new driver for 5G together with many use cases for mobile communication regarding vehicles. For example, entertainment for passengers require both high capacity and high mobile broadband. The reason is because future users will continue to expect high-quality connections, regardless of their location and speed. Another use case in the automotive sector is an augmented reality dashboard. The augmented reality dashboard allows drivers to identify objects in the dark on top of what they see through a front window. The augmented reality dashboard superimposes information to be provided to the driver regarding a distance and movement of objects. In the future, wireless modules will enable communication between vehicles, exchange of information between a vehicle and a supporting infrastructure, and exchange of information between a vehicle and other connected devices (e.g., devices carried by pedestrians). A safety system may lower the risk of accidents by guiding the driver to alternative courses of action to make driving safer. A next step will be a remotely controlled vehicle or an autonomous vehicle. This requires very reliable and very fast communication between different autonomous vehicles and/or between vehicles and infrastructure. In the future, autonomous vehicles will perform all driving activities and drivers will be forced to focus only on traffic anomalies that the vehicle itself cannot identify. The technical requirements of autonomous vehicles require ultra-low latency and ultra-fast reliability to increase traffic safety to levels that cannot be achieved by humans.

Smart cities and smart homes referred to as smart society will be embedded with high-density wireless sensor networks as an example of smart networks. A distributed network of intelligent sensors will identify the conditions for cost and energy efficient maintenance of a city or home. A similar setup may be done for each household. Temperature sensors, window and heating controllers, burglar alarms, and home appliances are all wirelessly connected. Many of these sensors typically require low data rates, low power, and low cost. However, for example, real-time HD video may be required in certain types of devices for surveillance.

The consumption and distribution of energy including heat or gas is highly decentralized, requiring automated control of distributed sensor networks. A smart grid interconnects these sensors using digital information and communication technologies to collect information and act accordingly. This information may include the behavior of suppliers and consumers, so that the smart grid may improve efficiency, reliability, economical efficiency, sustainability of production, and a distribution of fuels such as electricity in an automated manner. The smart grid may also be considered as another low-latency sensor network.

A health sector has many applications that may benefit from mobile communications. The communication system may support telemedicine providing clinical care from remote locations. This may help reduce barriers to distance and improve access to medical services that are not consistently available in remote rural areas. It is also used to save lives in critical care and emergencies. A wireless sensor network based on mobile communication may provide remote monitoring and sensors for parameters such as a heart rate and blood pressure.

Wireless and mobile communications are becoming increasingly important in industrial applications. Wiring is expensive to install and maintain. Thus, a possibility of replacing cables with reconfigurable wireless links is an attractive opportunity for many industries. However, achieving this requires that a wireless connection operates with a delay, reliability and capacity similar to those of a cable and requires simplified management. Low latency and very low error probability are new requirements that need to be connected to 5G.

Logistics and cargo tracking is an important use case for mobile communications that enables tracking of inventory and packages from anywhere using a location-based information system. Logistics and freight tracking use cases typically require low data rates but require a wide range and reliable location information.

<Artificial Intelligence (AI)>

Artificial intelligence refers to a field of studying artificial intelligence or a methodology for creating the same, and machine learning refers to a field of defining various problems dealing in an artificial intelligence field and studying methodologies for solving the same. The machine learning may be defined as an algorithm for improving performance with respect to a certain task through repeated experiences with respect to the task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value.

<Robot>

A robot may refer to a machine which automatically handles a given task by its own ability, or which operates autonomously. Particularly, a robot that functions to recognize an environment and perform an operation according to its own judgment may be referred to as an intelligent robot.

Robots may be classified into, for example, industrial, medical, household, and military robots, according to the purpose or field of use.

A robot may include an actuator or a driving unit including a motor in order to perform various physical operations, such as moving joints of the robot. In addition, a movable robot may include, for example, a wheel, a brake, and a propeller in the driving unit thereof, and through the driving unit, may thus be capable of traveling on the ground or flying in the air.

<Self-Driving or Autonomous-Driving>

Autonomous driving refers to self-driving technology, and an autonomous vehicle refers to a vehicle that moves without any manipulation by a user or with minimum manipulation by a user.

For example, autonomous driving may include all of a technology for keeping a vehicle within a driving lane, a technology for automatically controlling a speed such as an adaptive cruise control, a technology for automatically driving the vehicle along a determined route, and a technology for, when a destination is set, automatically setting a route and driving the vehicle along the route.

A vehicle includes a vehicle having only an internal combustion engine, a hybrid vehicle having both an internal combustion engine and an electric motor, and an electric vehicle having only an electric motor, and may include not only an automobile but also a train, a motorcycle, or the like.

In this case, an autonomous vehicle may be considered as a robot with an autonomous driving function.

<Extended Reality; XR>

Extended reality collectively refers to virtual reality (VR), augmented reality (AR), and mixed reality (MR). The VR technology provides real world objects or backgrounds only in CG images, the AR technology provides virtual CG images together with real object images, and the MR technology is computer graphic technology for mixing and combining virtual objects with the real world.

The MR technology is similar to the AR technology in that both real and virtual objects are shown together. However, there is a difference in that a virtual object is used to complement a real object in the AR technology, whereas a virtual object and a real object are used in an equivalent nature in the MR technology.

The XR technology may be applied to a head-mount display (HMD), a head-up display (HUD), a mobile phone, a tablet PC, a laptop, a desktop, a TV, digital signage, etc. A device to which the XR technology is applied may be referred to as an XR device.

Figure 28:
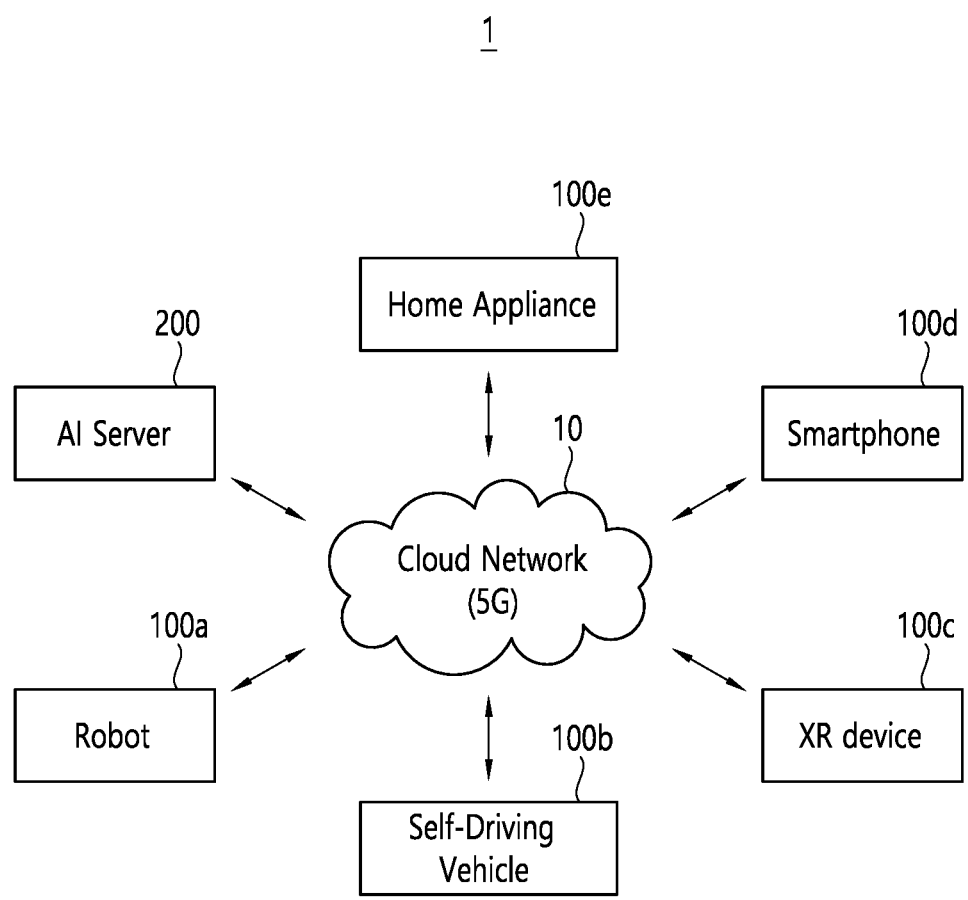
FIG. 28 shows an AI system 1 according to an embodiment.

FIG. 28 shows an AI system 1 according to an embodiment.

Referring to FIG. 28, an AI system 1 is connected to at least one of an AI server 200, a robot 100a, a self-driving vehicle 100b, an XR device 100c, a smartphone 100d, or home appliances 100e over a cloud network 10. In this case, the robot 100a, the self-driving vehicle 100b, the XR device 100c, the smartphone 100d or the home appliances 100e to which the AI technology has been applied may be called AI devices 100a to 100e.

The cloud network 10 may be a network that constitutes a part of a cloud computing infrastructure or a network that exists in the cloud computing infrastructure. Here, the cloud network 10 may be configured using a 3G network, a 4G or long term evolution (LTE) network, or a 5G network.

The devices 100a to 100e and 200 configuring the AI system 1 may be interconnected over the cloud network. Particularly, the devices 100a to 100e and 200 may communicate with each other through a base station but may directly communicate with each other without the intervention of a base station.

The AI server 200 may include a server that performs AI processing and a server that performs an operation on big data.

The AI server 200 is connected to at least one of the robot 100a, the self-driving vehicle 100b, the XR device 100c, the smartphone 100d or the home appliances 100e, that is, AI devices configuring the AI system, over the cloud network 10 and may help at least some of the AI processing of the connected AI devices 100a to 100e.

In this case, the AI server 200 may train an artificial neural network based on a machine learning algorithm in place of the AI devices 100a to 100e, may directly store a learning model or may transmit the learning model to the AI devices 100a to 100e.

In this case, the AI server 200 may receive input data from the AI devices 100a to 100e, may deduce a result value of the received input data using the learning model, may generate a response or control command based on the deduced result value, and may transmit the response or control command to the AI devices 100a to 100e.

Alternatively, the AI devices 100a to 100e may directly deduce a result value of input data using a learning model and may generate a response or control command based on the deduced result value.

Hereinafter, various embodiments of the AI devices 100a to 100e to which the aforementioned technology is applied will be described.

<AI+robot>

The robot 100a, which adopts an AI technology, may be implemented as a guide robot, a transport robot, a cleaning robot, a wearable robot, an entertainment robot, a pet robot, an unmanned flying robot, and the like.

The robot 100a may include a robot control module for controlling an operation, and the robot control module may refer to a software module or a chip implemented with hardware.

The robot 100a may acquire status information of the robot 100a using sensor information acquired from various types of sensors, detect (recognize) surrounding environments and objects, generate map data, determine moving routes and driving plans, determine responses to user interactions, or determine actions.

Here, the robot 100a may use sensor information obtained from at least one sensor from among lidar, radar, and camera to determine a moving route and a driving plan.

The robot 100a may perform the above operations using a learning model including at least one artificial neural network. For example, the robot 100a may recognize a surrounding environment and an object using a learning model and may determine an operation using the recognized surrounding environment information or object information. Here, the learning model may be directly learned by the robot 100a or learned by an external device such as the AI server 200.

Here, the robot 100a may directly generate a result using a learning model and perform an operation, or transmit sensor information to an external device such as the AI server 200, receive a result generated accordingly, and perform an operation.

The robot 100a may determine a moving path and a driving plan using at least one of map data, object information detected from sensor information, or object information acquired from an external device, and control a driving unit to drive the robot 100a according to the moving path and the driving plan.

The map data may include object identification information on various objects arranged in a space in which the robot 100a moves. For example, the map data may include object identification information on fixed objects such as walls and doors and movable objects such as flower pots and desks. In addition, the object identification information may include a name, a type, a distance, and a location.

In addition, the robot 100a may perform an operation or run by controlling the driving unit based on the user's control/interaction. In this case, the robot 100a may acquire interaction intention information according to a user's motion or voice speech, determine a response based on the acquired intention information, and perform an operation.

<AI+Autonomous-Driving/Self-Driving>

The autonomous vehicle 100b may be implemented as a mobile robot, a vehicle, an unmanned aerial vehicle, etc., to which AI technology is applied.

The XR device 100c may be implemented as a HMD, a HUD, a TV, a mobile phone, a smartphone, a computer, a wearable device, a home appliance, a digital signage, a vehicle, a fixed robot, a mobile robot, etc., to which AI technology is applied.

The robot 100a may be implemented as a guide robot, a carrying robot, a cleaning robot, a wearable robot, an entertainment robot, a pet robot, an unmanned flying robot, etc., to which AI technology and autonomous-driving technology are applied.

The robot 100a may be implemented as a guide robot, a carrying robot, a cleaning robot, a wearable robot, an entertainment robot, a pet robot, an unmanned flying robot, a drone, etc., to which AI technology and XR technology are applied.

The autonomous vehicle 100b may be implemented as a mobile robot, a vehicle, an unmanned aerial vehicle, etc., to which AI technology and XR technology are applied.

In the above, preferred embodiments have been exemplarily described, but the disclosure of the present specification is not limited to such specific embodiments, and thus, modifications, changes, or can be improved.

What is claimed is:

1. A method for processing protocol data unit (PDU) session establishment by an access and mobility management function (AMF) node, the method comprising:

receiving a PDU session establishment request message from a user equipment (UE) over any one of 3rd Generation Partnership Project (3GPP) access and non-3GPP access, wherein the PDU session establishment request message including-includes request information indicating a multi-access (MA) PDU session;

selecting a session management function (SMF) node supporting the MA PDU session;

transmitting the PDU session establishment request message to the SMF node supporting the MA PDU session;

receiving PDU session establishment accept message from the SMF node;

transmitting the PDU session establishment accept message to the UE; and after the MA PDU session has established, receiving a service request message related to the MA PDU session from the UE over one access of the 3GPP access and the non-3GPP access, transmitting request message for requesting activation of user plane resource of the one access to the SMF node, based on that the service request message is received over the one access, and wherein the service request message enables the SMF to only activate the user plane resource of the one access.

2. The method of claim 1, further comprising:

storing context of a PDU session including an access type, and wherein the access type indicates both of the 3GPP access and the non-3GPP access.

3. The method of claim 1, wherein the PDU session establishment request message, which is delivered to the SMF node includes information related to whether the UE is registered over both the 3GPP access and the non-3GPP access.

4. The method of claim 1, wherein the service request message includes List Of PDU Sessions To Be Activated related to the MA PDU session.

5. The method of claim 1, further comprising:

identifying S-NSSAI of the MA PDU session is comprised in allowed NSSAI for corresponding access when the UE is registered over only any one of the 3GPP access and the non-3GPP access and when the UE is registered over another access; and transmitting a request for release of the MA PDU session to the SMF node when the S-NSSAI of the MA PDU session is comprised in the allowed NSSAI for the corresponding access.

6. The method of claim 1, further comprising:

receiving a registration request message comprising a list of a PDU session to be activated from the UE when the UE is not registered over the second access; and delivering necessity of activating the MA PDU session to the SMF node based on the list.

7. A method for processing protocol data unit (PDU) session establishment by a session management function (SMF) node, the method comprising:

receiving, from an access and mobility management function (AMF) node, a PDU session establishment request message from a user equipment (UE), wherein the PDU session establishment request message includes request information indicating a multi-access (MA) PDU session and information related to whether the UE is registered over both of 3rd Generation Partnership Project (3GPP) access and non-3GPP access;

establishing an MA PDU session over any one of the 3GPP access and the non-3GPP access or over both thereof, based on the information related to the MA PDU session;

transmitting a PDU session establishment accept message to the AMF;

receiving a request message for requesting activation of user plane resource of one access from the AMF node, wherein the request message is transmitted from the AMF node, based on that the AMF node received a service request message related to the MA PDU session from the UE over the one access of the 3GPP access and the non-3GPP access, after the MA PDU session has established; and only activating the user plane resource of the one access.

8. The method of claim 7, wherein the receiving of the PDU session establishment request message comprises receiving one or more of session network slice selection assistance information (S-NSSAI) and allowed NSSAI for each access.

9. The method of claim 7, further comprising:

transmitting a request for notification to the AMF node in occurrence of a first event in which the UE is registered over the non-3GPP access or in occurrence of a second event of a switch to a connected state occurs when user plane setup for the MA PDU session is performed first over only the 3GPP access; and receiving a notification from the AMF node when the first event or second event occurs.

10. The method of claim 7, wherein the PDU session establishment acceptance message comprises information indicating access for which user plane setup is performed among the 3GPP access and the non-3GPP access.

11. The method of claim 7, further comprising:

transmitting a request for notification to the AMF node in occurrence of a first event in which the UE is registered over the second access or in occurrence of a non-3GPP event of a switch to a connected state occurs in a case where the MA PDU session is generated over only the 3GPP access in the generating of the MA PDU session.

12. An access and mobility management function (AMF) node for processing protocol data unit (PDU) session establishment, the AMF node comprising:

at least one transceiver;

at least one processor; and at least one computer memory operably connected to the at least one processor and storing instructions that, based on being executed by the at least one processor, perform operations comprising:

receiving a PDU session establishment request message from a user equipment (UE) over any one of 3rd Generation Partnership Project (3GPP) access and non-3GPP access, wherein the PDU session establishment request message includes request information indicating a multi-access (MA) PDU session;

selecting a session management function (SMF) node supporting the MA PDU session;

transmitting the PDU session establishment request message to the SMF node supporting the MA PDU session;

receiving PDU session establishment accept message from the SMF node;

transmitting the PDU session establishment accept message to the UE; and after the MA PDU session has established, receiving a service request message related to the MA PDU session from the UE over one access of the 3GPP access and the non-3GPP access, wherein the service request message enables the SMF to only activate the user plane resource of the one access.

* * * * *